(12) United States Patent
Richards et al.

(10) Patent No.: US 12,132,784 B1
(45) Date of Patent: *Oct. 29, 2024

(54) DISTRIBUTED DATA ANALYSIS FOR STREAMING DATA SOURCES

(71) Applicant: Tanium Inc., Kirkland, WA (US)

(72) Inventors: Ryan S. Richards, Walnut Creek, CA (US); John R. Coates, Berkeley, CA (US); James B. Evans, Orinda, CA (US)

(73) Assignee: Tanium Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,351

(22) Filed: May 31, 2023

Related U.S. Application Data

(63) Continuation of application No. 17/503,023, filed on Oct. 15, 2021, now Pat. No. 11,700,303, which is a
(Continued)

(51) Int. Cl.
*H04L 67/1097* (2022.01)
*G06F 16/2455* (2019.01)

(52) U.S. Cl.
CPC .... *H04L 67/1097* (2013.01); *G06F 16/24552* (2019.01)

(58) Field of Classification Search
CPC ....... H04L 43/08; H04L 43/00; H04L 43/062; H04L 43/10; H04L 41/0893; H04L 41/12;
(Continued)

(56) References Cited

U.S. PATENT DOCUMENTS 5,220,596 A 6/1993 Patel
5,842,202 A 11/1998 Kon
(Continued)

FOREIGN PATENT DOCUMENTS

EP 1553747 A1 7/2005
EP 2493118 A1 8/2012

OTHER PUBLICATIONS

Abdalkarim Awad et al., "Virtual Cord Protocol (VCP): A Flexible DHT-like Routing Service for Sensor Networks", In Proceedings of the 5th IEEE International Conference on Mobile Ad Hoc and Sensor Systems, 2008, 10 pp. 133-142.
(Continued)

*Primary Examiner* — Tae K Kim
(74) *Attorney, Agent, or Firm* — Nicholson De Vos Webster & Elliott LLP

(57) ABSTRACT

A server system, coupled to a linear communication orbit, has a plurality of function modules. Each function module is configured to collect data from machines located at nodes of the linear communication orbit, process collected data according to a schema definition to generate result data, and store the result data in a database. Data collection requests, based on the schema definition, are sent through the linear communication orbit to collecting data from a set of machines via the linear communication orbit. In some embodiments, a central data management module of the one or more servers is configured to provide the schema definition to and receive result data reported from the function modules.

20 Claims, 21 Drawing Sheets

Related U.S. Application Data continuation of application No. 16/443,720, filed on Jun. 17, 2019, now Pat. No. 11,153,383, which is a continuation-in-part of application No. 15/215,474, filed on Jul. 20, 2016, now Pat. No. 10,482,242.

(60) Provisional application No. 62/813,655, filed on Mar. 4, 2019, provisional application No. 62/333,768, filed on May 9, 2016, provisional application No. 62/305,482, filed on Mar. 8, 2016.

(58) Field of Classification Search
CPC .............. H04L 41/0813; H04L 41/0869; H04L 67/2842; H04L 67/2885; H04L 67/104; H04L 67/1042; H04L 67/1061; H04L 67/1063
See application file for complete search history.

(56) References Cited

U.S. PATENT DOCUMENTS

| | | |
|---|---|---|
| 5,949,755 A | 9/1999 | Uphadya et al. |
| 6,049,828 A | 4/2000 | Dev et al. |
| 6,226,493 B1 | 5/2001 | Leopold et al. |
| 6,615,213 B1 | 9/2003 | Johnson |
| 6,879,979 B2 | 4/2005 | Hindawi et al. |
| 6,885,644 B1 | 4/2005 | Knop et al. |
| 6,959,000 B1 | 10/2005 | Lee et al. |
| 7,043,550 B2 | 5/2006 | Knop et al. |
| 7,096,503 B1 | 8/2006 | Magdych |
| 7,120,693 B2 | 10/2006 | Chang et al. |
| 7,225,243 B1 | 5/2007 | Wilson |
| 7,240,044 B2 | 7/2007 | Chaudhuri et al. |
| 7,299,047 B2 | 11/2007 | Dolan et al. |
| 7,483,430 B1 | 1/2009 | Yuan et al. |
| 7,555,545 B2 | 6/2009 | McCasland |
| 7,600,018 B2 | 10/2009 | Maekawa et al. |
| 7,698,453 B2 | 4/2010 | Samuels et al. |
| 7,720,641 B2 | 5/2010 | Alagappan et al. |
| 7,761,557 B2 | 7/2010 | Fellenstein et al. |
| 7,769,848 B2 | 8/2010 | Choy et al. |
| 7,844,687 B1 | 11/2010 | Gelvin et al. |
| 8,078,668 B2 | 12/2011 | Moreau |
| 8,086,729 B1 | 12/2011 | Hindawi et al. |
| 8,139,508 B1 | 3/2012 | Roskind |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,650,160 B1 | 2/2014 | Beatty et al. |
| 8,677,448 B1 | 3/2014 | Kauffman et al. |
| 8,813,228 B2 | 8/2014 | Magee et al. |
| 8,819,769 B1 | 8/2014 | Van Dijk |
| 8,885,521 B2 | 11/2014 | Wang et al. |
| 8,903,973 B1 * | 12/2014 | Hindawi ................. G06F 16/27 709/217 |
| 8,904,039 B1 * | 12/2014 | Hindawi ............. H04L 12/6418 709/217 |
| 8,972,566 B1 | 3/2015 | Hindawi et al. |
| 9,009,827 B1 | 4/2015 | Albertson et al. |
| 9,059,961 B2 * | 6/2015 | Hindawi ............. H04L 41/0893 |
| 9,104,794 B2 | 8/2015 | Zakonov et al. |
| 9,246,977 B2 | 1/2016 | Hindawi et al. |
| 9,576,131 B2 | 2/2017 | Tuvell et al. |
| 9,609,007 B1 | 3/2017 | Rivlin et al. |
| 9,667,738 B2 * | 5/2017 | Hindawi ................. H04L 67/60 |
| 9,716,649 B2 | 7/2017 | Bent et al. |
| 9,729,429 B2 | 8/2017 | Hindawi et al. |
| 9,769,037 B2 * | 9/2017 | Hindawi ............. H04L 41/0853 |
| 9,769,275 B2 | 9/2017 | Hindawi et al. |
| 9,800,603 B1 | 10/2017 | Sidagni et al. |
| 9,910,752 B2 | 3/2018 | Lippincott et al. |
| 9,973,525 B1 | 5/2018 | Roturier et al. |
| 9,985,982 B1 | 5/2018 | Bartos et al. |
| 9,998,955 B1 | 6/2018 | Maccarthaigh |
| 10,015,185 B1 | 7/2018 | Kolman et al. |
| 10,095,864 B2 * | 10/2018 | Hunt ..................... G06F 21/577 |
| 10,111,208 B2 | 10/2018 | Hindawi et al. |
| 10,136,415 B2 | 11/2018 | Hindawi et al. |
| 10,148,536 B2 | 12/2018 | Hindawi et al. |
| 10,261,770 B2 | 4/2019 | Devagupthapu et al. |
| 10,372,904 B2 | 8/2019 | Hunt et al. |
| 10,412,188 B2 | 9/2019 | Hindawi et al. |
| 10,482,242 B2 | 11/2019 | Hunt et al. |
| 10,484,429 B1 | 11/2019 | Fawcett |
| 10,498,744 B2 * | 12/2019 | Hunt ................... H04L 41/0681 |
| 10,649,870 B1 | 5/2020 | Lippincott et al. |
| 10,674,486 B2 | 6/2020 | Hindawi et al. |
| 10,708,116 B2 | 7/2020 | Hindawi et al. |
| 10,795,906 B1 | 10/2020 | Teubner |
| 10,824,729 B2 | 11/2020 | Hoscheit et al. |
| 10,841,365 B2 | 11/2020 | White et al. |
| 10,873,645 B2 | 12/2020 | Freilich et al. |
| 10,929,345 B2 | 2/2021 | Stoddard et al. |
| 11,032,298 B1 | 6/2021 | Robbins et al. |
| 11,100,199 B2 | 8/2021 | Subramaniam |
| 11,151,246 B2 | 10/2021 | Davis et al. |
| 11,153,383 B2 | 10/2021 | Richards et al. |
| 11,172,470 B1 | 11/2021 | Guieu et al. |
| 11,258,654 B1 | 2/2022 | Hindawi et al. |
| 11,277,489 B2 | 3/2022 | Freilich et al. |
| 11,301,568 B2 | 4/2022 | Dargude et al. |
| 11,343,355 B1 | 5/2022 | Goela et al. |
| 11,372,938 B1 | 6/2022 | Stoddard et al. |
| 11,461,208 B1 | 10/2022 | Lippincott et al. |
| 11,563,764 B1 | 1/2023 | Hoscheit et al. |
| 11,609,835 B1 | 3/2023 | Varga et al. |
| 11,700,303 B1 | 7/2023 | Richards et al. |
| 11,711,810 B1 | 7/2023 | Guieu et al. |
| 11,777,981 B1 | 10/2023 | Hoscheit et al. |
| 11,809,294 B1 | 11/2023 | Lippincott et al. |
| 11,831,670 B1 | 11/2023 | Molls et al. |
| 11,886,229 B1 | 1/2024 | Goela et al. |
| 11,914,495 B1 | 2/2024 | Varga et al. |
| 11,956,335 B1 | 4/2024 | Goela et al. |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2002/0099952 A1 | 7/2002 | Lambert et al. |
| 2002/0198867 A1 | 12/2002 | Lohman et al. |
| 2003/0101253 A1 | 5/2003 | Saito et al. |
| 2003/0120603 A1 | 6/2003 | Kojima et al. |
| 2003/0131044 A1 | 7/2003 | Nagendra et al. |
| 2003/0212676 A1 | 11/2003 | Bruce et al. |
| 2003/0212821 A1 | 11/2003 | Gillies et al. |
| 2004/0037374 A1 | 2/2004 | Gonikberg |
| 2004/0044727 A1 | 3/2004 | Abdelaziz |
| 2004/0044790 A1 | 3/2004 | Loach |
| 2004/0054723 A1 | 3/2004 | Dayal |
| 2004/0054889 A1 | 3/2004 | Pitsos |
| 2004/0064522 A1 | 4/2004 | Zhang |
| 2004/0076164 A1 | 4/2004 | Vanderveen et al. |
| 2004/0190085 A1 | 9/2004 | Silverbrook et al. |
| 2005/0004907 A1 | 1/2005 | Bruno et al. |
| 2005/0053000 A1 | 3/2005 | Oliver et al. |
| 2005/0108356 A1 | 5/2005 | Rosu et al. |
| 2005/0108389 A1 | 5/2005 | Kempin et al. |
| 2005/0195755 A1 * | 9/2005 | Senta ..................... H04L 12/185 370/255 |
| 2006/0039371 A1 | 2/2006 | Castro et al. |
| 2006/0128406 A1 | 6/2006 | Macartney |
| 2006/0282505 A1 | 12/2006 | Hasha et al. |
| 2007/0005738 A1 | 1/2007 | Alexion-Tiernan et al. |
| 2007/0171844 A1 | 7/2007 | Loyd et al. |
| 2007/0211651 A1 | 9/2007 | Ahmed et al. |
| 2007/0230482 A1 | 10/2007 | Shim et al. |
| 2007/0261051 A1 | 11/2007 | Porter et al. |
| 2008/0082628 A1 | 4/2008 | Rowstron et al. |
| 2008/0133582 A1 | 6/2008 | Andersch et al. |
| 2008/0258880 A1 | 10/2008 | Smith et al. |

(56) References Cited

U.S. PATENT DOCUMENTS

| | | |
|---|---|---|
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0271360 A1 | 10/2009 | Bestgen et al. |
| 2009/0285204 A1 | 11/2009 | Gallant et al. |
| 2009/0319503 A1 | 12/2009 | Mehul et al. |
| 2009/0328115 A1 | 12/2009 | Malik |
| 2010/0011060 A1 | 1/2010 | Hilterbrand et al. |
| 2010/0070570 A1 | 3/2010 | Lepeska |
| 2010/0085948 A1 | 4/2010 | Yu et al. |
| 2010/0094862 A1 | 4/2010 | Bent et al. |
| 2010/0154026 A1 | 6/2010 | Chatterjee et al. |
| 2010/0296416 A1 | 11/2010 | Lee et al. |
| 2010/0306252 A1 | 12/2010 | Jarvis et al. |
| 2011/0099562 A1 | 4/2011 | Nandy et al. |
| 2011/0231431 A1 | 9/2011 | Kamiwada et al. |
| 2011/0271319 A1* | 11/2011 | Venable, Sr. ............ H04L 41/12 709/224 |
| 2011/0299455 A1 | 12/2011 | Ordentlich et al. |
| 2012/0053957 A1 | 3/2012 | Atkins |
| 2012/0110183 A1 | 5/2012 | Miranda et al. |
| 2012/0221692 A1 | 8/2012 | Steiner et al. |
| 2012/0269096 A1 | 10/2012 | Roskind |
| 2012/0330700 A1 | 12/2012 | Garg et al. |
| 2013/0110931 A1* | 5/2013 | Kim .................. H04L 67/104 709/204 |
| 2013/0170336 A1* | 7/2013 | Chen ................. H04L 12/44 370/256 |
| 2013/0212296 A1 | 8/2013 | Goel et al. |
| 2013/0276053 A1 | 10/2013 | Hugard, IV et al. |
| 2013/0326494 A1 | 12/2013 | Nunez et al. |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164290 A1 | 6/2014 | Salter |
| 2014/0164552 A1 | 6/2014 | Kim et al. |
| 2014/0181247 A1 | 6/2014 | Hindawi et al. |
| 2014/0181295 A1* | 6/2014 | Hindawi ............ H04L 41/0893 709/224 |
| 2014/0244727 A1 | 8/2014 | Kang et al. |
| 2014/0279044 A1 | 9/2014 | Summers |
| 2014/0280280 A1 | 9/2014 | Singh |
| 2014/0282586 A1 | 9/2014 | Shear |
| 2014/0372533 A1 | 12/2014 | Fu et al. |
| 2014/0375528 A1 | 12/2014 | Ling |
| 2015/0080039 A1 | 3/2015 | Ling et al. |
| 2015/0149624 A1* | 5/2015 | Hindawi ............ H04L 12/4641 709/224 |
| 2015/0163121 A1 | 6/2015 | Mahaffey et al. |
| 2015/0172228 A1* | 6/2015 | Zalepa ............... H04L 12/1813 709/206 |
| 2015/0199511 A1 | 7/2015 | Faile et al. |
| 2015/0199629 A1 | 7/2015 | Faile et al. |
| 2015/0256575 A1 | 9/2015 | Scott |
| 2015/0302458 A1 | 10/2015 | Dides |
| 2015/0312335 A1 | 10/2015 | Ying |
| 2015/0372911 A1 | 12/2015 | Yabusaki et al. |
| 2015/0373043 A1 | 12/2015 | Wang et al. |
| 2015/0378743 A1 | 12/2015 | Zellermayer et al. |
| 2016/0034692 A1 | 2/2016 | Singler |
| 2016/0080408 A1 | 3/2016 | Coleman et al. |
| 2016/0119251 A1 | 4/2016 | Solis et al. |
| 2016/0255142 A1 | 9/2016 | Hunt et al. |
| 2016/0255143 A1 | 9/2016 | Hunt et al. |
| 2016/0269434 A1 | 9/2016 | DiValentin et al. |
| 2016/0286540 A1 | 9/2016 | Hindawi et al. |
| 2016/0352588 A1* | 12/2016 | Subbarayan ............ H04L 45/58 |
| 2016/0360006 A1 | 12/2016 | Hopkins et al. |
| 2016/0378450 A1 | 12/2016 | Fu et al. |
| 2017/0093915 A1 | 3/2017 | Ellis et al. |
| 2017/0118074 A1 | 4/2017 | Feinstein et al. |
| 2017/0133843 A1 | 5/2017 | Mcneill-Mccallum et al. |
| 2017/0257432 A1 | 9/2017 | Fu et al. |
| 2017/0286690 A1 | 10/2017 | Chari |
| 2017/0346824 A1 | 11/2017 | Mahabir |
| 2018/0013768 A1* | 1/2018 | Hunt .................. H04L 12/4625 |
| 2018/0039486 A1 | 2/2018 | Kulkarni et al. |
| 2018/0074483 A1 | 3/2018 | Cruz |
| 2018/0074796 A1 | 3/2018 | Alabes et al. |
| 2018/0191747 A1 | 7/2018 | Nachenberg et al. |
| 2018/0191766 A1 | 7/2018 | Holeman et al. |
| 2018/0267794 A1 | 9/2018 | Atchison et al. |
| 2018/0351792 A1* | 12/2018 | Hunter ............... H04L 41/0836 |
| 2018/0351793 A1* | 12/2018 | Hunter ............... H04L 41/0836 |
| 2018/0375892 A1 | 12/2018 | Ganor |
| 2019/0081981 A1 | 3/2019 | Bansal |
| 2019/0096217 A1 | 3/2019 | Pourmohammad et al. |
| 2019/0138512 A1 | 5/2019 | Pourmohammad et al. |
| 2019/0260638 A1 | 8/2019 | Yocam et al. |
| 2019/0280867 A1* | 9/2019 | Kurian ................. H04L 9/0861 |
| 2019/0319987 A1 | 10/2019 | Levy |
| 2019/0361843 A1 | 11/2019 | Stoddard et al. |
| 2020/0028890 A1* | 1/2020 | White ................ H04L 61/5007 |
| 2020/0053072 A1 | 2/2020 | Glozman et al. |
| 2020/0195693 A1 | 6/2020 | Price |
| 2020/0198867 A1 | 6/2020 | Nakamichi |
| 2020/0202007 A1 | 6/2020 | Nagaraja et al. |
| 2020/0304536 A1 | 9/2020 | Mahabir |
| 2021/0027401 A1 | 1/2021 | Hovhannisyan et al. |
| 2021/0218711 A1 | 7/2021 | Biran et al. |
| 2023/0036694 A1 | 2/2023 | Coughlan |
| 2023/0360040 A1 | 11/2023 | Childe et al. |

OTHER PUBLICATIONS

Hood, Proactive Network-Fault Detection, Sep. 1997, 9 pages.

Mongeau et al., "Ensuring integrity of network inventory and configuration data", Telecommunications Network Strategy and Planning Symposium, Networks 2004, 11th International Vienna, Austria, Jun. 13-16, 2004, 6 pgs.

Weixiong Rao et al., "Optimal Resource Placement in Structured Peer-to-Peer Networks," Jul. 2010, IEEE Transactions on Parallel and Distributed Systems, vol. 21, No. 7, 16 pgs.

Tanium Inc., International Search Report and Written Opinion, PCT/US2013/076971, Apr. 4, 2014, 19 pgs.

Tanium Inc., International Preliminary Report on Patentability, PCT/US2013/076971, Jun. 23, 2015, 14 pgs.

Tanium Inc., International Search Report and Written Opinion, PCT/US2014/067607, Feb. 18, 2015, 15 pgs.

Tanium Inc., International Preliminary Report on Patentability, PCT/US2014/067607, May 31, 2016, 11 pgs.

Tanium Inc., International Search Report and Written Opinion, PCT/US2015/020780, Jul. 2, 2015, 13 pgs.

Tanium Inc., International Preliminary Report on Patentability, PCT/US2015/020780, Sep. 27, 2016, 9 pgs.

Hindawi, Non-Final Office Action, U.S. Appl. No. 15/702,617, filed Jun. 1, 2018, 37 pgs.

Hindawi, Final Office Action, U.S. Appl. No. 15/702,617, filed Dec. 27, 2018, 54 pgs.

Hunt, Non-Final Office Action, U.S. Appl. No. 15/215,468, filed Oct. 4, 2018, 13 pgs.

Hunt, Notice of Allowance, U.S. Appl. No. 15/215,468, filed Jan. 24, 2019, 8 pgs.

Hunt, Notice of Allowance, U.S. Appl. No. 15/215,468, filed Apr. 1, 2019, 8 pgs.

Hunt, Non-Final Office Action, U.S. Appl. No. 15/215,474, filed Sep. 10, 2018, 10 pgs.

Hunt, Final Office Action, U.S. Appl. No. 15/215,474, filed Apr. 1, 2019, 7 pgs.

Hunt, Notice of Allowance, U.S. Appl. No. 15/215,474, filed Jul. 11, 2019, 9 pgs.

Hunt, Notice of Allowance, U.S. Appl. No. 15/713,518, filed Apr. 10, 2019, 14 pgs.

Lippincott, Notice of Allowance, U.S. Appl. No. 15/878,286, filed Apr. 25, 2019, 11 pgs.

Jae Woo Lee et al., "0 to 10k in 20 Seconds: Bootstrapping Large-Scale DHT Networks", 2011 IEE International Conference on Communications, Jun. 9, 2011, pp. 1-6.

(56) References Cited

OTHER PUBLICATIONS

Stoica et al., "Chord: A Scalable Peer-to-Peer Lookup Service for Internet Applications", 2001, pp. 1-12 (Year: 2002).
Ping Wang et al., "Peer-to-Peer Botnets: The Next Generation of Botnet Attacks", Jan. 2010, pp. 1-25 (Year: 2010).
Sean Rhea et al., "Handling Churn in a DHT", 2004, pp. 1-14 (Year: 2004).
Richards, Non-Final Office Action, U.S. Appl. No. 16/443,720, filed Sep. 4, 2020, 13 pgs.
Richards, Notice of Allowance, U.S. Appl. No. 16/443,720, filed Feb. 9, 2021, 8 pgs.
Richards, Notice of Allowance, U.S. Appl. No. 16/443,720, filed Jun. 15, 2021, 7 pgs.
Goela, Non-Final Office Action, U.S. Appl. No. 16/943,291, filed Jul. 16, 2021, 19 pgs.
Freilich, Non-Final Office Action, U.S. Appl. No. 17/129,638, filed Jul. 23, 2021, 7 pgs.
Richards, Corrected Notice of Allowability, U.S. Appl. No. 16/443,720, filed Aug. 4, 2021, 2 pgs.
Goela, Notice of Allowance, U.S. Appl. No. 16/943,291, filed Oct. 1, 2021, 11 pgs.
Hindawi, Non-Final Office Action, U.S. Appl. No. 16/917,800, filed Jul. 1, 2021, 7 pgs.
Hindawi, Notice of Allowance, U.S. Appl. No. 16/917,800, filed Oct. 15, 2021, 7 pgs.
Goela, Notice of Allowance, U.S. Appl. No. 16/943,291, filed Oct. 18, 2021, 5 pgs.
Hoscheit, Non-Final Office Action, U.S. Appl. No. 17/001,586, filed Jun. 9, 2022, 7 pgs.
Freilich, Notice of Allowance, U.S. Appl. No. 17/129,638, filed Nov. 4, 2021, 9 pgs.
Stoddard, Non-Final Office Action, U.S. Appl. No. 16/870,742, filed Oct. 28, 2021, 7 pgs.
Stoddard, Notice of Allowance, U.S. Appl. No. 16/870,742, filed Mar. 7, 2022, 10 pgs.
Goela, Notice of Allowance, U.S. Appl. No. 16/943,291, filed Jan. 27, 2022, 12 pgs.
Lippincott, Notice of Allowance, U.S. Appl. No. 15/878,286, filed Jul. 31, 2019, 5 pgs.
Lippincott, Notice of Allowance, U.S. Appl. No. 15/136,790, Nov. 20, 2017, 9 pgs.
Lippincott, Notice of Allowance, U.S. Appl. No. 15/930,342, filed May 25, 2022, 9 pgs.
Guieu, Non-Final Office Action, U.S. Appl. No. 17/521,686, filed Oct. 4, 2022, 38 pages.
Guieu, Notice of Allowance, U.S. Appl. No. 16/854,844, filed Jul. 6, 2021, 16 pages.
Hindawi, Non-Office Action, U.S. Appl. No. 13/797,946, filed Feb. 27, 2015, 18 pgs.
Hindawi, Notice of Allowance, U.S. Appl. No. 13/797,946, filed Sep. 11, 2015, 18 pages.
Hindawi, Notice of Allowance, U.S. Appl. No. 15/004,757, filed Jul. 16, 2018, 7 pages.
Hindawi, Notice of Allowance, U.S. Appl. No. 16/194,240, filed Mar. 31, 2020, 6 pages.
Stoddard, Notice of Allowance, U.S. Appl. No. 16/532,391, filed Oct. 21, 2020, 10 pages.
Freilich, Notice of Allowance, U.S. Appl. No. 16/565,247, filed Oct. 15, 2020, 10 pages.
Freilich, Notice of Allowance, U.S. Appl. No. 17/503,023, filed Feb. 24, 2023, 8 pages.
Guieu et al., Notice of Allowance, U.S. Appl. No. 17/521,686, filed Mar. 3, 2023, 8 pages.
Lippincott et al., Notice of Allowance, U.S. Appl. No. 17/959,177, filed Mar. 28, 2023, 9 pages.
Daniel Varga et al., Non-Final Office Action, U.S. Appl. No. 18/123,930, filed Jun. 14, 2023, 7 pgs.
Naveen Goela et al., Non-Final Office Action, U.S. Appl. No. 17/182,083, filed Apr. 27, 2023, 7 pgs.
Naveen Goela et al., Notice of Allowance, U.S. Appl. No. 17/182,083, filed Sep. 20, 2023, 8 pgs.
"Total Carbon Accounting: A Framework to Deliver Locational Carbon Intensity Data", White Paper, Nov. 2021, 29 pages.
Corrected Notice of Allowability, U.S. Appl. No. 15/004,757, filed Aug. 24, 2018, 4 pages.
Corrected Notice of Allowability, U.S. Appl. No. 16/430,336, filed Oct. 15, 2020, 2 pages.
Corrected Notice of Allowability, U.S. Appl. No. 16/917,800, filed Dec. 16, 2021, 2 pages.
Corrected Notice of Allowability, U.S. Appl. No. 16/917,800, filed Nov. 18, 2021, 2 pages.
Corrected Notice of Allowability, U.S. Appl. No. 16/917,800, filed Oct. 25, 2021, 2 pages.
Corrected Notice of Allowability, U.S. Appl. No. 16/943,291, filed Apr. 11, 2022, 2 pages.
Corrected Notice of Allowability, U.S. Appl. No. 16/943,291, filed Feb. 25, 2022, 2 pages.
Corrected Notice of Allowability, U.S. Appl. No. 18/099,854, filed Jun. 5, 2023, 7 pages.
Final Office Action, U.S. Appl. No. 13/084,923, filed Jul. 1, 2013, 10 pages.
Final Office Action, U.S. Appl. No. 15/004,757, filed Dec. 29, 2017, 27 pages.
Final Office Action, U.S. Appl. No. 15/668,665, filed Dec. 10, 2019, 13 pages.
Final Office Action, U.S. Appl. No. 16/952,009, filed Dec. 13, 2022, 9 pages.
Final Office Action, U.S. Appl. No. 18/196,980, filed Mar. 11, 2024, 22 pages.
H. Brendan McMahan et al., "Communication-Efficient Learning of Deep Networks from Decentralized Data," 2017, 10 pages, Proceedings of the 20th International Conference on Artificial Intelligence and Statistics (AISTATS), Fort Lauderdale, Florida, USA.
Ian Goodfellow et al., "Deep Learning," 2016, 798 pages, MIT Press.
IT Services, "Environmental impact of IT: desktops, laptops and screens", How we are reducing IT waste, and steps you can take to reduce your carbon footprint, available online at <https://www.it.ox.ac.uk/article/environment-and-it>, Apr. 13, 2022, 5 pages.
Justin Sutton-Parker, "Can analytics software measure end user computing electricity consumption?", Springer, May 5, 2022, 19 pages.
Justin Sutton-Parker, "Determining commuting greenhouse gas emissions abatement achieved by information technology enabled remote working", The 11th International Conference on Sustainable Energy Information Technology (SEIT), Aug. 9-12, 2021, 9 pages.
Justin Sutton-Parker, Determining end user computing device Scope 2 GHG emissions with accurate use phase energy consumption measurement, The 10th International Conference on Sustainable Energy Information Technology (SEIT), Aug. 9-12, 2020, pp. 484-491.
Justin Sutton-Parker, "Quantifying greenhouse gas abatement delivered by alternative computer operating system displacement strategies", The 12th International Conference on Sustainable Energy Information Technology (SEIT), Aug. 9-11, 2022, pp. 1-10.
Non-Final Office Action, U.S. Appl. No. 12/412,623, filed Mar. 7, 2011, 10 pages.
Non-Final Office Action, U.S. Appl. No. 13/084,923, filed Dec. 9, 2013, 13 pages.
Non-Final Office Action, U.S. Appl. No. 13/084,923, filed Feb. 14, 2013, 8 pages.
Non-Final Office Action, U.S. Appl. No. 13/107,625, filed Jan. 14, 2014, 9 pages.
Non-Final Office Action, U.S. Appl. No. 13/301,250, filed Jun. 26, 2013, 11 pages.
Non-Final Office Action, U.S. Appl. No. 14/530,601, filed Nov. 10, 2016, 8 pages.
Non-Final Office Action, U.S. Appl. No. 14/554,711, filed Jul. 29, 2016, 23 pages.
Non-Final Office Action, U.S. Appl. No. 14/554,739, filed Aug. 26, 2016, 30 pages.

(56) References Cited

OTHER PUBLICATIONS

Non-Final Office Action, U.S. Appl. No. 15/004,757, filed Jun. 21, 2017, 23 pages.
Non-Final Office Action, U.S. Appl. No. 15/004,757, filed Mar. 9, 2018, 57 pages.
Non-Final Office Action, U.S. Appl. No. 15/668,665, filed Aug. 7, 2019, 11 pages.
Non-Final Office Action, U.S. Appl. No. 16/943,307, filed Apr. 27, 2022, 7 pages.
Non-Final Office Action, U.S. Appl. No. 16/952,009, filed Aug. 1, 2022, 8 pages.
Non-Final Office Action, U.S. Appl. No. 17/503,023, filed Nov. 25, 2022, 7 pages.
Non-Final Office Action, U.S. Appl. No. 17/732,402, filed May 21, 2024, 20 pages.
Non-Final Office Action, U.S. Appl. No. 17/751,504, filed Jun. 9, 2023, 31 pages.
Non-Final Office Action, U.S. Appl. No. 17/856,787, filed Apr. 11, 2024, 21 pages.
Non-Final Office Action, U.S. Appl. No. 18/196,980, filed Sep. 8, 2023, 17 pages.
Non-Final Office Action, U.S. Appl. No. 18/225,620, filed Mar. 14, 2024, 14 pages.
Non-Final Office Action, U.S. Appl. No. 14/553,769, filed Feb. 9, 2017, 16 pages.
Notice of Allowability, U.S. Appl. No. 17/751,504, filed Dec. 18, 2023, 11 pages.
Notice of Allowance, U.S. Appl. No. 12/412,623, filed Oct. 5, 2011, 5 pages.
Notice of Allowance, U.S. Appl. No. 13/084,923, filed Jul. 30, 2014, 7 pages.
Notice of Allowance, U.S. Appl. No. 13/107,625, filed Apr. 23, 2014, 7 pages.
Notice of Allowance, U.S. Appl. No. 13/107,625, filed Oct. 22, 2014, 7 pages.
Notice of Allowance, U.S. Appl. No. 13/301,250, filed Jan. 21, 2014, 10 pages.
Notice of Allowance, U.S. Appl. No. 13/301,250, filed Oct. 24, 2014, 8 pages.
Notice of Allowance, U.S. Appl. No. 13/797,962, filed Feb. 17, 2015, 10 pages.
Notice of Allowance, U.S. Appl. No. 14/530,601, filed Apr. 5, 2017, 8 pages.
Notice of Allowance, U.S. Appl. No. 14/553,769, filed May 19, 2017, 6 pages.
Notice of Allowance, U.S. Appl. No. 14/554,711, filed Jan. 27, 2017, 22 pages.
Notice of Allowance, U.S. Appl. No. 14/554,739, filed May 9, 2017, 20 pages.
Corrected Notice of Allowability, U.S. Appl. No. 15/174,850, filed Jul. 25, 2018, 37 pages.
Notice of Allowance, U.S. Appl. No. 15/174,850, filed Jun. 20, 2018, 39 pages.
Notice of Allowance, U.S. Appl. No. 15/215,483, filed Jun. 7, 2018, 9 pages.
Notice of Allowance, U.S. Appl. No. 15/668,665, filed Mar. 2, 2020, 7 pages.
Notice of Allowance, U.S. Appl. No. 15/686,054, filed Jul. 18, 2018, 6 pages.
Notice of Allowance, U.S. Appl. No. 15/702,617, filed Apr. 23, 2019, 24 pages.
Notice of Allowance, U.S. Appl. No. 15/713,518, filed Jul. 29, 2019, 13 pages.
Notice of Allowance, U.S. Appl. No. 15/878,286, filed Jan. 10, 2020, 6 pages.
Notice of Allowance, U.S. Appl. No. 15/930,342, filed Mar. 24, 2022, 8 pages.
Notice of Allowance, U.S. Appl. No. 16/033,131, filed Jun. 30, 2020, 27 pages.
Notice of Allowance, U.S. Appl. No. 16/194,240, filed Aug. 14, 2019, 10 pages.
Notice of Allowance, U.S. Appl. No. 16/194,240, filed Mar. 2, 2020, 9 pages.
Notice of Allowance, U.S. Appl. No. 16/194,240, filed Nov. 7, 2019, 10 pages.
Notice of Allowance, U.S. Appl. No. 16/430,336, filed Aug. 7, 2020, 28 pages.
Notice of Allowance, U.S. Appl. No. 16/430,336, filed Sep. 3, 2020, 5 pages.
Notice of Allowance, U.S. Appl. No. 16/565,247, filed Aug. 17, 2020, 19 pages.
Notice of Allowance, U.S. Appl. No. 16/943,307, filed Nov. 8, 2022, 11 pages.
Notice of Allowance, U.S. Appl. No. 16/943,307, filed Oct. 6, 2022, 12 pages.
Notice of Allowance, U.S. Appl. No. 16/952,009, filed Jul. 25, 2023, 8 pages.
Notice of Allowance, U.S. Appl. No. 16/952,009, filed Mar. 28, 2023, 8 pages.
Notice of Allowance, U.S. Appl. No. 17/001,586, filed Sep. 8, 2022, 8 pages.
Notice of Allowance, U.S. Appl. No. 17/751,504, filed Nov. 21, 2023, 12 pages.
Notice of Allowance, U.S. Appl. No. 17/959,177, filed Jun. 21, 2023, 9 pages.
Notice of Allowance, U.S. Appl. No. 18/099,854, filed May 26, 2023, 12 pages.
Notice of Allowance, U.S. Appl. No. 18/123,930, filed Nov. 7, 2023, 11 pages.
Peter Kairouz et al., "Advances and Open Problems in Federated Learning," 2021, 121 pages, arXIV:1912.04977v3.
Requirement for Restriction/Election, U.S. Appl. No. 12/412,623, filed Nov. 22, 2010, 5 pages.
Requirement for Restriction/Election, U.S. Appl. No. 13/107,625, filed Oct. 11, 2013, 6 pages.
Supplemental Notice of Allowability, U.S. Appl. No. 16/870,742, filed Apr. 11, 2022, 2 pages.
Trevor Hastie et al., "The Elements of Statistical Learning, Data Mining, Inference, and Prediction," 2001, 545 pages, Springer.
Trevor Hastie et al., "The Elements of Statistical Learning, Data Mining, Inference, and Prediction," 2008, 764 pages, Second Edition, Springer.
Non-Final Office Action, U.S. Appl. No. 18/374,621, Aug. 16, 2024, 9 pages.
Non-Final Office Action, U.S. Appl. No. 18/440,922, Sep. 5, 2024, 14 pages.
Non-Final Office Action, U.S. Appl. No. 18/516,882, Aug. 28, 2024, 11 pages.
Notice of Allowance, U.S. Appl. No. 17/683,213, Sep. 16, 2024, 18 pages.
Notice of Allowance, U.S. Appl. No. 18/225,620, Jul. 18, 2024, 7 pages.
Non-Final Office Action, U.S. Appl. No. 18/196,980, Sep. 19, 2024, 24 pages.

\* cited by examiner

DISTRIBUTED DATA ANALYSIS FOR STREAMING DATA SOURCES

RELATED APPLICATIONS

This application is a continuation of U.S. patent application Ser. No. 17/503,023, filed Oct. 15, 2021, which is a continuation of U.S. patent application Ser. No. 16/443,720, filed Jun. 17, 2019, now U.S. Pat. No. 11,153,383, which is a continuation-in-part of U.S. patent application Ser. No. 15/215,474, filed Jul. 20, 2016, now U.S. Pat. No. 10,482,242, titled "System and Method for Performing Event Inquiries in a Network," which claims the benefit of U.S. Provisional Application Ser. No. 62/333,768, filed May 9, 2016, titled "System and Method for Performing Event Inquiries in a Network," and U.S. Provisional Patent Application Ser. No. 62/305,482, filed Mar. 8, 2016, titled "Cost Prioritized Evaluations of Indicators of Compromise." Content of each of the above applications is hereby incorporated by reference in its entirety. This application also claims priority to U.S. Provisional Patent Application Ser. No. 62/813,655, filed Mar. 4, 2019, titled "Distributed Data Analysis for Streaming Data Sources," which is hereby incorporated by reference in its entirely.

This application is related to U.S. patent application Ser. No. 13/797,946, filed Mar. 12, 2013, now U.S. Pat. No. 9,246,977, titled "System and Network Management Using Self-Organizing Communication Orbits in Distributed Networks;" U.S. patent application Ser. No. 12/412,623, filed Mar. 27, 2009, now U.S. Pat. No. 8,086,729, titled "Distributed Statistical Detection of Network Problems and Causes;" U.S. patent application Ser. No. 13/084,923, filed Apr. 12, 2011, now U.S. Pat. No. 8,904,039, titled "Large-Scale Network Querying and Reporting;" U.S. patent application Ser. No. 13/107,625, filed May 13, 2011, now U.S. Pat. No. 8,903,973, titled "Parallel Distributed Network Management;" U.S. patent application Ser. No. 14/553,769, filed Nov. 25, 2014, now U.S. Pat. No. 9,769,037, titled "Fast Detection and Remediation of Unmanaged Assets;" U.S. patent application Ser. No. 14/554,739, filed Nov. 26, 2014, now U.S. Pat. No. 9,769,275, titled "Data Caching and Distribution in a Local Network;" U.S. patent application Ser. No. 15/136,790, filed Apr. 22, 2016, now U.S. Pat. No. 9,910,752, titled "Reliable Map-Reduce Communications in a Decentralized, Self-Organizing Communication Orbit of a Distributed Network;" and U.S. patent application Ser. No. 15/215,483, filed Jul. 20, 2016, now U.S. Pat. No. 10,095,864, titled "System and Method for Performing Event Inquiries in a Network." Content of each of the above applications is hereby incorporated by reference in its entirety. The above applications are also referred to hereafter as "the Related Applications" or "the Incorporated Disclosure."

TECHNICAL FIELD

The present disclosure relates to data collection, analysis, aggregation and reporting in computers and computer networks.

BACKGROUND

Enterprise-level networks (e.g., banking networks, e-Commerce networks, etc.) often consolidate raw data collected from individual endpoints at a data center and process these raw data on demand in response to user queries. These networks have to reserve a large volume of highly accessible storage resource for storing the raw data and maintain powerful processors for accessing and processing the raw data promptly in response to the user queries. While the raw data are repeatedly and dynamically updated and accessed, data communication and management load can be substantial and compromise the processors' ability to implement other applications. Alternatively, the raw data are preprocessed at the individual endpoints before they are communicated to the data center. However, the individual endpoints often have no or little input of context information from servers and/or other endpoints in the networks, which fundamentally limits how much the raw data that can be scaled locally via preprocessing. It would be beneficial to have a more efficient data management mechanism for the enterprise-level networks than the current practice.

SUMMARY

Accordingly, there is a need to manage data (specifically collect, analyze, aggregate and report data) efficiently between individual endpoints and a remote server in a computer network. To that end, a distributed data processing method is provided for a plurality of machines located at a non-static collection of nodes that form a first linear communication orbit. Each node in the first linear communication orbit includes a machine identifier for a respective machine, of the plurality of machines, located at the node, and the nodes in the non-static collection of nodes have self-organized into an ordered sequence in accordance with a predefined order of the respective machine identifiers of the non-static collection of nodes in the first linear communication orbit. One or more servers have a plurality of function modules. Each functional module is configured to receive data related to a core function of the function module from the plurality of machines, distinct from the one or more servers. Each function module includes an internal client configured to perform a set of data processing operations, which are optionally performed on the fly, concurrently while the data related to its core function are collected from the plurality of machines. In some embodiments, the one or more servers have a centralized data management module configured to manage data processing performed by the plurality of function modules. Specifically, the central data management module provides a schema definition to the plurality of function modules, and the internal client of each function module performs the set of data processing operations on the data received from the plurality of machines of the first linear communication orbit according to the schema definition.

The distributed data processing method is implemented, in part, by each function module of the one or more servers. The data processing method includes receiving a data collection instruction. The data collection instruction performed by each function module includes a schema definition that defines distinct first and second data types for data derived from data, of one or more third data types, to be collected from nodes in one or more linear communication orbits, including the first linear communication orbit, and a data structure for organizing data items of the first and second data types. The data processing method performed by each function module further includes generating a data collection request for collecting a plurality of raw data items from a subset of the plurality of machines in the first linear communication orbit according to the schema definition, including identifying each of the plurality of raw data items based on the schema definition. The plurality of raw data items includes the one or more third data types. The data processing method performed by each function module further includes sending the data collection request through the first linear communication orbit to the subset of the plurality of machines. The data collection request propagates from node to node along the first linear communication orbit until reaching each machine in the subset of the plurality of machines. The data processing method performed by each function module further includes, in response to the data collection request, collecting the plurality of raw data items from the subset of the plurality of machines via the first linear communication orbit and analyzing the plurality of raw data items collected from the subset of the plurality of machines. Specifically, the analysis of the plurality of raw data items further includes in accordance with the schema definition, obtaining a first subset of raw data items that have the one or more third data types, deriving a set of data items having the first data type and second data type based on the first subset of raw data items, and organizing the set of derived data items according to the data structure defined in the schema definition. Result data of the analysis include the set of derived data items. The data processing method performed by each function module further includes in accordance with the analysis of the raw data items, storing the result data in a database according to the schema definition.

In some embodiments, the data collection instruction includes a data collection schedule, and the plurality of raw data items are collected from the subset of the plurality of machines via the first linear communication orbit according to the data collection schedule. The result data are reported to a central data management module according to a data reporting schedule. Further, in some embodiments, the data collection instruction includes a data analysis schedule, and the plurality of raw data items collected from the subset of the plurality of machines are analyzed by the respective function module according to the data analysis schedule. Further, in some embodiments, the plurality of raw data items collected from the subset of the plurality of machines includes a respective subset of raw data items provided by each machine in the subset of the plurality of machines. Each machine in the subset of the plurality of machines is configured to cache the respective subset of raw data items according to a data caching schedule and report the respective subset of raw data items to the respective function module according to the data collection schedule.

Further, in some embodiments, the data collection schedule, the data analysis schedule and the data reporting schedule (optional) are each defined: (1) to be periodic with a respective predefined frequency, (2) in accordance with detection of one or more respective predefined types of events, or (3) according to one or more respective specific data queries, or, alternatively, (4) a combination of two or more of such schedules. Specifically, in some circumstances, each of the data caching schedule, the data collection schedule, the data analysis schedule and the data reporting schedule is defined to be periodic and has a respective predefined frequency. A first frequency of the data caching schedule is equal to or greater than a second frequency of the data collection schedule. The second frequency of the data collection schedule is equal to or greater than a third frequency of the data analysis schedule. The third frequency of the data analysis schedule is equal to or greater than a fourth frequency of the data reporting schedule. Alternatively, in some circumstances, a subset of the data caching schedule, the data collection schedule, the data analysis schedule and the data reporting schedule is not periodic. Each machine in the subset of the plurality of machines is configured to cache two or more consecutive raw data items in the respective subset of raw data items according to the data caching schedule, before the two or more consecutive raw data items are collected together by the respective function module according to the data collection schedule. The respective function module is configured to derive two or more consecutive data items of the set of data items based on the at least the two or more consecutive raw data items according to the data analysis schedule, before the two or more consecutive derived data items are reported together to the central data management module according to the data reporting schedule.

In some embodiments, the data caching schedule and the data analysis schedule are each defined to be periodic and has a respective predefined frequency, and the data collection schedule and the data reporting schedule are not periodic. The data processing method performed by the respective function module further includes forwarding a first plurality of user data queries to the plurality of machines of the first linear communication orbit to collect the plurality of raw data items and receiving a second plurality user data queries to report the result data to the central data management module. Raw data items are cached periodically at respective machines in the subset of the plurality of machines, reported to respective function module according to the data collection schedule, and analyzed periodically at the respective function module after being collected thereby.

In some embodiments, the one or more servers are further coupled to an administrator machine. The distributed data processing method further includes at the one or more servers (e.g., at the central data management module), receiving from the administrator machine user inputs defining one or more of: the first data type, the second data type, the one or more third data types, the data structure, the data caching schedule, the data collection schedule, the data analysis schedule and/or the data reporting schedule.

In some embodiments, the first subset of raw data items includes one or more respective raw data items collected from each of the subset of the plurality of machines at a synchronous data collection time. The set of data items includes respective data items, each of which is one of a maximum value, a minimum value, a mean value, a median value, a sum, a sum of a square, a mode, a count, a variance or a standard deviation of the first subset of raw data items. The set of derived data items are stored in association with the synchronous data collection time in the result data according to the data structure. The result data further includes a sequence of derived data items that are associated with a plurality of consecutive data collection times.

In some embodiments, the first subset of raw data items includes a respective raw data item collected from each of the subset of the plurality of machines at a synchronous data collection time, and the set of data items includes a first derived data item. The distributed data processing method further includes for each of the subset of the plurality of machines, determining whether the respective raw data item satisfies a predetermined count condition, and determining the first derived data item based on a number of machines, in the subset of the plurality of machines, that correspond to respective raw data items of the first subset of raw data items satisfying the predetermined count condition.

In some embodiments, the first subset of raw data items includes a set of respective raw data items collected from each of the subset of the plurality of machines at a series of consecutive data collection times within a time window. The set of derived data items includes respective derived data items, each of which is one of a maximum value, a minimum value, a mean value, a median value, a sum, a sum of a square, a mode, a count, a variance or a standard deviation of the set of respective raw data items corresponding to a respective one of the subset of the plurality of machines. The set of derived data items are stored in association with the subset of the plurality of machines in the result data according to the data structure. The result data includes derived data items that are associated with each of the subset of the plurality of machines during the time window.

In some embodiments, the data processing method includes combining two of the sets of derived data items to generate a supplemental data item having a fourth data type, and organizing the supplemental data item with the set of derived data items according to the data structure defined in the schema definition. The result data of the analysis further includes the supplemental data item.

In some embodiments, the data processing method includes obtaining a reference data item, combining one of the set of derived data items with the reference data item to generate a referenced (e.g., derived and referenced) data item having a fifth data type, and organizing the referenced data item with the set of derived data items according to the data structure defined in the schema definition. The result data of the analysis further includes the referenced data item.

In some embodiments, the data processing method includes comparing the first subset of raw data items collected from the subset of the plurality of machines with one or more predefined compliance indicators to generate at least one of the set of derived data items. The at least one of the set of derived data items represents a count of machines in the subset of the plurality of machines that are not compliant with a plurality of predetermined compliance benchmarks.

In some embodiments, the plurality of raw data items collected from the subset of the plurality of machines include one or more of: event information for one or more predefined events occurring at each machine in the subset of the plurality of machines, context information for the respective machine in the subset, and system performance information of the respective machine in the subset. For example, the data collection request defines a time window, and collecting the plurality of raw data items includes collecting event information for at least one event that occurred within the time window for one or more objects identified by a predefined watch list. In some situations, the plurality of raw data items collected from the subset of the plurality of machines include system performance information that includes at least a usage rate of a hard drive of each machine in the subset of the plurality of machines. The data processing method includes comparing the usage rate of the hard drive of each machine in the subset of the plurality of machines with a predefined hard drive usage threshold to generate at least one of the set of derived data items. The at least one of the set of derived data items corresponds to a count of machines in the subset of the plurality of machines that have a substantially low hard drive usage rate.

In some embodiments, the one or more servers are also coupled to a second linear communication orbit that is distinct from the first linear communication orbit. The data processing method performed by each function module further includes, at the internal client of each function module, generating a second data collection request for collecting a second plurality of raw data items from a subset of a second plurality of machines in the second linear communication orbit according to the schema definition, sending the second data collection request through the second linear communication orbit, in response to the data collection request, collecting the second plurality of raw data items from the subset of the second plurality of machines via the second linear communication orbit, and analyzing the second plurality of raw data items collected from the subset of the second plurality of machines. The analysis further includes in accordance with the schema definition, obtaining a second subset of raw data items that have the one or more third data types and deriving a second set of data items having the first data type and second data type based on the second subset of raw data items.

Further, in some embodiments, the set of derived data items obtained from the first subset of raw data items collected from the first linear communication orbit includes a first set of derived data items. The first set of derived data items and the second set of derived data items are aggregated and organized at the respective function module according to the data structure defined in the schema definition. Both the first set of derived data items and the second derived data set are stored in the database of the one or more servers according to the schema definition.

In some embodiments, the one or more servers are coupled to a first front server and a second front server. The first front server is coupled to the first linear communication orbit and configured to collect the plurality of raw data items from the first linear communication orbit. The second front server is coupled to a third linear communication orbit and collect a third plurality of raw data items from the third linear communication orbit. The respective function module is configured to consolidate result data that are derived from the raw data items collected by the first and second front servers and store the consolidated result data in the database. In some embodiments, third result data are derived by the respective function module from the third plurality of raw data items collected from the third linear communication orbit in response to the data collection instruction received from the one or more servers.

In some embodiments, the data collection request includes a first encryption key for encrypting the plurality of raw data items at the subset of the plurality of machines before the plurality of raw data items are collected by the one or more servers, and the one or more servers possess a first decryption key corresponding to the first encryption key.

In some embodiments, the schema definition includes a grouping criterion associated with a data group. The data processing method performed by the respective function module includes in accordance with a determination that a subset of the set of derived data items satisfy the grouping criterion, associating by the respective function module each derived data item in the subset of the set of derived data items with a group identifier of the data group.

In some embodiments, the distributed data processing method further includes receiving a user input of at least one machine characteristic. The subset of the plurality of machines from which the plurality of raw data items is collected is configured to be identified based on the at least one machine characteristic.

In some embodiments, the one or more servers are further coupled to an administrator machine. The distributed data processing method further includes at the one or more servers, receiving from the administrator machine a data collection command to collect the first and second data types of data derived from the raw data items, of the one or more third data types, collected from nodes in the one or more linear communication orbits. The administrator machine can be configured to receive user inputs that define a data collection schedule, a data analysis schedule and the first and second data types of derived data. The distributed data processing method further includes generating the data collection instruction based on the user data collection command.

In some embodiments, each of the plurality of raw data items is propagated from node to node along the linearly ordered communication orbit when it is collected from a respective node of the subset of the plurality of machines. The distributed data processing method further includes at an intermediate node among the non-static collection of nodes forming the first linear communication orbit, receiving a respective subset of the plurality of raw data items provided by one or more upstream machines on the first linear communication orbit, identifying one or more local raw data items, combining the one or more local raw data items with the respective subset of the plurality of raw data items, and passing the combined raw data items to an adjacent node that is located downstream of the intermediate node.

In some embodiments, the data processing method performed by the respective function module includes storing the first subset of raw data items in a cache or memory of the one or more servers and after deriving the derived data items or after storing the result data in the database, deleting at least the first subset of raw data items from the cache or memory of the one or more servers.

In some embodiments, the data collection instruction includes one or more filters specifying the subset of the plurality of machines, from which the plurality of raw data items is collected, according to at least one machine characteristic, and the respective node corresponding to each of the subset of the plurality of machines is configured to be self-identified as belonging to the subset based on the one at least one machine characteristic in response to the data collection instruction.

In some embodiments, the one or more servers include a data management module coupled to the plurality of function modules, and the central data management module is configured to store the result data in a central storage associated with the data management module and provide a subset of the result data stored in the central storage in response to a user query.

In one aspect, a server system is configured to analyze data for a plurality of machines located at a non-static collection of nodes that form a first linear communication orbit. The server system includes one or more processors and memory having instructions stored thereon, which when executed by the one or more processors cause the server system to perform the above data processing method.

In another aspect, a non-transitory computer-readable medium has one or more programs stored thereon. The one or more programs when executed by one or more processors of a server system, cause the server system to perform operations for analyzing data for a plurality of machines located at a non-static collection of nodes that form a first linear communication orbit. The one or more programs further include instructions for performing the above data processing method.

Other embodiments and advantages may be apparent to those skilled in the art in light of the descriptions and drawings in this specification.

BRIEF DESCRIPTION OF THE DRAWINGS

Like reference numerals refer to corresponding parts throughout the drawings.

DESCRIPTION OF EMBODIMENTS

Figure 1A:
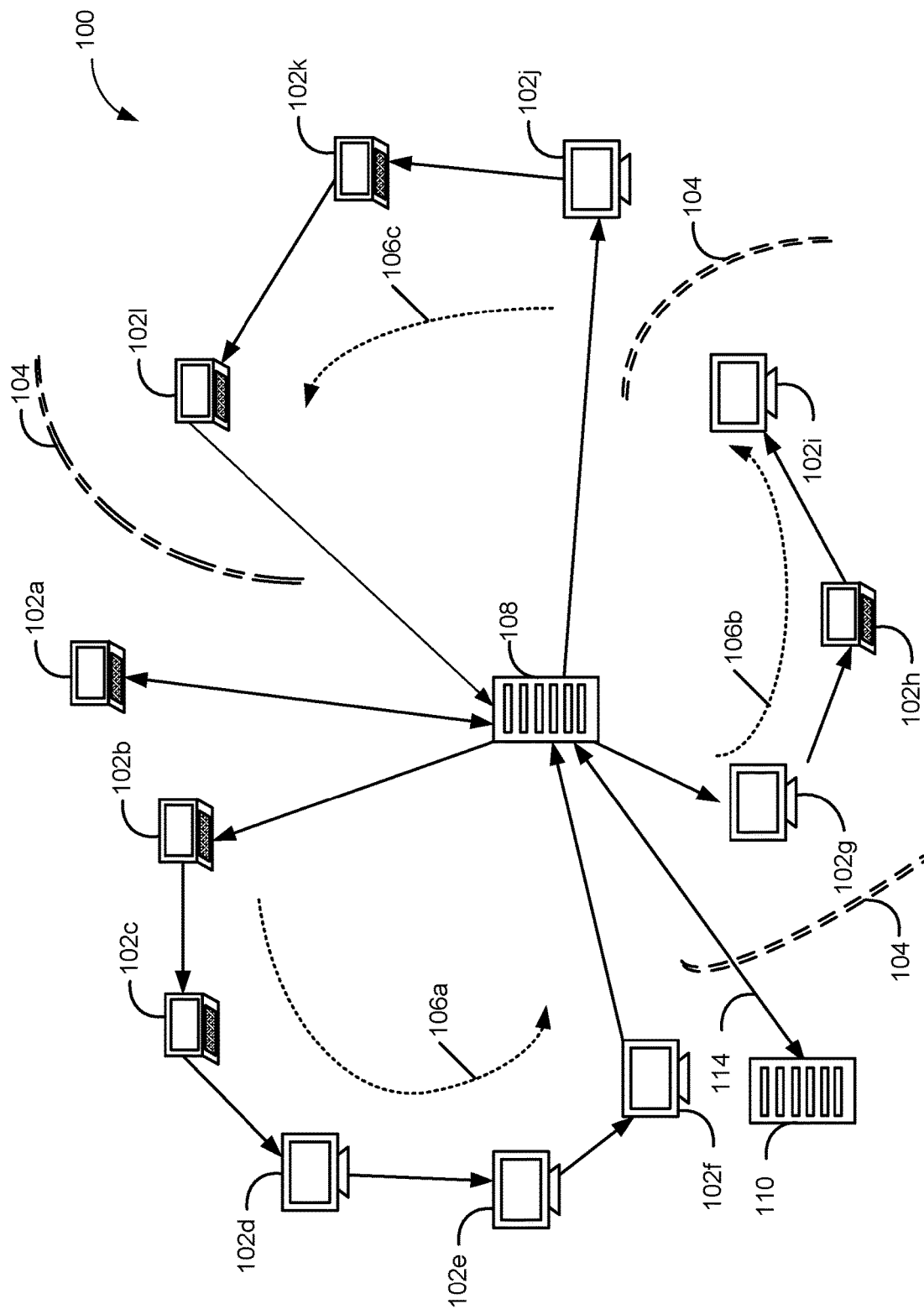
FIG. 1A illustrates a computer network organized into linear communication orbits in accordance with some embodiments.

Some methods and devices described in the present specification improve data collection, analysis, aggregation and reporting in a large scale computer network by distributing a data processing task among different modules of a server system, such as a central data management module and a plurality of function modules. Each function module of the server system takes advantage of the linear communication orbit to communicate a data collection request to and collect raw data from a plurality of machines located at a non-static collection of nodes (also called endpoints) of the linear communication orbit. In various embodiments of this application, each function module has a core function and can be reconfigured by the central data management module of the server system, such as by installing an internal client configured to receive a schema definition from the central data management module and adaptively shape the data collection request targeted at the linear communication orbit. By these means, individual endpoints in the linear communication orbit can efficiently identify and return the raw data items to the internal client of the function module. Each module function of the server system further analyzes the raw data items collected from the linear communication orbit adaptively based on the schema definition before it reports result data of the analysis to the central data management module. For example, the module function derives data items based on statistics of the collected raw data items and organizes the derived data items according to the data structure defined in the schema definition, thereby partially consolidating the raw data items collected from individual endpoints of one or more linear communication orbits in context of a collection of endpoints on the same computer network and allowing the central data management module to continue processing of the partially consolidated data items more efficiently on a large scale.

In some embodiments, data collection, analysis and reporting can be flexibly implemented at each function module of the server system according to a predefined (e.g., server specified) periodic schedule, in accordance with detection of one or more respective predefined types of events, or according to one or more respective specific data queries. In contrast, data caching at each endpoint of the linear communication orbit is optionally defined by a separate data caching request independently of the data collection instruction. Raw data items are cached at each endpoint of the linear communication orbit according to a predefined schedule (periodic or not) or in response to detection one or more predefined types of events, which in some embodiments is independent of data collection, analysis and reporting at the server system.

In some embodiments, a respective derived data item includes one of a maximum value, a minimum value, a mean value, a median value, a sum, a sum of a square, a mode, a count, a variance or a standard deviation of a subset of the collected raw data items. For example, the respective derived data item can be a mean value of raw data items that are collected from a set of endpoints at a synchronous data collection time or a mean value of raw data items that are collected at a single endpoint at consecutive data collection times within a time window. In some implementations, the derived data item is a count of machines whose raw data items satisfy a predetermined count condition, e.g., a number of machines having a respective hard drive usage lower than a predefined hard drive usage threshold at a data collection time. Further, in some situations, a count of machines is determined by a function module of the server system by excluding machines that do not satisfy the predetermined count condition. Alternatively, in some embodiments, the derived data items are distinct from a count of machines, and the function module of the server system continues to store derived data items until a sufficient number of machines satisfy the predetermined count condition.

It is noted that the derived data items generated at a function module of the server system are organized according to a data structure specified in the schema definition. In some embodiments, the schema definition includes a grouping criterion associated with a data group identified by a group identifier. After generating the derived data items, the function module of the server system automatically associates each of a subset of derived data items with the group identifier of the data group in accordance with a determination that the respective derived data item or the corresponding endpoint satisfies the grouping criterion. For example, machines at a subset of endpoints have the Windows operating system (Windows OS), and the server system automatically associates the derived data items corresponding to these machines with a group identifier identifying the Windows OS. As such, the server system can conveniently identify the subset of derived data items by their group identifiers.

Some methods and devices described in the present specification are directed to analyze a stream of raw data items at a function module of the server system in real time (i.e., on the fly), or with low latency, while the raw data items are collected from endpoints of a linear communication orbit coupled to the server system. As a result of the analysis, the function module of the server system is configured to produce periodic statistical histograms of a mean, median, mode, standard deviation, or count of at least some of the collected raw data items. Optionally, the function module uses a linear and logistic regression, determines a cluster membership, and applies a predetermined machine learning model. Result data of the analysis are sent to a central storage that is coupled within or to a central data management module of the server system. The result data are therefore prepared for further processing at the center data management module, e.g., on a larger scale. The central data management module is dedicated to managing data generated from core functions of different function modules. Stated another way, analysis of raw data items is moved away from the endpoints or a single module in the server system, and instead is distributed among different modules of the server system (i.e., between the central data management module and individual function modules) for the purposes of improving fault tolerance, execution time and contextual awareness of data consolidation in a large scale network. In some embodiments, after part of the analysis of the raw data is completed at the function module, or after result data is sent to the central data management module, the corresponding raw data are discarded so as to reduce the amount of data locally stored at the corresponding functions module, thereby sparing the amount of local storage space needed at the function module and enhancing an overall operating efficiency of the server system.

Linear communication orbits are described below with reference to FIG. 1A. FIG. 1B illustrates a schematic diagram of a direct duplex connection between a node in a linear communication orbit and a remote server. FIGS. 2A-2B provide details concerning a corresponding data collection, analysis and reporting process implemented in a single linear communication orbit in response to a data collection request. Processes for collecting raw data items from two or more linear communication orbits in a consolidated manner, are described with reference to FIGS. 3 and 4. FIG. 5 provides more details concerning a data management module and function modules that collaborate with each other to process data collected from a linear communication orbit. FIGS. 6A-6D are block diagrams of machines in a network or machines interacting with a network (e.g., a client node, a server system, a front server and an administrator machine). FIGS. 7A-7I illustrate a flow chart of a distributed data processing method implemented by a server system.

Figure 1B:
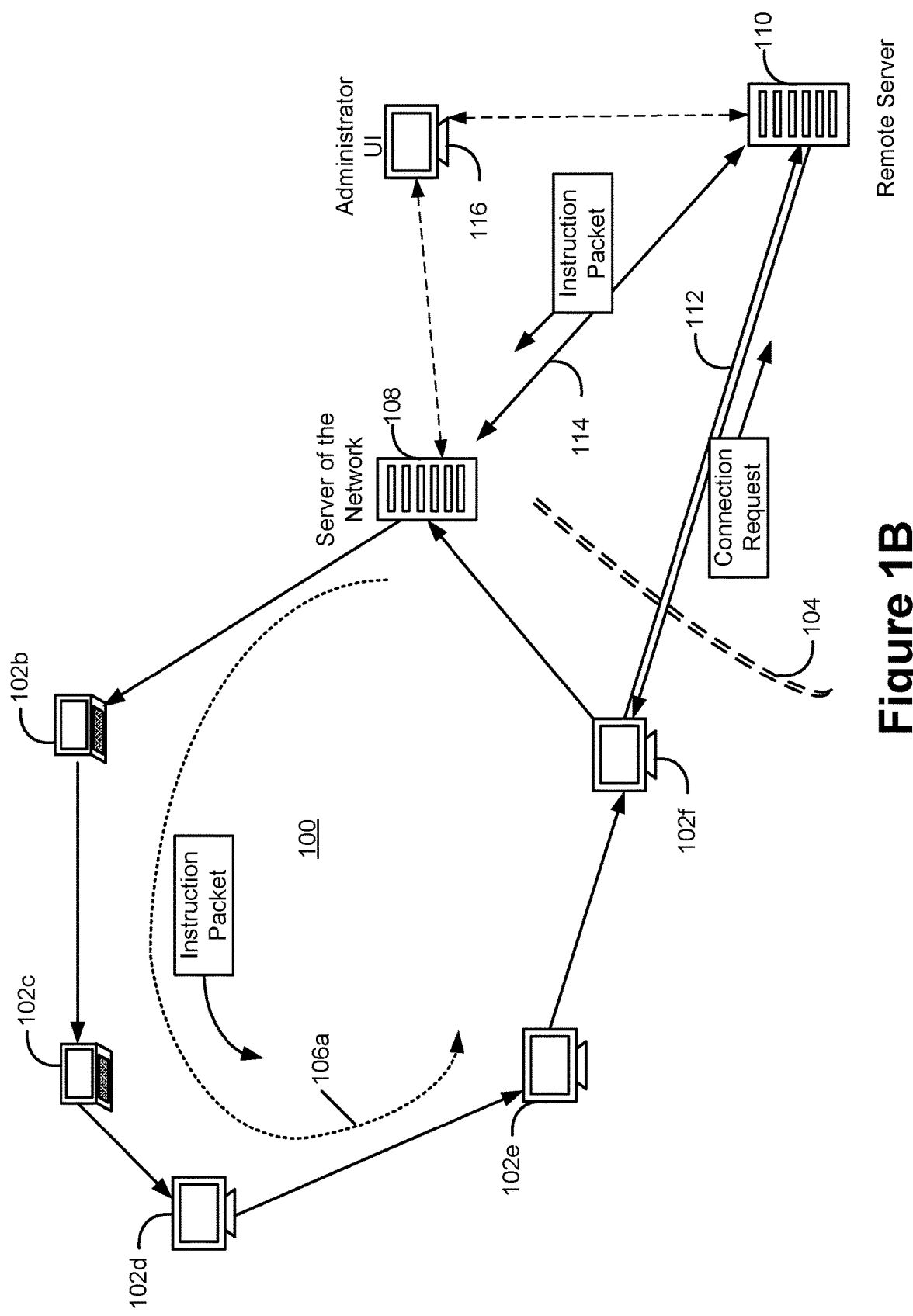
FIG. 1B illustrates that a remote server communicates directly with a respective node over direct duplex connection in accordance with some embodiments.
Figure 2A:
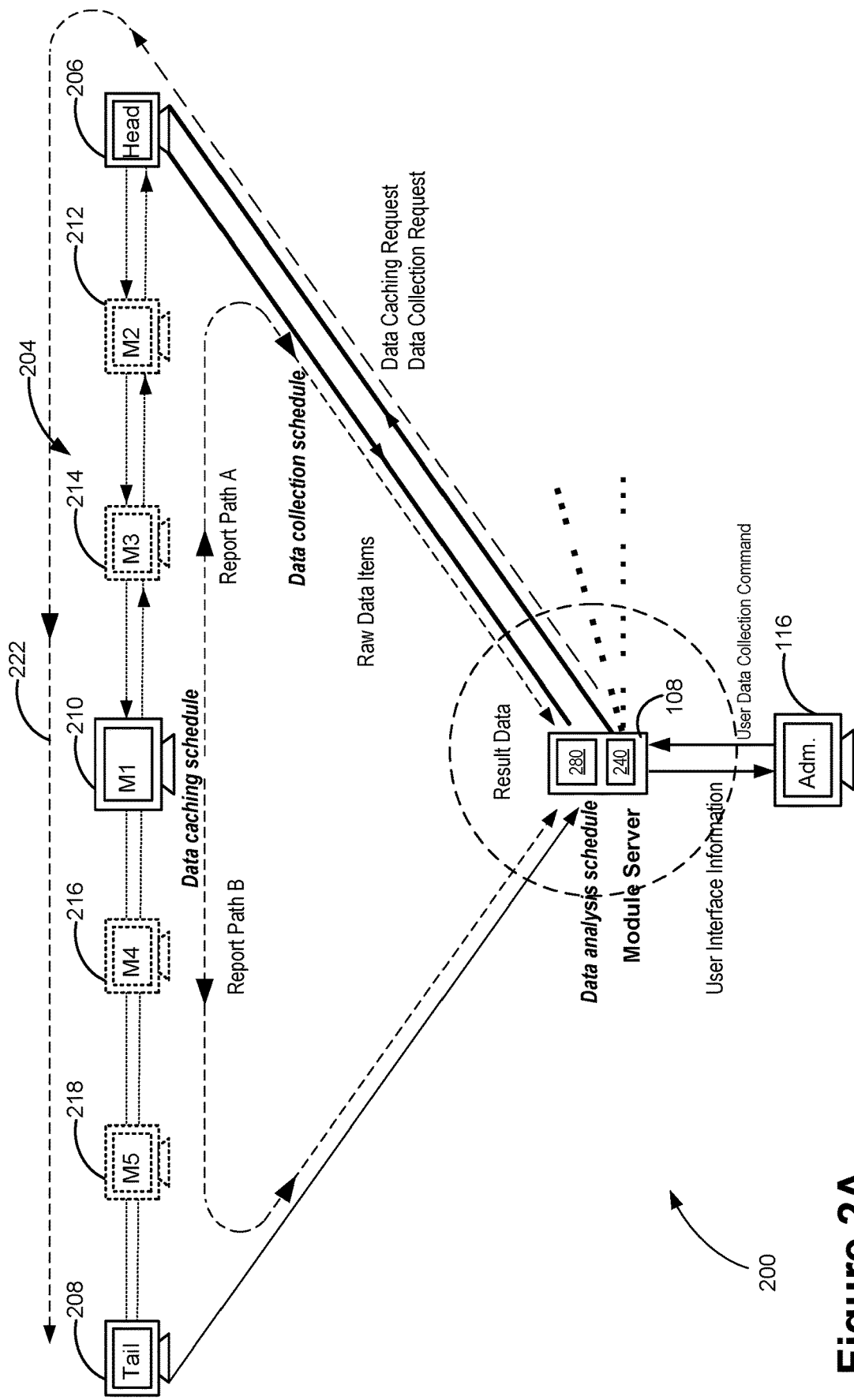
FIG. 2A illustrates an example process of requesting and consolidating raw data items provided by a plurality of machines located at a non-static collection of nodes in a linear communication orbit in accordance with some embodiments.
Figure 2B:
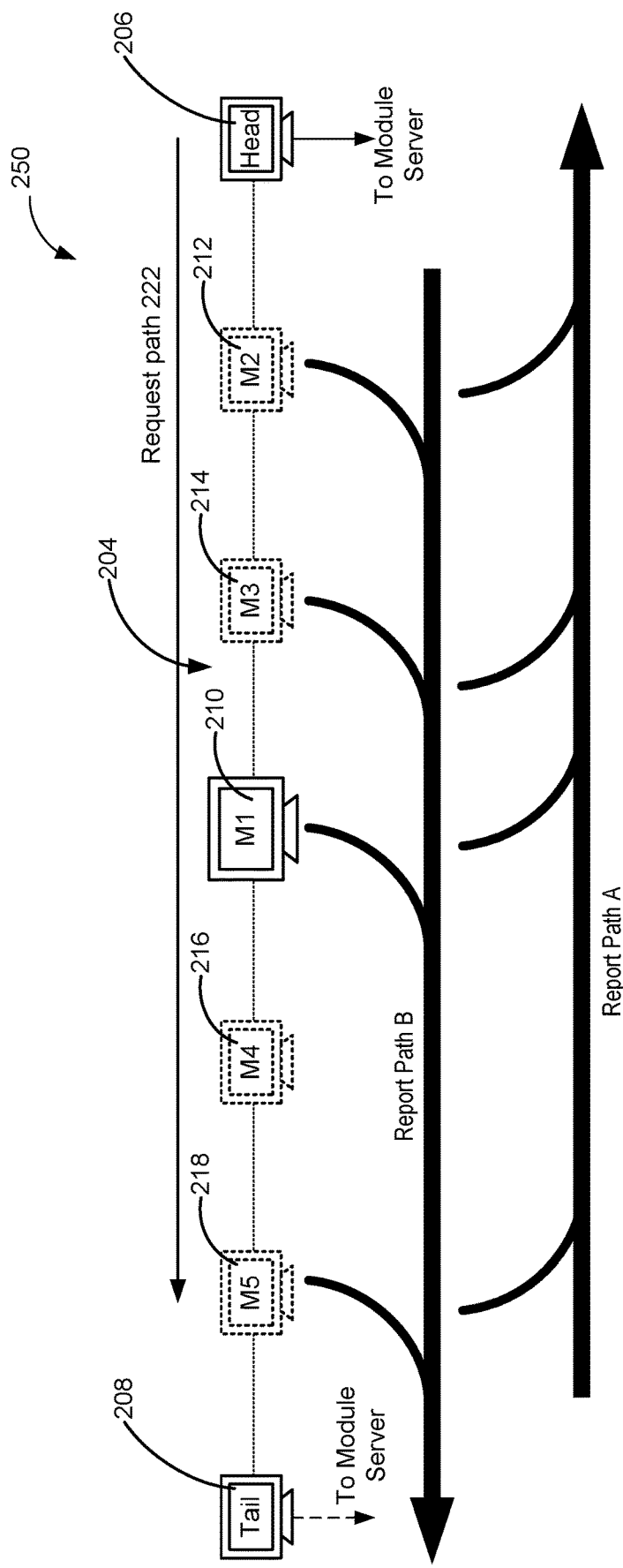
FIG. 2B illustrates an example process of returning raw data items by a plurality of machines located at a non-static collection of nodes in a linear communication orbit in response to a data collection instruction in accordance with some embodiments.

FIG. 1A illustrates a computer network organized into linear communication orbits, in accordance with some embodiments. More specifically, FIG. 1A illustrates a managed network 100 comprising a plurality of interconnected machines or nodes 102 (including 102a-1), e.g., computers, servers, mobile devices, and other networked devices that are arranged into one or more linear communication orbits. In some embodiments, the network monitoring methods described herein, or portions of those methods, are performed at one or more nodes (e.g., node 102, see FIGS. 1A and 1B) of a linear communication orbit. In some embodiments, the methods described herein, or portions of those methods, are performed at a remote server (e.g., remote server 110) that is not part of network 100 and is optionally separated from network 100 by a firewall 104, see FIGS. 1A and 1B). In some embodiments, the methods described herein, or portions of those methods, are performed at an administrator machine (e.g., administrator machine 116 that interacts with one or more nodes 102 through server 108 of the network and/or remote server 110, see FIG. 1B).

The linear communication orbit structure shown in FIG. 1A is an alternative to the conventional hub-and-spoke or hierarchical architecture for managed networks. However, in some embodiments, the network monitoring methods described herein are performed at one or more nodes/servers of a hub-and-spoke network, where the remote server 110 sends the instruction packet to a respective node 102 through server 108 of the hub-and-spoke network or the top node of hierarchical architecture, and optionally allows the respective node 102 to initiate the outbound connection request to the remote server. However, in such cases, much of the benefit and efficiency of the linear communication orbit may be lost.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 of a single linear communication orbit. In some embodiments, each contiguous segment 106 constitutes a respective linear communication orbit.

In some embodiments, managed network 100 also includes server 108 (sometimes called server system 108, which includes one or more servers) that facilitates the creation and maintenance of the one or more contiguous segments 106. The server 108 may be relatively lightweight, and may be elected from machines 102 in the network.

In some embodiments, as shown in FIG. 1A, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., machine 102*g* and machine 102*f*) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each machine 102 joining network 100 is equipped with (or provided with) a set of predetermined rules. According to the set of predetermined rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of rules, and each machine directly interacts only with its immediate neighbor machines to facilitate the formation of the orbit, the rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

Server 108 includes a plurality of function modules, each of which is configured to request and receive data related to a respective core function from respective nodes of linear communication orbit 106. In accordance with some embodiments, server 108 further includes a data management module that instructs the plurality of function modules to perform data collection and preliminary data processing on data cached at nodes of linear communication orbit 106. Specifically, each function module includes an internal client that is subject to the control of the central data management module and is configured to perform a set of data processing operations (e.g., data analysis and reduction operations) while collecting the data related to its core function from machines on one or more linear communication orbits. As such, the central data management module can control data collection, analysis, aggregation and reporting related to the respective core function of each function module via the internal client of the function module.

In some embodiments, the central data management module sends a respective function module (specifically, the internal client of the function module) a data collection message including a data collection instruction. The data collection instruction further includes a schema definition that defines (1) distinct first and second data types for data derived from one or more third data types for data to be collected from nodes in linear communication orbits 106 and (2) a data structure for organizing data items of the first and second data types. The function module of server 108 translates the data collection instruction to a data collection request for adaptively collecting a plurality of raw data items from a subset of the plurality of machines (e.g., machines have a particular operating system or other specified characteristics) from respective linear communication orbit 106 according to the schema definition. The data collection request is propagated from node to node through respective linear communication orbit 106 to the subset of the plurality of machines. In response to the data collection request, the function module of server 108 collects the plurality of raw data items from the subset of the plurality of machines via linear communication orbit 106, and locally analyzes the collected raw data items before reporting result data to the central data management module. In particular, the collected raw data items are analyzed and organized based on the schema definition by the function module, and therefore, the result data is a structured data set when they are reported to the central data management module.

In some embodiments, when the data collection request is propagated through a linear communication orbit 106, each machine 102 receives a communication message (e.g., a message including a question part, and an answer part) from its upstream neighbor node, and acts upon the message by providing an update to the message based on its local state or information, performing some aggregation of the information in the message (e.g., by adding to or modifying aggregated results already included in the message as received from its upstream neighbor), and/or forwarding the message (including the question part and the answer part having raw data items) to its downstream neighbor node along the linear communication orbit. Essentially, each machine expends a small amount of resources to take on a small part of the duties of data aggregation without being overly burdened. In a threat management scenario, in some embodiments, the query part of a message may include a request for evaluating an indicator item (e.g., "Is a file with a filename [VIRUS-NAME].EXE present?"), and the answer part may be a hit counter (e.g., a counter for "yes" answers) or log to which a node can append its unique identifier (ID) if the result of the evaluation is a hit (e.g., a "yes" or "TRUE" answer). In some embodiments, instructions for a remedial action (e.g., an executable script) and criteria for determining which nodes should execute the instructions for the remedial action (e.g., IDs or characteristics of the affected node(s)) may be included in a communication message and propagated along the linear communication orbit (see FIG. 1A) or through a direct duplex connection (see FIG. 1B). A node fitting the criteria will execute the remedial action when it receives the communication message.

In an example, one of the function modules of server 108 (e.g., a patch module) generates a data collection request to collect raw data items for the purposes of monitoring whether software patches are missing in a linear communication orbit 106. In response to the data collection request, an agent software installed on each designated node of linear communication orbit 106 is enabled to collect information about critical software patches and return listing information concerning available patches on the respective node (e.g., "Machine1234,3,PatchA1|PatchB1|PatchC2"). The patch module filters this listing information by reviewing group memberships retrieved from an external configuration management database to determine which nodes are relevant to a specific project, and records one or more statistical values (e.g. a minimum, mean, count, or maximum exposure of a group of nodes involved in the specific project) based on the collected raw data items. These statistical values are reported to a data management module and consolidated at a central storage, and used to determine a ratio of exposure to protection and an overall risk score (e.g., "ProjectAFrontEndRisk=0.3") for nodes in a corresponding computer network. In some implementations, such group-based statistics and project-wide ratios are used by the data management module to provide forecasts and trend-based alerts, such as "the overall risk level for Project A is remarkably high compared to other Wednesday mornings."

In another example, an administrator machine instructs another one of the plurality of function modules (e.g., a software deployment module) to assign a software deployment task to a group of machines. In each linear communication orbit 106, each machine evaluates their need for the software package and stores a respective status locally. The software deployment module issues a data collection request for collecting the deployment statuses of the machines in the linear communication orbit 106. Using that information, a subset of machines is identified (e.g., by the software deployment module) for software deployment, a software package is downloaded to those machines, and those machines report their deployment statuses to the software deployment module of server 108. As the software package is downloaded and begins to be installed on the identified subset of machines, raw data, comprising the deployment statuses on these machines, is periodically sent to the software deployment module of server 108. When the machines in the subset of machines complete the installation (successfully or unsuccessfully), the deployment statuses are sent to the software deployment module of server 108 again (e.g., in response to a predefined event, or at a scheduled time), e.g., using results codes (such as, "user-canceled," "failed," "succeeded," "reboot-required", and "unknown"). Optionally, the software deployment module associated with the linear communication orbit 106 regularly re-evaluates their need for the software package by analyzing the raw data, and reports result data summarizing the deployment statuses of machines on linear communication orbit 106.

In some embodiments, the software deployment module, using the collected deployment status information, derives result data, e.g., distributions of each type of deployment status in an identified set of machines. The distributions of each type of deployment status are regularly analyzed by the software deployment module on server 108. The software deployment module reports these results to a central data management module throughout the life cycle of the software deployment task. The result data can then be consolidated for multiple linear communication orbits 106 and used by the data management module of server 108 to produce a consolidated deployment status report. The result data can also be used to produce a relative speed report (how quickly a given deployment job reaches predetermined milestones of completion, e.g., an installation success rate of 5%, 20%, 35%, 50%, 65%, 80%, 95%, and 100%). The relative speed reports for different software deployment tasks can be stored in central storage, allowing comparison of different deployment tasks, for example with respect to success rates and deployment speeds.

Further, in an example, an administrator machine instructs one of the plurality of function modules (e.g., a security management module) to load a set of security rules defining a breach of a security policy and distribute the set of security rules to endpoints in one or more linear communication orbits 106. As each designated endpoint evaluates whether it breaches the security policy, the respective endpoint returns to the security management module of server 108 statements of match level as raw data items, e.g., "Machine1234, Rule1,3,FileA.docx: 12hits,FileB.xlsx:34,FileC. pptx:56." A corresponding policy evaluation module on server 108 analyzes these raw data items (e.g., the statements of match level) into an exposure risk model that estimates a risk level for each machine and ranks affected machines in an order of attention. That said, data items derived from the raw data items include the risk level and order of attention, which are estimated based on a number of hits, a number of hits per file, and a rank of a corresponding rule. This policy evaluation module regularly reports the derived data items including the risk levels per computer grouping into a central data management module in server 108. These recorded risk levels are then used to produce relative rankings and exposure charts per computer group on demand.

In some embodiments of this application, raw data items collected from individual nodes of one or more linear communication orbits 106 are analyzed and organized at each individual function module of server 108 according to a schema definition before they are reported to a central data management module. Context information related to nodes of linear communication orbits 106 and specific operations of each function module is readily available and considered when the respective function module analyzes and organizes raw data items collected from a specific node located on any of these linear communication orbits 106. This enables context-based and real-time data analysis of the raw data items by the function module, while reducing the scale of data being reported to an analyzed by the central data management module at server 108. Respective function modules are tasked with (e.g., by instructions from the central data management module) data analysis and consolidation of raw data that are collected from nodes of a number of communication orbits and related to operations of the respective function modules. The central data management module is thereby freed from managing a large number of raw data items, which requires large amounts of storage, communication and processing resources. By implementing distributed data processing in a network configuration, having separate function modules and data management module, context-based data analysis is facilitated while reducing the scale of data reported to the central data management module and the resources needed to enable such data reporting.

FIG. 1B illustrates that, in some embodiments, remote server 110 communicates (e.g., sends messages and/or queries) directly with a respective node (e.g., node 102f) over direct duplex connection 112 (e.g., a WebSocket connection). Various methods are provided herein for establishing direct duplex connections between remote server 110 and nodes 102 in a linear communication orbit. Direct duplex connection 112 is particularly useful when a remote server needs to take a deep-dive into a respective node in the network (e.g., to carry out frequent back and forth interactions and/or to transfer large amount of local event data and/or deploy a security patch), rather than investigating the network at-large. The messages and/or queries can be analogous to those described above, but they are sent directly to the respective node via direct duplex connection 112 (rather than being propagated through linear communication orbit 106a), and without the communication needing to be bridged by server 108. In some embodiments, remote server 110 can communicate with the respective node either through direct duplex connection 112 (e.g., when remote server 110 wants to query only the respective node) or through linear communication orbit 106a (e.g., when remote server 110 wants an aggregated response to a query from some or all of the nodes 102 in the linear communication orbit 106a).

As described herein, the direct duplex connection between a particular node and remote server 110 is established with the particular node as the initiating party. In other words, from the perspective of the network, the connection is established with an outbound connection request sent from the node, rather than with an inbound connection request sent from the remote server. When the direct duplex connection is established with an outbound connection request sent from the node (e.g., the node sends the initial connection request in the connection establishment protocol (e.g., the handshake request in establishing a WebSocket connection)), there is no need to open the firewall of the network, which would expose the network to outside security risks.

In some embodiments, in order to prompt a particular node to initiate the connection request for a direct duplex connection, remote server 110 sends a message or instruction packet to the particular node (e.g., node 102f) through a server of the network (e.g., server 108) and has the message or instruction packet propagated to the particular node through the linear communication orbit (e.g., linear communication orbit 106a). The message or instruction packet contains instruction and necessary data (e.g., public certificate for encryption, IP address, port #) for the particular node to establish the direct point-to-point persistent connection (e.g., a WebSocket connection) with the remote server. When the particular node receives the instruction packet from its upstream node, the particular node initiates the outbound connection request to the remote server. After the remote server receives the connection request from the particular node, the remote server and the node can proceed to establish the duplex connection according to the connection protocol.

In some embodiments, the instruction packet can be dispatched to one or more particular nodes at the command of a network administrator or security incident responder. For example, the network administrator uses an administrator machine 116 to connect to remote server 110 (e.g., via a web interface or a client application provided by a service provider associated with the remote server 110) and manually selects the particular nodes using a network monitoring user interface. In some embodiments, the network monitoring user interface provides other functions, such as reviewing and modifying indicators of compromises (IOCs), queries, event artifacts, metrics and statistics for IOC evaluations and query responses, and performing sandbox investigation, etc.

In some embodiments, an event recorder is deployed on each node in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator machine can send the questions to the server of the network and the questions may be packaged in query messages and propagated to the nodes through the server of the network. Each node along the linear communication orbit will be able to quickly respond to these questions based on the past event data stored in their respective local event databases. After the answers have been collected from all relevant nodes in the network, the server of the network forwards the answers back to the administrator machine.

In some embodiments, after a direct duplex connection has been established between a particular node and the remote server, the administrator can also query the local event database of the particular node through the direction duplex connection. In addition, the administrator can take a snapshot of the local event database on the particular node and have it uploaded to the remote server, so that in-depth analysis regarding the particular node may be performed at the remote server (e.g., according to instructions provided by the administrator to the remote server).

In some embodiments, after a direct duplex connection has been established between a particular node and the remote server, the administrator can collect process artifacts from the particular node based on event history and file references for an event of interest identified by the administrator. The administrator can make a copy of the collected process artifacts and corresponding metadata (e.g., OS version, memory, installed apps, usernames, etc.) describing the local environment of the particular node, and use them to create a sandbox (e.g., choose the same operating environment as the particular endpoint machine and add the necessary files and libraries from the collected process artifacts) and recreate the past event(s) in the sandbox for investigation purposes.

In some embodiments, based on the in-depth analysis performed on a particular node, the administrator can select particular events or artifacts of interest in the network monitoring user interface and, in response, be presented with a set of sample questions that can be dispatched to the network for a network-wide analysis. The set of sample questions can be automatically generated based on existing question templates and indicator values that are found on the particular node. The automatic generation of the questions facilitates the investigative process of the administrator, and relieves the administrator from having to create the questions one by one from scratch. In some embodiments, the questions and IOCs for detecting a particular threat or event of interest can be refined (e.g., made more efficient or streamlined) based on the answers collected from the network.

FIG. 2A illustrates an example process 200 of requesting and consolidating raw data items provided by a plurality of machines 206-218 located at a non-static collection of nodes in a linear communication orbit 204 in accordance with some embodiments, and FIG. 2B illustrates an example process 250 of returning raw data items by a plurality of machines located at a non-static collection of nodes in a linear communication orbit 204 in response to a data collection instruction in accordance with some embodiments. Each machine of the plurality of machines 206-218 has a respective machine identifier, and the plurality of machines have self-organized into an ordered sequence in accordance with a predefined order of the respective machine identifiers of the plurality of machines 206-218. A server system 108 (including one or more servers 108) is coupled to linear communication orbit 204, in this example at a head node 206 of the linear communication orbit 204. In addition to head node 206, linear communication orbit 204 further includes a tail node 208 and a plurality of intermediate machines (e.g., machines M1-M5) 210-218 which are coupled between head node 206 and tail node 208. While intermediate machines 210-218 illustrate the configuration of linear communication orbit 204, in some embodiments, linear communication orbit 204 includes only one intermediate machine, while in other embodiments, it includes dozens, hundreds or even thousands of intermediate machines.

Server system 108 includes a central data management module 240 (also herein called data management module 240) and a plurality of function modules 280, each of which includes one or more programs for execution by the one or more processors of a server system 108. A function module 280 receives a data collection instruction from central data management module 240, and generates a data collection request based on the data collection instruction. The data collection instruction includes a schema definition for result data that need to be derived from raw data collected from nodes in one or more linear communication orbits including linear communication orbit 204. Specifically, in some embodiments, the schema definition specifies distinct first and second data types for result data, one or more third data types for raw data from which the result data are derived, and a data structure for organizing the result data items of the first and second data types. Alternatively, in some implementations, the schema definition specifies the distinct first and second data types for the result data and the corresponding data structure, but not the one or more third data types for the raw data from which the result data are derived. Rather, function module 280 identifies the one or more third data types for the raw data based on the distinct first and second data types for the result data.

In some embodiments, the data collection request generated by function module 280 of server system 108 includes information for the one or more third data types for the raw data. The information is received by function module 280 or determined locally by function module 280. In some situations, the data collection request generated by function module 280 includes the distinct first and second data types for the result data, and when it is sent to nodes in linear communication orbit 204, a respective machine at each node determines the one or more third data types for the raw data based on the distinct first and second data types for the result data.

In addition, the data collection request includes information identifying a subset of the plurality of machines in linear communication orbit 204, such that when the corresponding data collection request is sent along linear communication orbit 204, the subset of the plurality of machines is self-identified and responds to the request by returning raw data items of the one or more third types according to the schema definition. That said, in an example, the data collection request includes one or more filters specifying the subset of the plurality of machines, from which the plurality of raw data items are collected, according to at least one machine characteristic (e.g., the operating system executed by the machine, or the presence of a specific software application at the machine). The machines in the linear communication orbit are configured to self-identify as belonging, or not belonging, to the subset of the plurality of machines based on the one or more filters included in the data collection request and one or more machine characteristics of each of those machines.

After the data collection request is generated by function module 280, it is sent through linear communication orbit 204 to the subset of the plurality of machines 206-218. The data collection request propagates from node to node along linear communication orbit 204 at least until reaching each machine in the subset of the plurality of machines. Specifically, the data collection request is provided to head node 206 by function module 280, and propagates from node to node along a request path 222 following linear communication orbit 204 until reaching a respective node corresponding to a machine in the subset of the plurality of machines requested to provide the raw data of the one or more third types. Each machine in the subset of the plurality of machines is configured to find raw data items of the one or more third types locally in response to the data collection request. The computational machine (e.g., computational machines 210) at the respective node optionally continues to pass the data collection request to other downstream machines (e.g., computational machines 208, 216 and 218) on the linear communication orbit 1002, or alternatively forgoes passing the data collection request along the linear communication orbit 204. For example, in some embodiments, if a computational machine at the respective node (e.g., computational machine (M1) 210) determines that it is the last machine in the subset of the plurality of machines that need to provide the raw data items of the one or more third types, that computational machine forgoes passing the watch list along linear communication orbit 204.

In response to the data collection request, each machine (e.g., M1 210) in the subset of the plurality of machines 206-218 identifies the raw data items of the one or more third types that need to be returned to server system 108 (specifically, function module 280 of server system 108), and returns the raw data items to server system 108 via the linear communication orbit 204. For example, referring to FIG. 2B, computational machine (M1) 210 receives the data collection request from server system 108 via head node 206, and sends the identified raw data items to server system 108 along a report path A or a report path B. Report path A extends to server system 108 via head node 206 and has a direction that is opposite to the direction of request path 222 along which the data collection request is passed along linear communication orbit 204. Report path B extends to server system 108 via tail node 208 and has a direction that is the same as the direction of request path 222. In some embodiments, when the identified raw data items generated by a first computational machine (M1) 210 passes an intermediate machine (e.g., computational machine (M2) 212) on report path A or B, the local raw data items generated by the intermediate machine are added to (or combined with) the raw data items generated by the first computational machine located upstream on the corresponding report path to produce aggregated raw data items (also called a response message). The aggregated raw data items are then sent to server system 108 along the same report path.

In some embodiments, propagation of the data collection request is combined with propagation of the raw data items on linear communication orbit 204. When the data collection request is propagated along request path 222 through linear communication orbit 204, a computational machine (e.g., M1 210) receives from its upstream neighbor node a message including the data collection request and raw data items, if any, which have been collected on request path 222. The computation machine acts upon the message by providing an update to the message based on its own raw data items of the one or more requested third types, performing some aggregation of the information in the message (e.g., by adding to or modifying aggregated raw data items already included in the message as received from its upstream neighbor), and/or forwarding the updated message to its downstream neighbor node along linear communication orbit 204.

After collecting the plurality of raw data items from the subset of the plurality of machines in response to the data collection request, function module 280 of server system 108 analyzes the plurality of raw data items collected from the subset of the plurality of machines 206-218. Specifically, in accordance with the schema definition, function module 280 obtains a first subset of raw data items that have the one or more third data types, derives a set of data items having the first data type and second data type based on the first subset of raw data items, and organizes the set of derived data items according to the data structure defined in the schema definition. Result data of the analysis include the set of derived data items, and are stored in a local database of function module 280 (e.g., function module database 526 shown in FIG. 5B or 6B) according to the schema definition. In some embodiments, the result data further include data items derived from raw data items collected from one or more individual machines that do not belong to linear communication orbit 204 (e.g., from machines that belong to another linear communication orbit). Function module 280 then reports the result data to central data management module 240, which is configured to store the result data in a central database (e.g., in a central storage 510 shown in FIG. 5A or 6B).

In some embodiments, after the derived data items are generated or after the result data in the local database are reported to central data management module 240, function module 280 deletes at least the first subset of raw data items from the cache or memory of the function module 280 where they are temporarily stored. In some embodiments, or in some circumstances, the raw data items are deleted from local memory of the subset of the plurality of machines immediately or with a delay, after the raw data items are sent to function module 280 in server system 108.

In some implementations, the schema definition in the data collection instruction further defines a fourth type of data derived from the result data. The fourth type of data is a combination of two of the sets of derived data items. In accordance with the schema definition, function module 280 combines the two sets of derived data items to generate a supplemental data item having the fourth data type, and organizes and/or stores the supplemental data item with the set of derived data items according to the data structure defined in the schema definition. Further, in some implementations, function module 280 obtains a reference data item, combines one of the set of derived data items with the reference data item to generate a referenced data item (sometimes called a derived and referenced data item) having a fifth data type, and organizes the referenced data item with the set of derived data items according to the data structure defined in the schema definition.

Referring to FIG. 2A, in some embodiments, the data collection instruction includes a data collection schedule, and the plurality of raw data items are collected from the subset of the plurality of machines via linear communication orbit 204 according to the data collection schedule. Optionally, data collection from linear communication orbit 204 is implemented automatically with a predefined collection frequency or in accordance with a detection of one or more predefined types of events (e.g., detection of a hacking attempt on a database). Optionally, data collection from linear communication orbit 204 is initiated in response to individual data queries. Additionally, in some implementations, the data collection instruction further includes a data analysis schedule, and the plurality of raw data items collected from the subset of the plurality of machines are analyzed by the function module 280 in server system 108 according to the data analysis schedule. Optionally, data analysis is implemented automatically with a predefined analysis frequency and/or in accordance with a detection of one or more predefined types of events. Optionally, data analysis is initiated in response to individual data queries. Further, in some embodiments, the result data from the analysis are reported from function module 280 to central data management module 240 according to a data reporting schedule. Likewise, data reporting is implemented automatically with a predefined reporting frequency and/or in accordance with a detection of one or more respective predefined types of events, and the data reporting schedule identifies the predefined reporting frequency and types of events. Optionally, such data reporting is initiated in response to individual data queries.

In some embodiments, the plurality of raw data items collected from the subset of the plurality of machines (e.g., machine (M1) 210) include a respective subset of raw data items provided by each machine in the subset of the plurality of machines. Each machine in the subset of the plurality of machines is configured to cache the respective subset of raw data items locally according to a data caching schedule, and await to report the respective subset of raw data items to function module 280 in server system 108 according to the data collection schedule.

Optionally, data caching at each node of linear communication orbit 204 is implemented automatically with a predefined caching frequency and/or in accordance with a detection of one or more predefined types of events. In some implementations, each node of linear communication orbit 204 caches the raw data items of the first and second data items in response to the machine at the node receiving a data caching request. Alternatively, in some implementations, each node of linear communication orbit 204 caches a plurality of raw data items according to a caching schedule independently of the data collection request, and the plurality of cached raw data items include the raw data items of the one or more third types. Upon receiving the data collection request, each machine of the subset of the plurality of machines (e.g., machine (M1) 210) selects and reports the requested raw data items of the one or more third types.

In some embodiments, each of the data caching schedule, the data collection schedule, the data analysis schedule and the data reporting schedule is defined to be periodic and has a respective predefined frequency. A first frequency of the data caching schedule (e.g., once per minute) is equal to or greater than a second frequency of the data collection schedule (e.g., once per hour). The second frequency of the data collection schedule is equal to or greater than a third frequency of the data analysis schedule (e.g., once per 6 hours). The third frequency of the data analysis schedule is equal to or greater than a fourth frequency of the data reporting schedule (e.g., once per 12 hours). As such, although the result data are reported to central data management module 240 at the fourth frequency (e.g., twice a day), they are consolidated from the raw data items that are cached locally in linear communication orbit 204 at the first frequency (e.g., every minute), reported to function module 280 in server system 108 at the second frequency (e.g., every hour), and analyzed by function module 280 at the third frequency (e.g., every six hours).

In some embodiments, none of data caching, collection, analysis and reporting is periodic. Rather, each machine in the subset of the plurality of machines caches two or more consecutive raw data items in the respective subset of raw data items according to its data caching schedule (e.g., upon detection of a predefined security event), before the two or more consecutive raw data items are collected together by function module 280 in server system 108 according to the data collection schedule (e.g., after ten events have been detected). Function module 280 derives two or more consecutive data items of the set of data items in the result data based on the at least the two or more consecutive raw data items according to the data analysis schedule, before the two or more consecutive derived data items are reported together to central data management module 240 of server system 108 according to the data reporting schedule.

Further, in some embodiments, each of the data caching schedule and the data analysis schedule is defined to be periodic and has a respective predefined frequency, while each of the data collection schedule and the data reporting schedule is not periodic. Raw data items are cached periodically at the respective node of the subset of the plurality of machines and analyzed periodically at function module 280 of server system 108 after being collected thereby. However, function module 280 of server system 108 does not request collection of raw data items until it receives a first plurality of user data queries (e.g., a data query including the data collection instruction) via central data management module 240. Function module 280 of server system 108 forwards one or more data collection requests, corresponding to the first plurality of user data queries, to the plurality of machines of linear communication orbit 106 to collect the plurality of raw data items. Function module 280 then awaits to receive a second plurality user data queries (e.g., a data reporting instruction distinct from the data collection instruction) via central data management module 240 to report the result data to central data management module 240.

In some embodiments, central data management module 240 of server system 108 is further coupled to an administrator machine 116. Central data management module 240 receives a data collection command from administrator machine 116 and generates the data collection instruction. Specifically, in some embodiments, administrator machine 116 receives user inputs defining a subset or all of: the first data type and the second data type for the result data, the one or more third data types for the raw data items, the data structure, the data caching schedule, the data collection schedule, the data analysis schedule and the data reporting schedule. In some embodiments, administrator machine 116 receives user inputs of at least one machine characteristic for selecting the subset of the plurality of machines in linear communication orbit 204 to collect raw data items generated thereby. On the other hand, server system 108 optionally provides user interface information to allow administrator machine 116 to execute an application on which the user inputs are entered and the reported result data from server system 108 are presented to an administrator user of administrator machine 116.

In some embodiments, a data collection request sent by the function module 280 of server system 108 to a plurality of machines in a linear communication orbit includes a first encryption key for encrypting the plurality of raw data items at a subset of the plurality of machines before the plurality of raw data items are collected by function module 280, and function module 280 possesses a first decryption key corresponding to the first encryption key for decrypting the plurality of encrypted raw data items.

Figure 3:
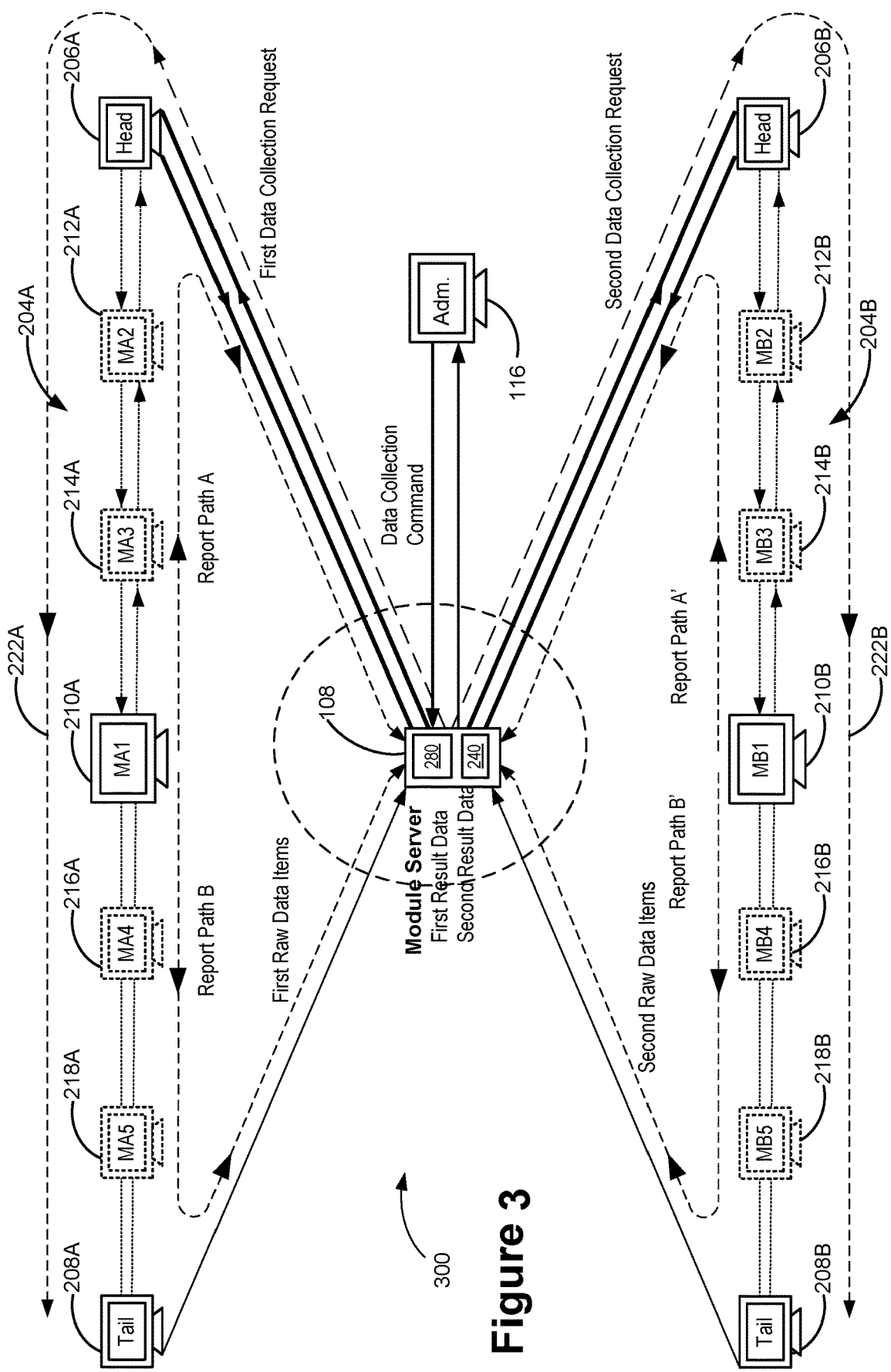
FIG. 3 illustrates an example process of requesting and consolidating raw data items that are provided by machines in two or more linear communication orbits coupled to a server system in accordance with some embodiments.

FIG. 3 illustrates an example process 300 of requesting and consolidating raw data items that are provided by machines in two or more linear communication orbits (e.g., orbits 204A and 204B) coupled to a server system 108 in accordance with some embodiments. In linear communication orbits 204A and 204B, each linear communication orbit has a respective plurality of machines, and each of the machines has a respective machine identifier. The plurality of machines in each linear communication orbit has self-organized into an ordered sequence, in accordance with a predefined order of the machine identifiers of the plurality of machines. A server system 108 is coupled to both linear communication orbit 204A and 204B. Server system 108 is coupled to first linear communication orbit 204A at a first head node 206A, and first linear communication orbit 204A further includes a first tail node 208A and a first plurality of intermediate machines (e.g., machines MA1-MA5) 210A-218A which are coupled between first head node 206A and first tail node 208A. Likewise, server system 108 is coupled to second linear communication orbit 204A at a second head node 206B, and second linear communication orbit 204B further includes a second tail node 208B and a second plurality of intermediate machines (e.g., machines MB1-MB5) 210B-218B which are coupled between second head node 206B and second tail node 208B. While intermediate machines 210A-218A and 210B-218B illustrate the configuration of linear communication orbits 204A and 204B, respectively, in some embodiments, linear communication orbit 204A or 204B includes only one intermediate machine, while in other embodiments, it includes dozens, hundreds or even thousands of intermediate machines.

In some embodiments, server system 108 is external to, and thus not included in, linear communication orbits 204a and 204b. Furthermore, in some implementations as shown in FIG. 3, no computational machine is located in both linear communication orbits 204A and 204B. Alternatively, in some implementations not shown here, one or more computational machines, such as server system 108, are located in both linear communication orbits 204A and 204B.

As explained above with reference to FIGS. 2A and 2B, function module 280 of server system 108 receives a data collection instruction from data management module 240 of server system 108, and generates a first data collection request for collecting a first plurality of raw data items from a subset of the first plurality of machines in first linear communication orbit 204A according to a schema definition. In addition to the first data collection request, function module 280 further generates, from the data collection instruction, a second data collection request for collecting a second plurality of raw data items from a subset of the second plurality of machines in second linear communication orbit 204B according to the schema definition. The second data collection request is sent through second linear communication orbit 204B. In response to the second data collection request, the subset of the second plurality of machines returns the second plurality of raw data items to function module 280, allowing function module 280 to collect the second plurality of raw data items from the subset of the second plurality of machines via second linear communication orbit 204B. Both the first and second plurality of raw data items are associated with a core function of function module 280. Function module 280 then analyzes the first and second pluralities of raw data items collected from the subset of the first plurality of machines and the subset of the second plurality of machines, including in accordance with the schema definition, obtaining a first and second subsets of raw data items (from machines in the first and second linear communication orbits 204A and 204B, respectively) that have the one or more third data types and deriving a first and second sets of data items, each set having derived data items of the first data type and second data type, based on the first and second subsets of raw data items. First and second result data of the analysis includes the first and second sets of derived data items.

In some embodiments, the set of derived data items obtained from the first subset of raw data items collected from the first linear communication orbit includes a first set of derived data items. The first set of derived data items and the second set of derived data items are aggregated and organized at function module 280 according to the data structure defined in the schema definition. Both the first set of derived data items and the second derived data set are stored in the local database (corresponding to function module database 526, FIG. 5B or 6B) of server system 108 according to the schema definition, and are subsequently reported to data management module 240. Further, in some embodiments, function module 280 of server system 108 also collects raw data items from one or more individual machines that do not belong to linear communication orbits 204A and 204B (e.g., from machines on other linear communication orbits), and derives additional data items from these collected raw data items. These additional data items are aggregated with the first and second set of derived data items at function module 280 of server system 108 according to the data structure defined in the schema definition.

Figure 4:
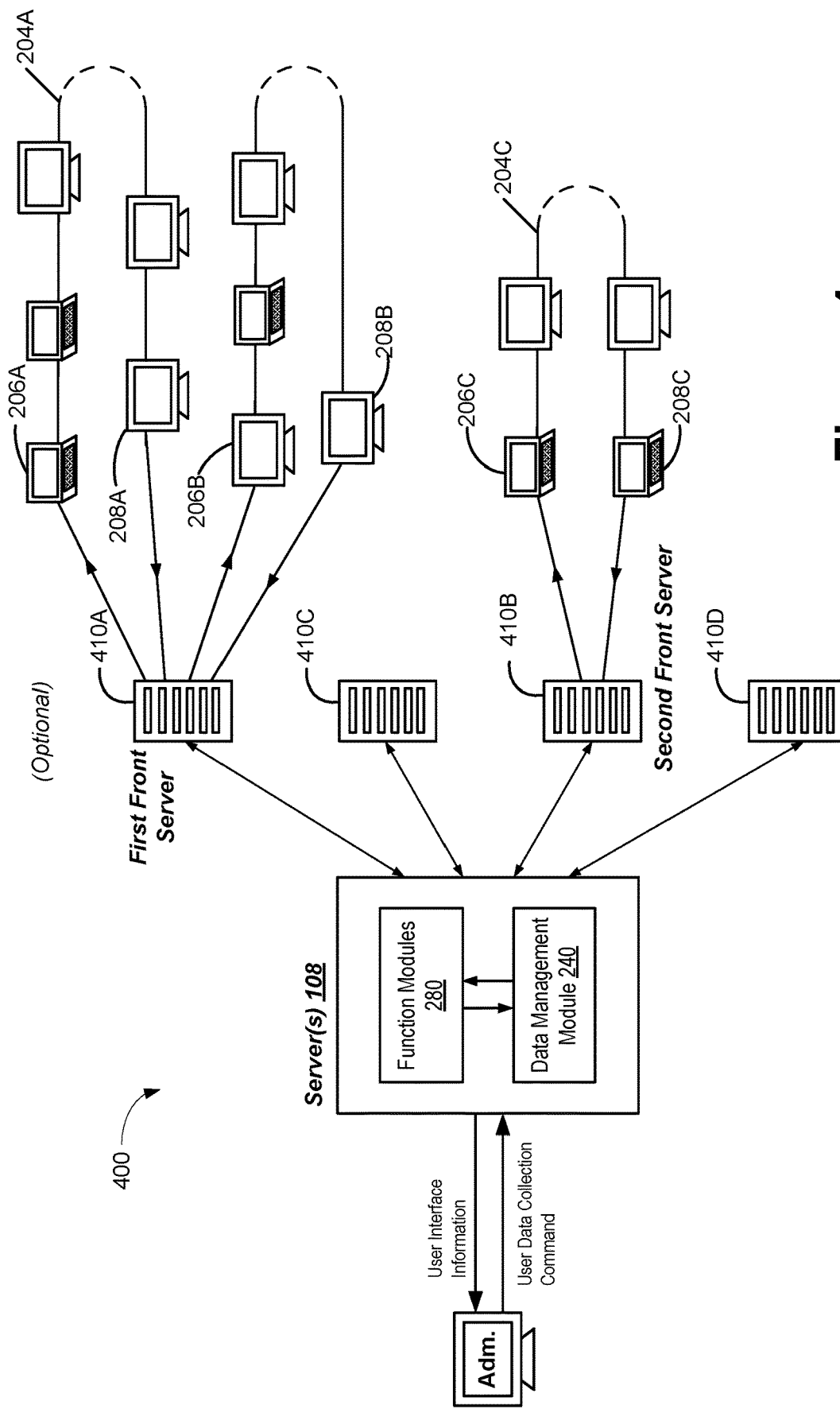
FIG. 4 illustrates an example computer network organized into linear communication orbits and two layers of servers (including a server system and a plurality of front servers) in accordance with some embodiments.

FIG. 4 illustrates an example computer network 400 (sometimes called a distributed computer system) organized into linear communication orbits 204 and two layers of servers (including server system 108 and a plurality of front servers 410) in accordance with some embodiments. Raw data items are consolidated (e.g., collected, analyzed, aggregated and reported) from machines in two or more linear communication orbits 204 coupled to two or more front servers 410 in computer network 400. Specifically, in this example, computer network 400 includes a first front server 410A coupled to a first linear communication orbit 204A and a second communication orbit 204B, and a second front server 410B coupled to a third linear communication orbit 204C.

In each linear communication orbit, 204A-204B, each machine of a respective plurality of machines has a respective machine identifier, and a respective plurality of machines have self-organized into a respective ordered sequence in accordance with a predefined order of the respective machine identifiers of the respective plurality of machines. First front server 410A is coupled to linear communication orbit 204A at head node 206a, and to linear communication orbit 204B at head node 206B. Each of linear communication orbits 204A and 204B further includes a respective tail node 208A or 208B and a respective plurality of intermediate machines (e.g., machines MA1-MA5 or MB1-MB5, as shown in FIG. 3) which are coupled between their respective head node and tail node. Likewise, second front server 410B is coupled to third linear communication orbit 204C at a third head node 206C, and third linear communication orbit 204C further includes a third tail node 208C and a third plurality of intermediate machines (not labelled in FIG. 4) which are coupled between third head node 206C and second tail node 208C. In some implementations as shown in FIG. 4, no computational machine is located simultaneously in two linear communication orbits 204A-204C. In some implementations not shown here, one or more computational machines are located simultaneously in two of linear communication orbits 204A-204C.

As explained above with reference to FIG. 3, server system 108 includes a data management module 240 and a plurality of function modules 280. A function module 280 receives a data collection instruction including a schema definition from data management module 240, generates a respective data collection request, and collects a respective plurality of raw data items from a subset of the respective plurality of machines in each of linear communication orbits 204A and 204B according to the schema definition. A first set of derived data items is obtained from a first subset of raw data items collected from first linear communication orbit 204A via first front sever 410A. A second set of derived data items is obtained from a second subset of raw data items collected from second linear communication orbit 204B via first front server 410. The first set of derived data items and the second set of derived data items are aggregated and organized at function module 280 according to the data structure defined in the schema definition. Both the first set of derived data items and the second derived data set are stored in the local database of function module 280 according to the schema definition and are reported to data management module 240 (e.g., periodically, at scheduled reporting times, and/or in response to a respective user query).

After receiving the data collection instruction, function module 280 of server system 108 may also generate a third data collection request for collecting a third plurality of raw data items from a subset of the third plurality of machines in third linear communication orbit 204C via second front server 410B according to the schema definition. The third data collection request is sent to third linear communication orbit 204C. In response to the third data collection request, the subset of the third plurality of machines returns the third plurality of raw data items to function module 280 via second front server 410B. Function module 280 then analyzes the third plurality of raw data items collected from the subset of the third plurality of machines, including in accordance with the schema definition, obtaining a third subset of raw data items that have the one or more third data types and deriving a third set of data items having the first data type and second data type based on the third subset of raw data items. Third result data includes the third set of derived data items. The third result data are stored in the local database of function module 280 according to the schema definition, and reported to data management module 240 (e.g., periodically, at scheduled reporting times, and/or in response to a respective user query).

In some implementations, data management module 240 receives the third result data reported by second front server 410B, consolidates the third result data reported by second front server 410B with the first and/or second result data reported by first front server 410A, and stores the consolidated result data in a central storage (e.g., corresponding to central storage 510, FIGS. 5A and 6B) associated with data management module 240.

Optionally, computer network 400 includes one or more additional front servers 410C and 410D that are not instructed to collect raw data items according to the data collection instruction. For examples, the additional front servers collect raw data items in response to other data collection instructions.

Figure 5A:
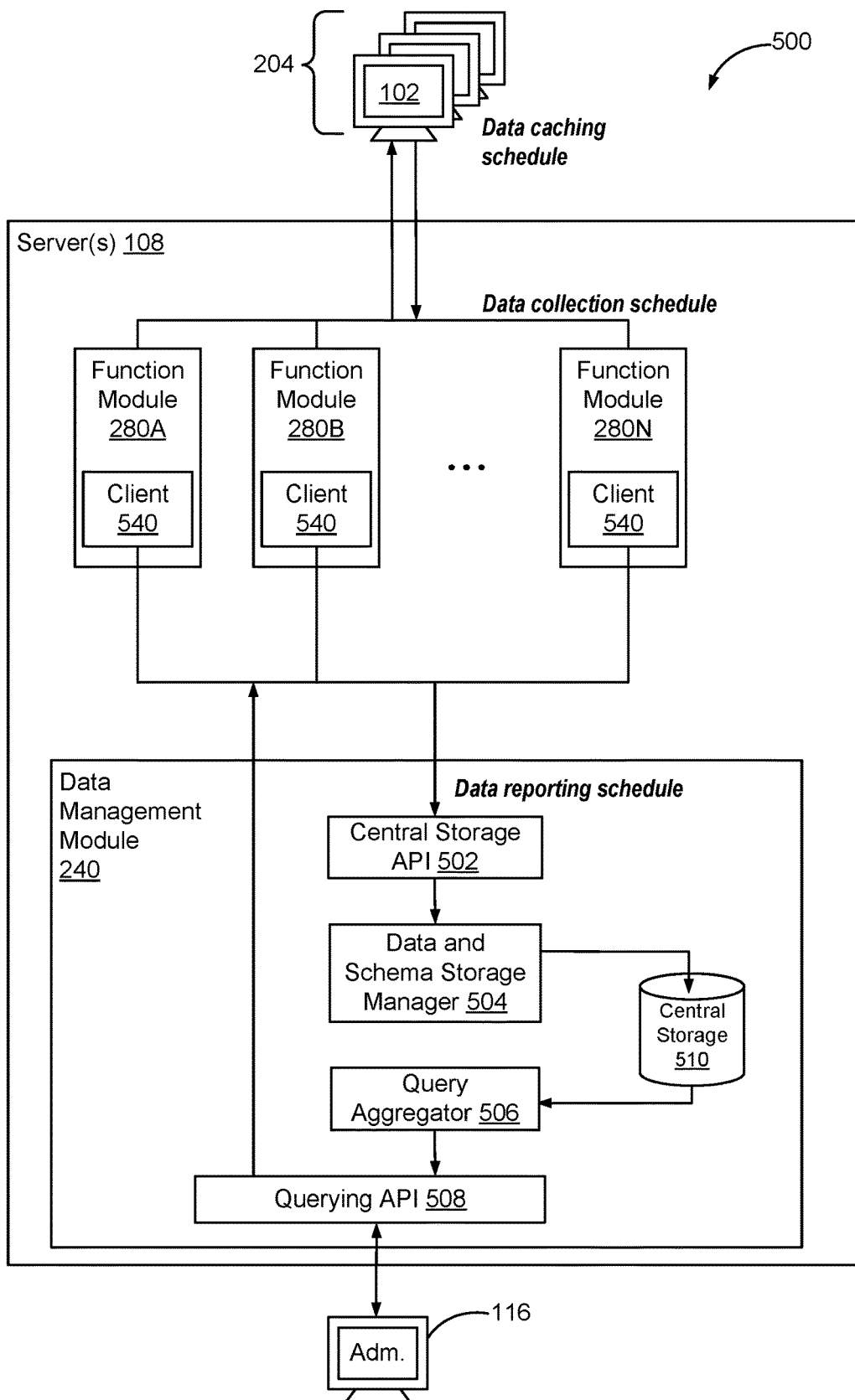
FIG. 5A illustrates an example data processing system configured to analyze and consolidate data collected from a linear communication orbit in a distributed manner in accordance with some embodiments.
Figure 5B:
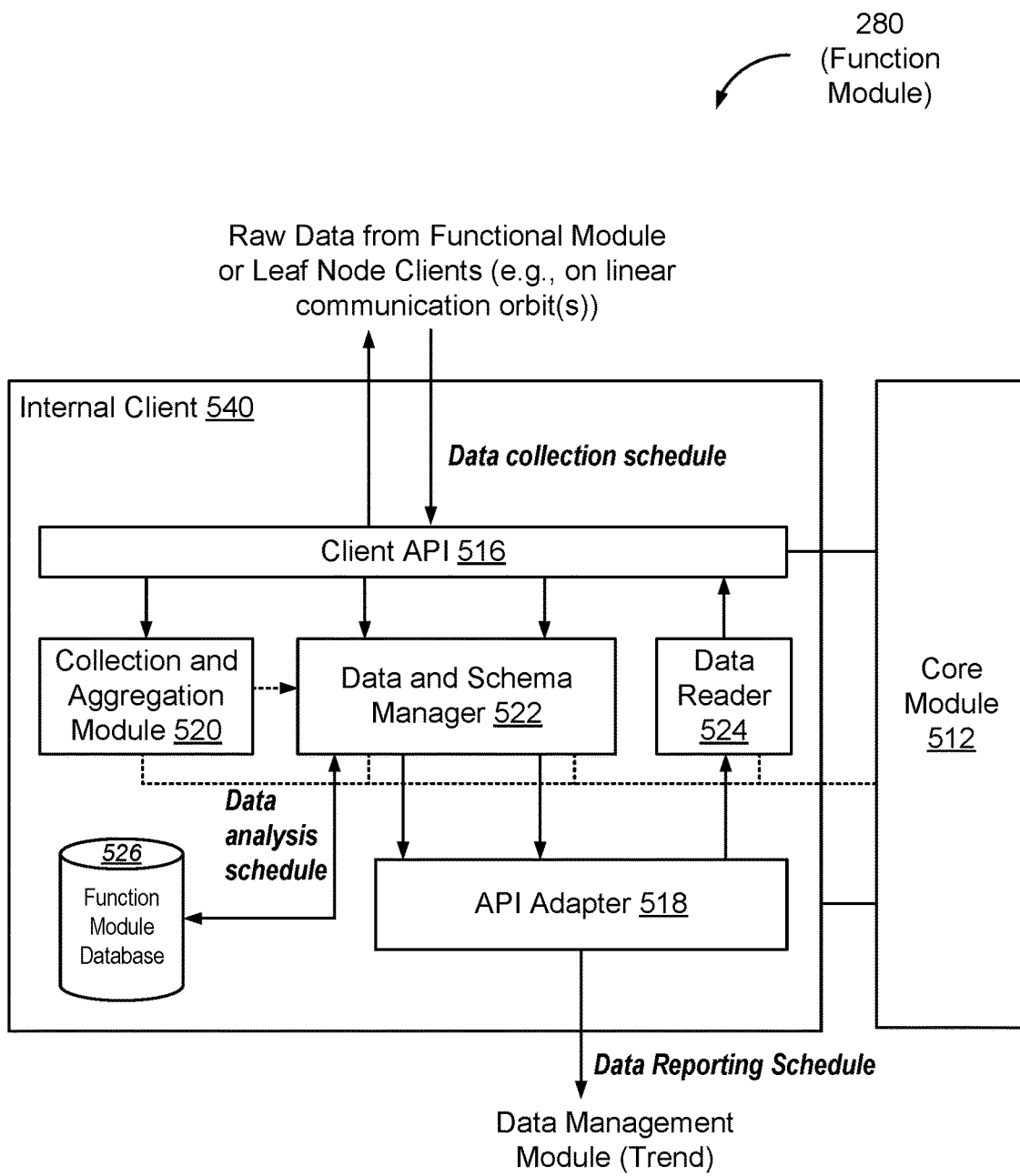
FIG. 5B illustrates an example function module of a server system that incorporates an example internal client module for on-the-fly data collection and pre-processing in accordance with some embodiments.

FIG. 5A illustrates an example data processing system 500 configured to analyze and consolidate data collected from one or more linear communication orbits 204 in a distributed manner in accordance with some embodiments, and FIG. 5B illustrates an example function module 280 of a server system 108 that incorporates an example internal client module 540 for data collection and pre-processing in accordance with some embodiments. As explained above, server system 108 includes a central data management module 240 and a plurality of function modules 280. Each functional module 280 is configured to collect data related to a core function of that function module 280 from a plurality of machines distributed on a linear communication orbit 204. Examples of function module 280 include, but are not limited to, a software deployment module configured to deploy a software package to machines located on linear communication orbit 204, a patch module configured to install software patches on machines located on linear communication orbit 204, and a security management module configured to distribute security rules to endpoints on linear communication orbit 204. In some embodiments, central data management module 240 is installed on server system 108 to manage data to be collected by the plurality of function modules 280. To facilitate centralized data management, each function module 280 includes (e.g., is installed with) an internal client 540 that is controlled by data management module 240 to collect and pre-process data related to the core function of respective function module 280. Specifically, data management module 240 provides a schema definition to internal client 540 of function module 280, and internal client 540 collects the data related to the core function according to the schema definition.

After the raw data items are adaptively collected from linear communication orbit 204 according to the schema definition, a subsequent data analysis and consolidation task is split between respective function module 280 and data management module 240. The data analysis and consolidation task includes a first set of subtasks and a second set of subtasks that are assigned to function module 280 and data management server 240, respectively. The first set of subtasks assigned to function module 280 are focused on data collection and preliminary data analysis, and the second set of subtasks assigned to data management server 240 are focused on supplemental data analysis and query processing. In some embodiments, internal client 540 of respective function module 280 implements the first set of subtasks concurrently while the data are being collected from the plurality of machines of linear communication orbit 204 according to the schema definition.

Specifically, each function module 280 is coupled between a plurality of computational machines 102 in linear communication orbit 204 and data management module 240, and includes a core module 512 and an internal client 540. In some embodiments, the internal client 540 is installed in function module 280 when data management module 240 is installed to accomplish centralized data management. Referring to FIG. 5B, internal client 540 of function module 280 includes one or more of a client application program interface (API) 516, an API adaptor 518, a data collection and aggregation module 520, a data and schema manager 522, a data reader 524 and a function module database 526, or a subset of such modules.

API adapter 518 receives a data collection instruction from data management module 240 and passes the data collection instruction to data reader 524. The data collection instruction includes a schema definition defining distinct first and second data types for data and a data structure for organizing data items of the first and second data types. The requested data items of the first and second data types are derived from raw data, of one or more third data types, to be collected from nodes in one or more linear communication orbits 204. Data reader 524 extracts information of the one or more third data types of the raw data directly from the schema definition in the data collection instruction, or alternatively determines the information of the one or more third data types of the raw data based on information concerning the distinct first and second data types for the derived data items, which is extracted from the schema definition. Data reader 524 then generates a data collection request for collecting a plurality of raw data items of the one or more third data types from a subset of the plurality of machines in linear communication orbit 204. Optionally, data reader 524 is integrated with data and schema manager 522.

The data collection request is sent to the plurality of machines 102 via client API 516. Referring to FIG. 2A, the plurality of machines 102 coupled to server system 108 includes a plurality of machines 206-218 that are coupled in linear communication orbit 204. In response to the data collection request, raw data items are returned to server system 108 (specifically, via client API 516 of internal client 540) from linear communication orbit 204. In some implementations, a plurality of raw data items is received and stored locally in function module database 526 by collection and aggregation module 506. Alternatively, the plurality of raw data items are analyzed by data and schema manager 522 according to the schema definition received in the data collection instruction. For example, after collection and aggregation module 520 collects raw data items from linear communication orbit 204, data and schema manager 522 derives a set of data items from a first subset of raw data items having the one or more third data types and organizes the set of derived data items according to the data structure defined in the schema definition. Each derived data item thereby has the first or second data type (or other additional data types for derived data items) as defined in the schema definition. Data and schema manager 522 stores result data from the analysis of the collected raw data items (including the set of derived data items) in function module database 526, and reports the result data to data management module 240 via API adapter 518. It is noted that collection and aggregation module 520 and data and schema manager 522 analyze the collected raw data items and report the result data according to a data analysis schedule and a data reporting schedule, respectively, which are optionally identical to or distinct from each other.

In some embodiments, internal client 540 collects and analyzes additional raw data items according to a set of data handling rules; optionally, the data handling rules include data handling rules specific to the function module 280. The additional raw data items and/or data items derived from the additional raw data items are optionally reported to data management module 240 in conjunction with the data items derived in response to the data collection instruction.

Referring to FIG. 5A, data management module 240 is coupled between function modules 280 and an administrator machine 116, and includes one or more of a central storage API 502, a data and schema storage manager 504, a query aggregator 506, a querying API 508 and a central storage 510. Central storage API 502 receives the result data reported by function modules 280. Data and schema storage manager 504 then stores the result data collected from function modules 280 into central storage 510. In some embodiments, the result data includes a sequence of derived data that are associated with consecutive data collection times. In some embodiments, the result data include derived data items each of which is associated with a respective one of the subset of the plurality of machines and correspond to a respective subset of raw data items obtained during a specific time window. Prior to, or in conjunction with, storing the result data in central storage 510, data and schema storage manager 504 can combine two or more derived data items in the result data, transform a derived data item with respect to a reference data item, apply a filter on the result data, or consolidate the result data with data from one or more other function modules 280 or individual machines 102. The result data are organized in one or more tables having a plurality of data fields defined according to the schema definition, and stored in central storage 510.

In some embodiments, querying API 508 receives a data collection command from administrator machine 116 and converts it to the data collection instruction provided to function module 280. In some embodiments, after the result data are stored in central storage 510, querying API 508 receives a user query inquiring into the result data stored in central storage 510, and query aggregator 506 processes the user query and identifies a subset of the result data to be returned to administrator machine 116. In some implementations, the identified subset of the result data includes a subset of tuples of the one or more tables of the result data stored in central storage 510 or a subset of data fields of the one or more tables of the result data.

Under some circumstances, the queried subset of the result data belongs to a data group and is identified by a group identifier in the result data. For example, the schema definition includes a grouping criterion associated with the data group, so when data items in the data group are derived from the collected raw data items by function module 280, each derived data item in the data group is associated with a group identifier because it satisfies the group criterion (e.g., corresponding raw data items collected from machines executing the Windows operating system). In response to receiving the user query for derived data items in the data group, query aggregator 506 extracts the subset of the result data from central storage 510 based on the group identifier of the data group and reports the subset of the result data to administrator machine 116.

The distributed data processing method described in the present specification methods can be used in many scenarios. For example, function module 280 can compare a first subset of raw data items collected from a subset of a plurality of machines with one or more predefined compliance indicators to generate a set of derived data items. At least one of the set of derived data items represents a count of machines in the subset of the plurality of machines that are not compliant with a plurality of predetermined compliance benchmarks. In some embodiments, one or more of the compliance benchmarks are associated with a security policy. For example, the subset of the plurality of machines is selected based on a business unit, or services provided by the machines, thereby enabling the administrator machine 116 to determine, using queries corresponding to various compliance benchmarks, which business units or services are violating a compliance benchmark. Alternatively, identification of business units or services violating compliance benchmarks can be incorporated into the data analysis performed by function module 280 or data management module 240.

In various scenarios of applying the distributed data process method, the plurality of raw data items collected from the subset of the plurality of machines can include one or more of: event information for one or more predefined events occurring at machines in a subset of the plurality of machines, context information for the respective machine in the subset, and system performance information of the respective machine in the subset. In some embodiments, the data collection request defines a time window, and the plurality of raw data items collected from a subset of the plurality of machines of linear communication orbit 204 includes event information for at least one event that occurred within the time window for one or more objects identified by a predefined watch list.

Alternatively, in some embodiments, the plurality of raw data items collected from the subset of the plurality of machines include system performance information that further includes at least a usage rate of a resource, such as hard drive or other data storage device, of each machine in the subset of the plurality of machines. Function module 280 compares the usage rate of the resource by each machine in the subset of the plurality of machines with a predefined usage threshold to generate at least one of the set of derived data items. The at least one of the set of derived data items corresponds to a count of machines in the subset of the plurality of machines that have a usage rate, for the resource, that meets or does not meet predefined criteria (e.g., above or below a benchmark usage rate). In a specific example, the subset of the plurality of machines is selected based on one or more business units to which they belong and or services provided by them. Each machine corresponds to a respective derived data item that is an average of the usage rate of the respective resource over a duration of time. The average usage rate can be used to determine which business unit or service has a usage rate associated with improper operation, or associated with a usage pattern known to be a precursor of improper operator.

It is noted that in some embodiments, central data management module 240 and one or more function modules 280 are implemented as distinct modules in a single server located at a specific location. In some embodiments, central data management module 240 is implemented in a first server that is distinct from a second sever that includes one or more of function modules 280. The first server is optionally located remotely from the second server. Further, central data management module 240 of the first server can be used to support function modules 280 distributed over more than one server, thereby managing data collected and pre-processed by these function modules 280 in a centralized manner.

Figure 6A:
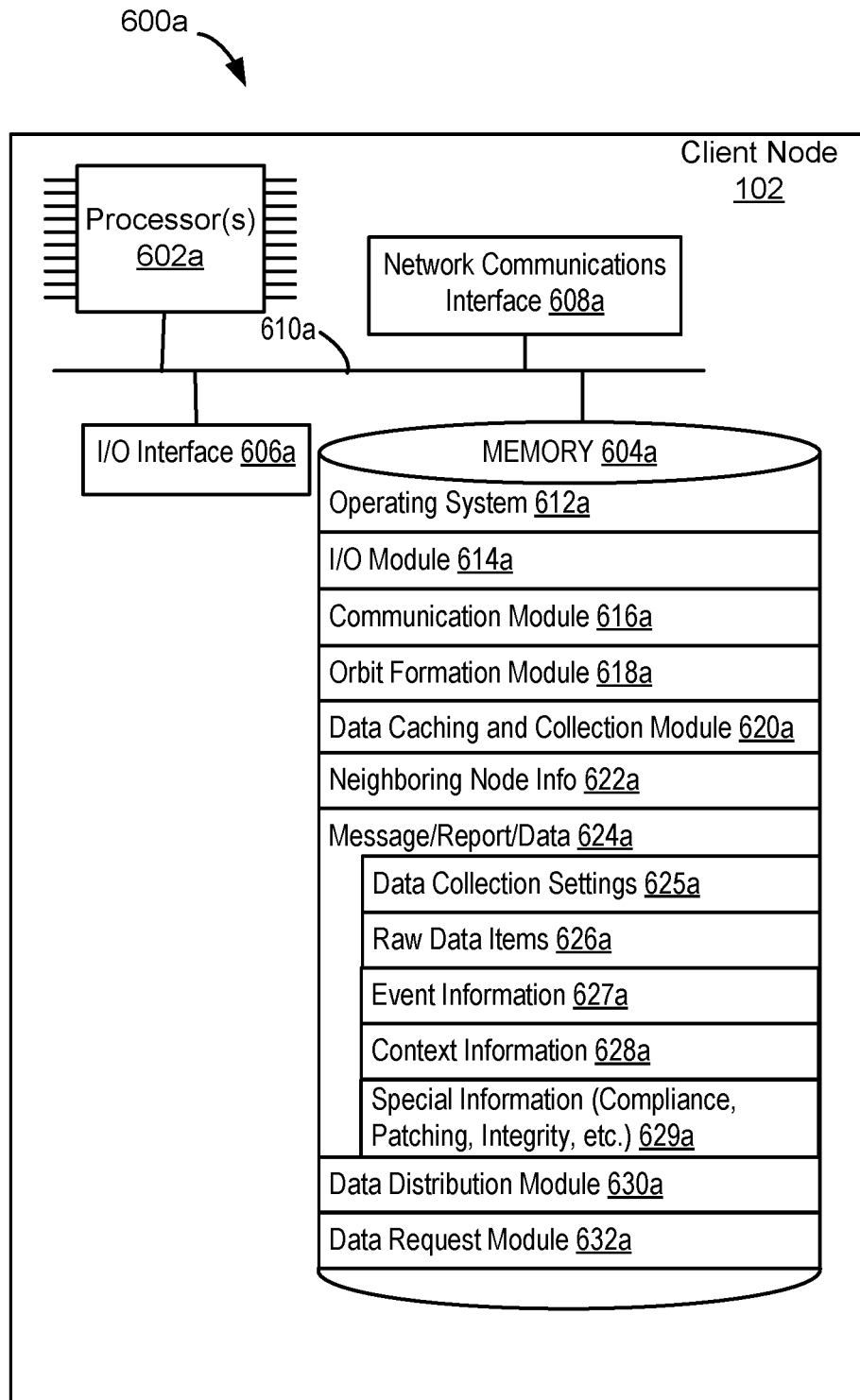
FIGS. 6A-6D are block diagrams of a computational machine, a server system, a front server and an administrator machine in accordance with some embodiments.

FIG. 6A is a block diagram of a computational machine 600a (e.g., serving as a client node 102 of a linear communication orbit 106 shown in FIGS. 1A and 1B or any of machines 206-218 in linear communication orbit 204 shown in FIG. 2A) in accordance with some embodiments. In some implementations, machine 600 includes one or more processors 602a, memory 604a for storing programs and instructions for execution by one or more processors 602a, one or more communications interfaces 606/608, such as input/output interface 606a and network interface 608a, and one or more communications buses 610a for interconnecting these components.

In some embodiments, input/output interface 606a includes a display and input devices such as a keyboard, a mouse and/or a track-pad. In some embodiments, communication buses 610a include circuitry (sometimes called a chipset) that interconnects and controls communications between system components. In some embodiments, memory 604a includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604a includes one or more storage devices remotely located from the one or more processors 602a. In some embodiments, memory 604a, or alternatively the non-volatile memory device(s) within memory 604a, comprises a non-transitory computer readable storage medium.

In some embodiments, memory 604a or alternatively the non-transitory computer readable storage medium of memory 604a stores the following programs, modules and data structures, instructions, or a subset thereof:

- Operating System 612a that includes procedures for handling various basic system services and for performing hardware dependent tasks;
- I/O module 614a that includes procedures for handling various basic input and output functions through one or more input and output devices;
- Communication module 616a that is used for connecting machine 600 to other machines (e.g., other machines 102 in the same linear communication orbit or in network 100, server system 108 or front server 410) via one or more network communication interfaces 608a (wired or wireless) and one or more communication networks, such as the Internet, other wide area networks, local area networks, metropolitan area networks, and so on;
- Orbit formation and maintenance module 618a that includes instructions to self-insert into a linear communication orbit (e.g., 204, FIG. 2B) and self-healing from a broken link in the linear communication orbit;
- Data caching and collection module 620a that includes instructions for (1) receiving a data collection request for raw data items of one or more third data types defined according to a schema definition, (2) caching the raw data items of the one or more third data types in response to the data collection request, and/or (3) consolidating the raw data items generated locally with raw data items that are propagated from other computational machines on the same linear communication orbit;
- Neighboring node information 622a that includes information identifying neighboring nodes of machine 600 on linear communication orbit 204;
- Messages, reports and/or other data 624a that is stored, temporarily or otherwise, upon receipt from another computational machine 102 or server 108/110, and/or that is locally generated, revised or supplemented by machine 600a prior to transmission to another computational machine 102 or server 108/110, where in some embodiments, messages, reports and/or other data 624a further include one or more of: data collection settings 625a (e.g., a data collection schedule, data types to be collected), raw data items 626a, event information 627a, context information 628a, and special information 629a concerning compliance, software patches, system integrity, etc.; in some embodiments, messages, reports and/or other data 624a that is stored, temporarily or otherwise, in a local database 532 (FIG. 5);
- Data distribution module 630a that includes instructions for handling receipt, processing, propagation, collecting and reporting in response to system management messages for distributing objects to be installed or updated on machine 102 (e.g., query messages related to deployment, execution, status checking and result collection of local environment verifications), where in some embodiments, the data distribution module 630a generates a plurality of data requests for collecting the bundle of information items regarding deployment of a local environment verification framework, identifies or receives a respective specific file shard in response to a respective data request, and generates or reconstitutes the bundle of information items from the identified or received specific data; and
- Data request module 632c that includes instructions for processing data requests received from a predecessor node, successor node or server.

Figure 6B:
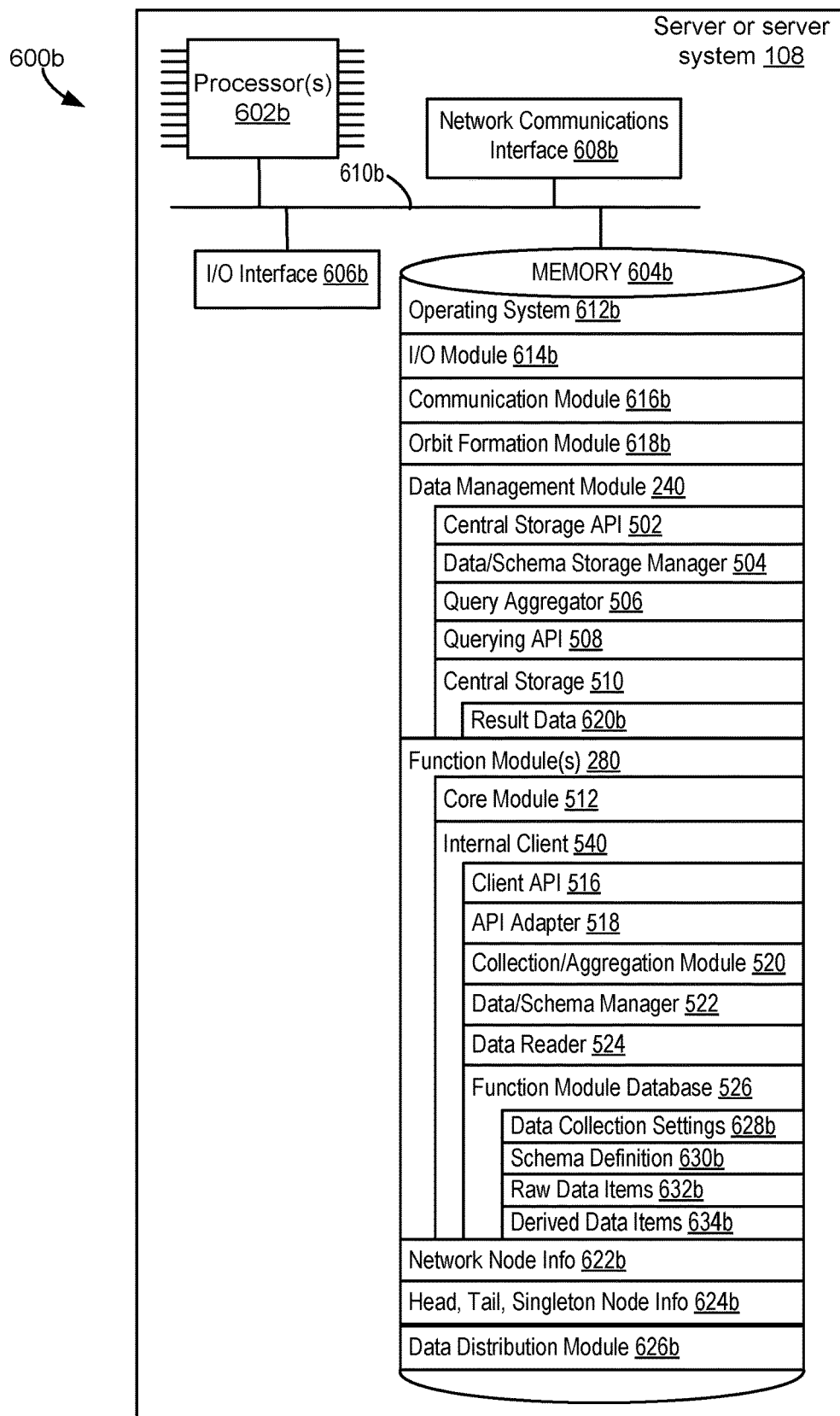

FIG. 6B is a block diagram of an exemplary computer system 600b (e.g., serving as a server system 108 of the network shown in FIGS. 1-5) in accordance with some embodiments. In some implementations, computer system 600b includes one or more processors 602b, memory 604b for storing programs and instructions for execution by one or more processors 602b, network interface 608b, optionally one or more communications interfaces such as input/output interface 606b, and one or more communications buses 610b for interconnecting these components.

In some embodiments, input/output interface 606b includes a display and input devices such as a keyboard, a mouse and/or a track-pad. However, in some embodiments, computer system 600b does not include an input/output interface 606b. In some embodiments, communication buses 610b include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604b includes one or more storage devices remotely located from the one or more processors 602b. In some embodiments, memory 604b, or alternatively the non-volatile memory device(s) within memory 604b, comprises a non-transitory computer readable storage medium.

In some embodiments, memory 604b or alternatively the non-transitory computer readable storage medium of memory 604b stores the following programs, modules and data structures, instructions, or a subset thereof:

Operating System 612b that includes procedures for handling various basic system services and for performing hardware dependent tasks;

I/O module 614b that includes procedures for handling various basic input and output functions through one or more input and output devices;

Communication module 616b that is used for connecting computer system 600b to other machines (e.g., machines 102 in network 100, an administrator machine 116, another server system 108, and/or front server 410) via one or more network communication interfaces 608b (wired or wireless) and one or more communication networks, such as the Internet, other wide area networks, local area networks, metropolitan area networks, and so on;

Orbit formation module 618b that includes instructions to determine and provide ordinal positions of machines 102 in an ordered sequence of a set of managed machines 102 currently known to be coupled to network 100; and optionally includes instructions to self-insert into a linear communication orbit (e.g., 106a-106c in FIG. 1A and 204 FIG. 4) and self-healing from a broken link in the linear communication orbit. In some embodiments, computer system 600b is not included in any linear communication orbits and does not include an orbit formation module;

Data management module 240 that includes instructions to implement a set of subtasks of a data analysis and consolidation task that is jointly executed with individual function modules 280, including one or more of:

1) Central storage API 502 that includes instructions for receiving result data 620b reported by function modules 280 in response to one or more data collection instructions;

2) Data and schema storage manager 504 that includes instructions for storing the result data 620b collected from function modules 280 into central storage 510, and instructions for combining two or more derived data items in result data 620b, transforming a derived data item with respect to a reference data item, applying a filter on the result data 620b, and/or consolidating result data 620b with data obtained from other function module 280 or individual machines 102 prior to or in conjunction with storing result data 620b in central storage 510;

3) Query aggregator 506 that includes instructions for processing a user query received from administrator machine 116 and identifying a subset of result data 620b to be returned to administrator machine 116;

4) Querying API 508 that includes instructions for receiving data collection commands from administrator machine 116 and converting them to data collection instructions provided to function module 280, and receiving user queries inquiring into result data 620b stored in central storage 510; and 5) Central storage 510 for storing result data 620b (e.g., messages, reports and/or other data) that is stored, temporarily or otherwise, upon receipt from function modules 280, and/or that is locally generated, revised or supplemented by data management module 240 prior to transmission to computational machine 102, front server 410 or function modules 280;

One or more function modules 280 each of which includes a core module 512 and an internal client 540, where the core module 512 includes instructions (for execution by the one or more processors 602b) to implement a core function of respective function module 280, and internal client 540 includes instructions (for execution by the one or more processors 602b) to implement a set of subtasks of the data analysis and consolidation task that is jointly executed with data management module 240, and where internal client 540 includes one or more of:

1) Client API 516 that includes instructions for sending one or more data collection requests, corresponding to one or more data collection instructions received from data management module 240, to one or more linear communication orbits 204, and receiving raw data items returned by one or more machines in the one or more linear communication orbits 204 in response to the one or more data collection requests;

2) Collection and aggregation module 520 that includes instructions for collecting data from one or more linear communication orbits via client API 516;

3) Data and schema manager 522 that includes instructions for analyzing raw data items collected from linear communication orbit 204 according to a schema definition in the data collection instructions received from data management module 240, organizing the raw data items and/or derived data items (i.e., result data from the analysis), and storing result data from the analysis of the collected raw data items in function module database 526;

4) Data reader 524 that includes instructions for processing one or more data collection instructions to (a) extract information of one or more third data types of the raw data defined in the data collection instructions or determine the information of the one or more third data types of the raw data based on information concerning distinct first and second data types for derived data items, which is extracted from the data collection instructions, and (b) generate a data collection request for collecting a plurality of raw data items of the one or more third data types from a subset of the plurality of machines in linear communication orbit 204; and 5) API adapter 518 that includes instructions for receiving one or more data collection instructions from data management module 240 of computer system 600*b*, passing the data collection instruction(s) to data reader 524, and reporting to data management module 240 result data of analysis of raw data items that are collected from one or more linear communication orbits 204; and 6) Function module database 526 for storing messages, reports and/or other data that is stored, temporarily or otherwise, upon receipt from other machines/modules (e.g., computational machine(s) 102, front server 410 or data management module 240), and/or that is locally generated, revised or supplemented by respective function module 280 prior to transmission to computational machine 102, front server 410 or data management module 240;

Network node information 622*b* that includes information identifying one or more nodes known to be coupled to network 100, where in some embodiments, computer system 600*b* maintains a record of nodes currently known to be coupled to the managed network and their respective unique identifiers (e.g., IP addresses and optionally other unique identifiers), and optionally, computer system 600*b* also maintains the ordinal positions of these machines in a sorted sequence according to their respective unique identifiers;

Head, tail and singleton node information 624*b*, identifying head nodes and tail nodes, and optionally singleton nodes, with established communication channels to and/or from computer system 600*b* (e.g., server system 108), where in some embodiments, computer system 600*b* maintains a list of head nodes, tail nodes, and singleton nodes that have opened forward and backward connections with computer system 600*b*; and Data distribution module 626*b* that includes instructions for providing an information item, or a bundle of information items, to computational machines in one or more linear communication orbits. In some embodiments, the data distribution module 626*b* generates a system management message that includes one or more data distribution commands and/or manifests for distributing to at least one computational machine on a linear communication orbit a bundle of information items, for example for installing an update or new module in a specified subset of the computation machines in the one or more linear communication orbits, or for deployment of a local environment verification framework. Optionally, the one or more linear communication orbit returns at least one caching status message to computer system 600*b*, and the data distribution module 626*b* tracks locations on the linear communication orbit of locally cached copies of items in the bundle of information items. In some embodiments, computer system 600*b* does not include a data distribution module 626*b*.

In some embodiments, function module database 526 stores one or more of: data collection settings 628*b* (e.g., a data collection schedule, a data analysis schedule, a data reporting schedule), one or more schema definitions 630*b* (e.g., including a data structure, information of a first data type and a second data type for derived data items), raw data items 632*b* that are collected from one or more linear communication orbits 204 and stored temporarily at function module 280, and data items 634*b* that are derived by function module 280 from raw data items 632*b*.

More details on structured data management module 240 and function modules 280 are discussed above with reference to FIGS. 2-5.

Figure 6C:
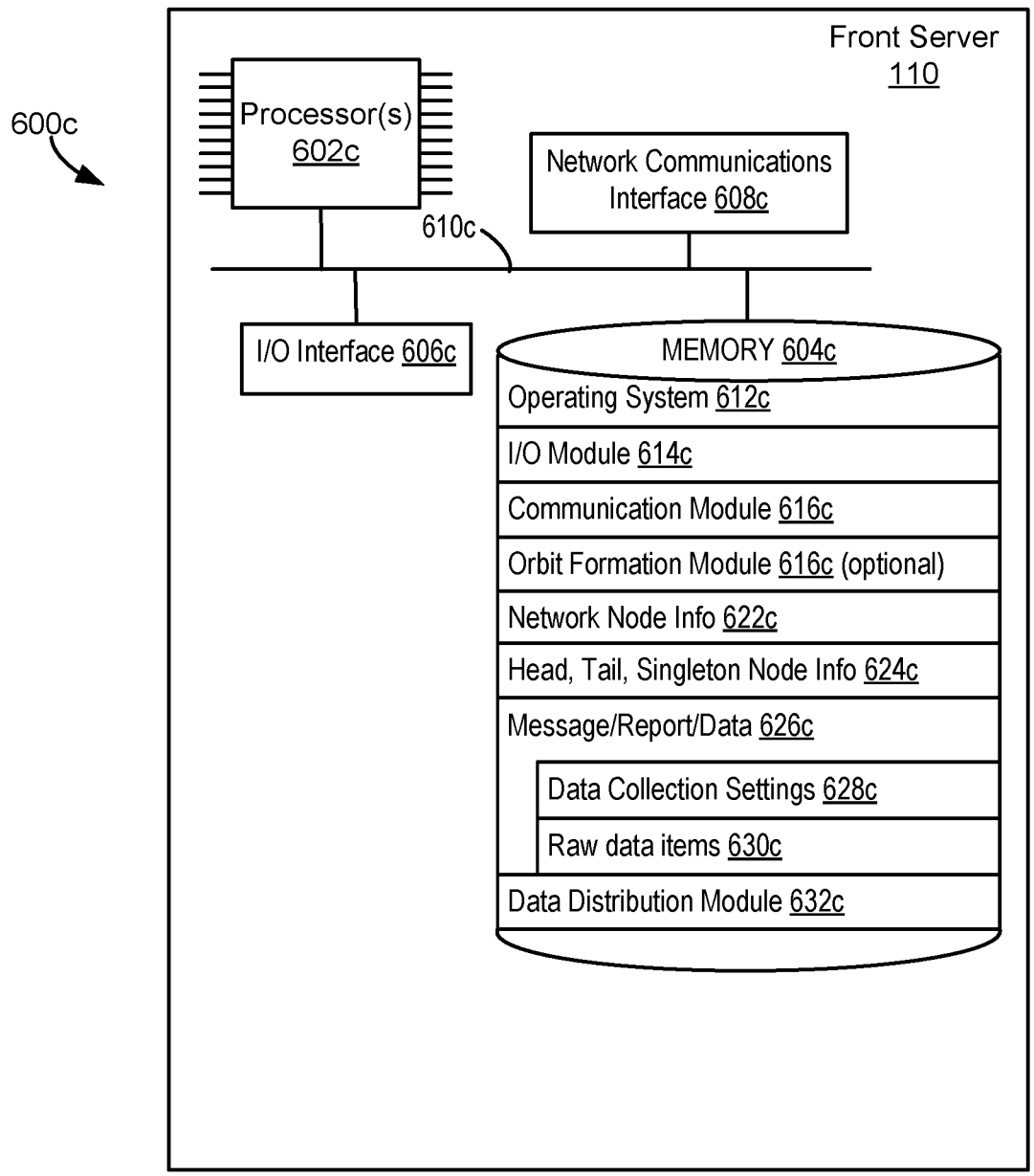

FIG. 6C is a block diagram of an exemplary machine 600*c* (e.g., serving as a front server 410 of the network shown in FIG. 4) in accordance with some embodiments. In some implementations, machine 600*c* includes one or more processors 602*c*, memory 604*c* for storing programs and instructions for execution by one or more processors 602*c*, network interface 608*c*, optionally one or more communications interfaces such as input/output interface 606*c*, and one or more communications buses 610*c* for interconnecting these components.

In some embodiments, input/output interface 606*c* includes a display and input devices such as a keyboard, a mouse and/or a track-pad. However, in some embodiments, machine 600*c* does not include an input/output interface 606*c*. In some embodiments, communication buses 610*c* include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604*c* includes one or more storage devices remotely located from the one or more processors 602*c*. In some embodiments, memory 604*c*, or alternatively the non-volatile memory device(s) within memory 604*c*, comprises a non-transitory computer readable storage medium.

In some embodiments, memory 604*c* or alternatively the non-transitory computer readable storage medium of memory 604*c* stores the following programs, modules and data structures, instructions, or a subset thereof:

Operating System 612*c* that includes procedures for handling various basic system services and for performing hardware dependent tasks;

I/O module 614*c* that includes procedures for handling various basic input and output functions through one or more input and output devices;

Communication module 616*c* that is used for connecting machine 600*c* to other machines (e.g., machines 102 in network 100, an administrator machine 116, and/or one or more server systems 108) via one or more network communication interfaces 608*c* (wired or wireless) and one or more communication networks, such as the Internet, other wide area networks, local area networks, metropolitan area networks, and so on;

Orbit formation module 618*c* (optional) that includes instructions to determine which machines 102, of all machines 102 currently known to be coupled to network 100, are coupled to the same local area network and to communicate information to those machines to enable them to self-organize into a linear communication orbit; in some embodiments, machine 600*c* is not included in any linear communication orbits and does not include an orbit formation module, while in some other embodiments machine 600*c* is also the head or tail node of a respective linear communication orbit;

Network node information 622*c* that includes information identifying one or more (e.g., all) nodes known to be coupled to network 400 (e.g., a node where front server 410 is coupled), where in some embodiments, machine 600*c* maintains a record of nodes currently known to be coupled to the managed network and their respective unique identifiers (e.g., IP addresses and optionally other unique identifiers), and optionally, machine 600*c* also maintains the ordinal positions of these machines in a sorted sequence according to their respective unique identifiers;

Head, tail and singleton node information 624*c*, identifying head nodes, tail nodes and (if applicable) singleton nodes with established communication channels to and/or from machine 600*c* (e.g., server 410), where in some embodiments, machine 600*c* maintains a list of head nodes, tail nodes, and (if applicable) singleton nodes that have opened forward and backward connections with machine 600*c*;

Messages, reports and/or other data 626*c* that is stored, temporarily or otherwise, upon receipt from other machines (e.g., computational machine 102, administrative machine 116, server system 108), and/or that is locally generated, revised or supplemented by machine 600*c* prior to transmission to server system 108 or administrative machine 116, where in some embodiments, messages, reports and/or other data 626*c* further include one or both of: data collection settings 628*c* (e.g., a data collection schedule, a data caching schedule) and raw data items 630*c* that are collected from one or more linear communication orbits 204 and stored temporarily at machine 600*c*; and Data distribution module 632*c* that includes instructions for providing an information item, or a bundle of information items, to computational machines in one or more linear communication orbits. In some embodiments, the data distribution module 632*c* generates a system management message that includes one or more data distribution commands and/or manifests for distributing to at least one computational machine on a linear communication orbit a bundle of information items, for example for installing an update or new module in a specified subset of the computation machines in the one or more linear communication orbits, or for deployment of a local environment verification framework. Optionally, the one or more linear communication orbit returns at least one caching status message to machine 600*c*, and the data distribution module 632*c* tracks locations on the linear communication orbit of locally cached copies of items in the bundle of information items. In some embodiments, front server 410 does not include a data distribution module 632*c*.

Figure 6D:
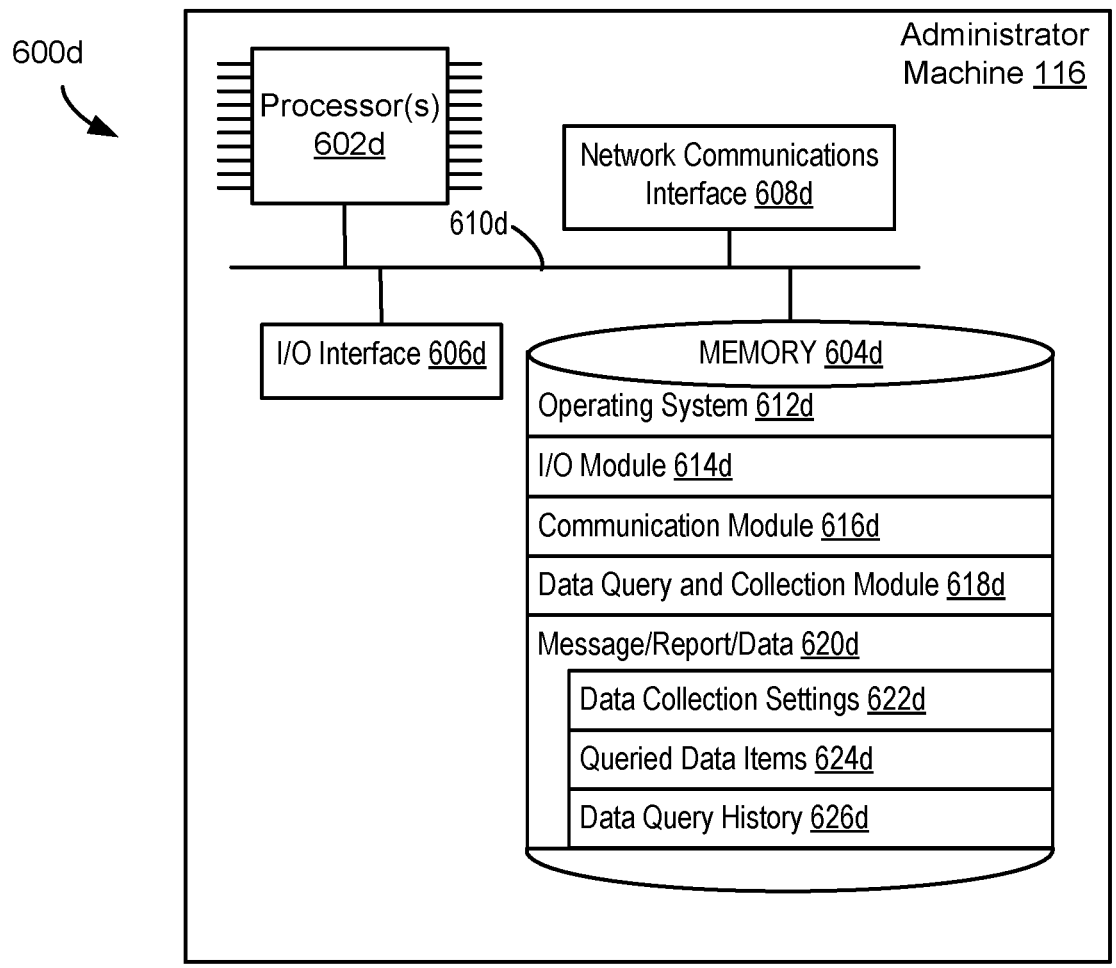
Figure 7A:
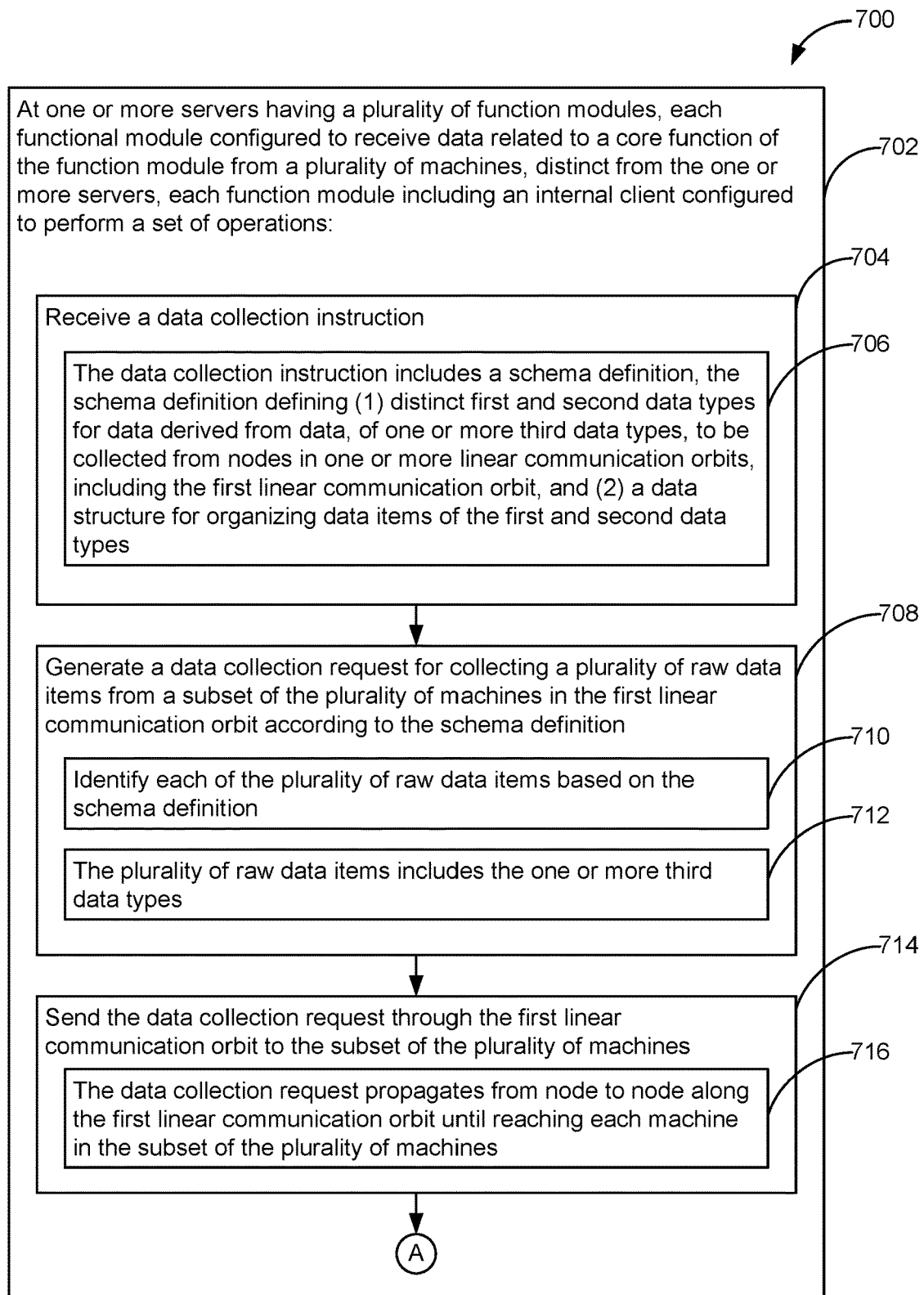
FIGS. 7A-7I include a flow diagram representing an example distributed data processing method implemented by a server system for processing data collected from a plurality of machines located at a non-static collection of nodes of a linear communication orbit in accordance with some embodiments.
Figure 7B:
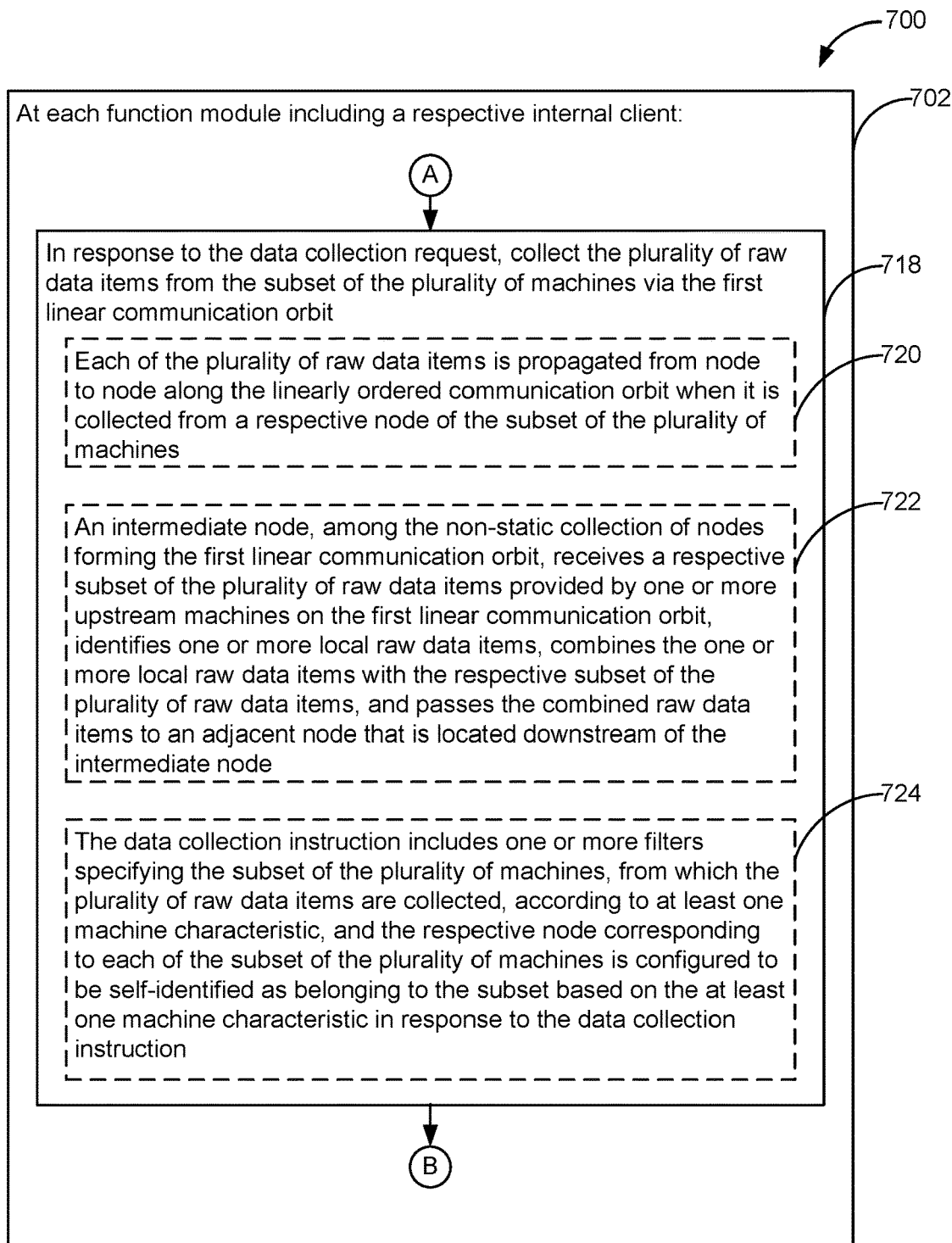
Figure 7C:
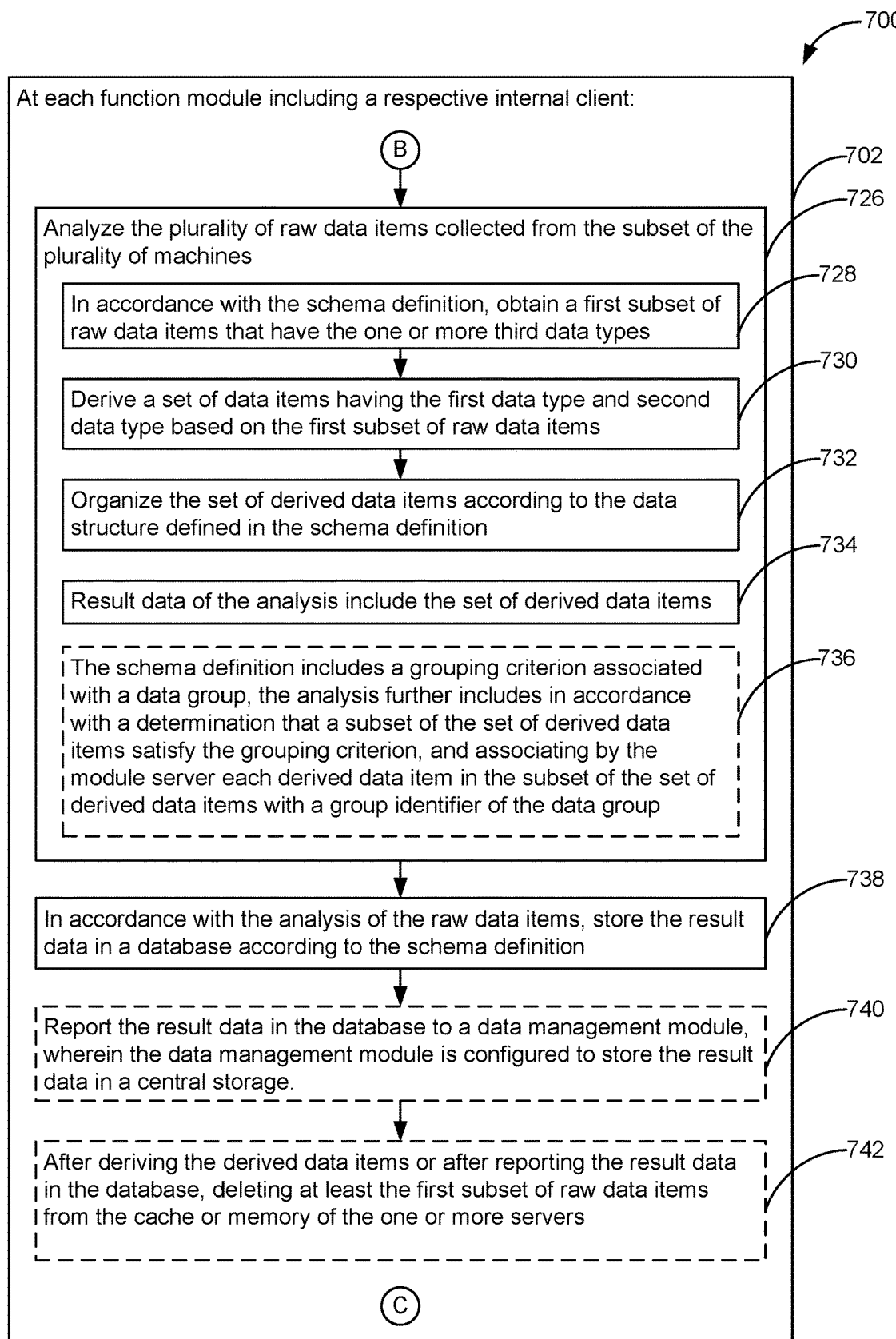
Figure 7D:
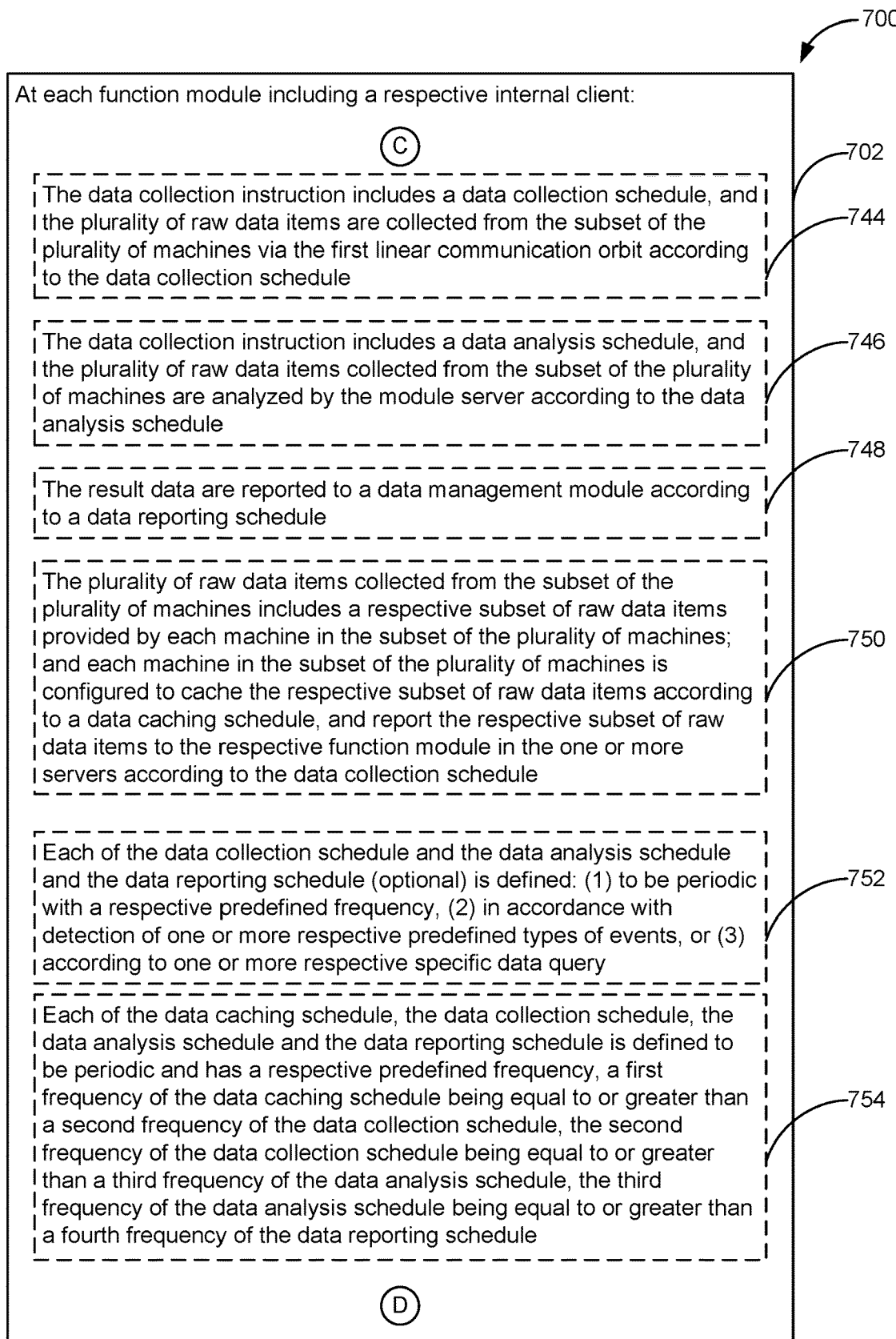
Figure 7E:
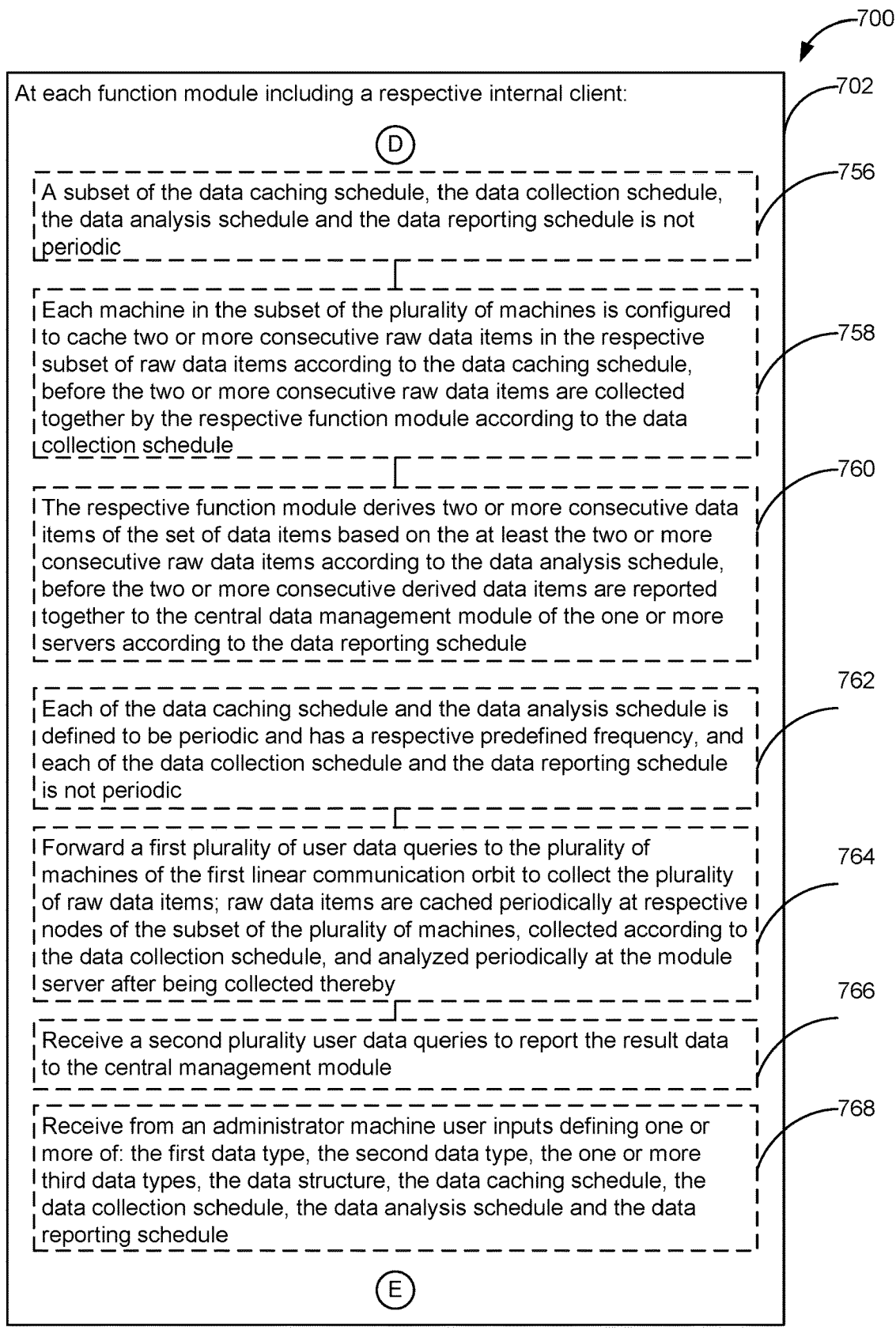
Figure 7F:
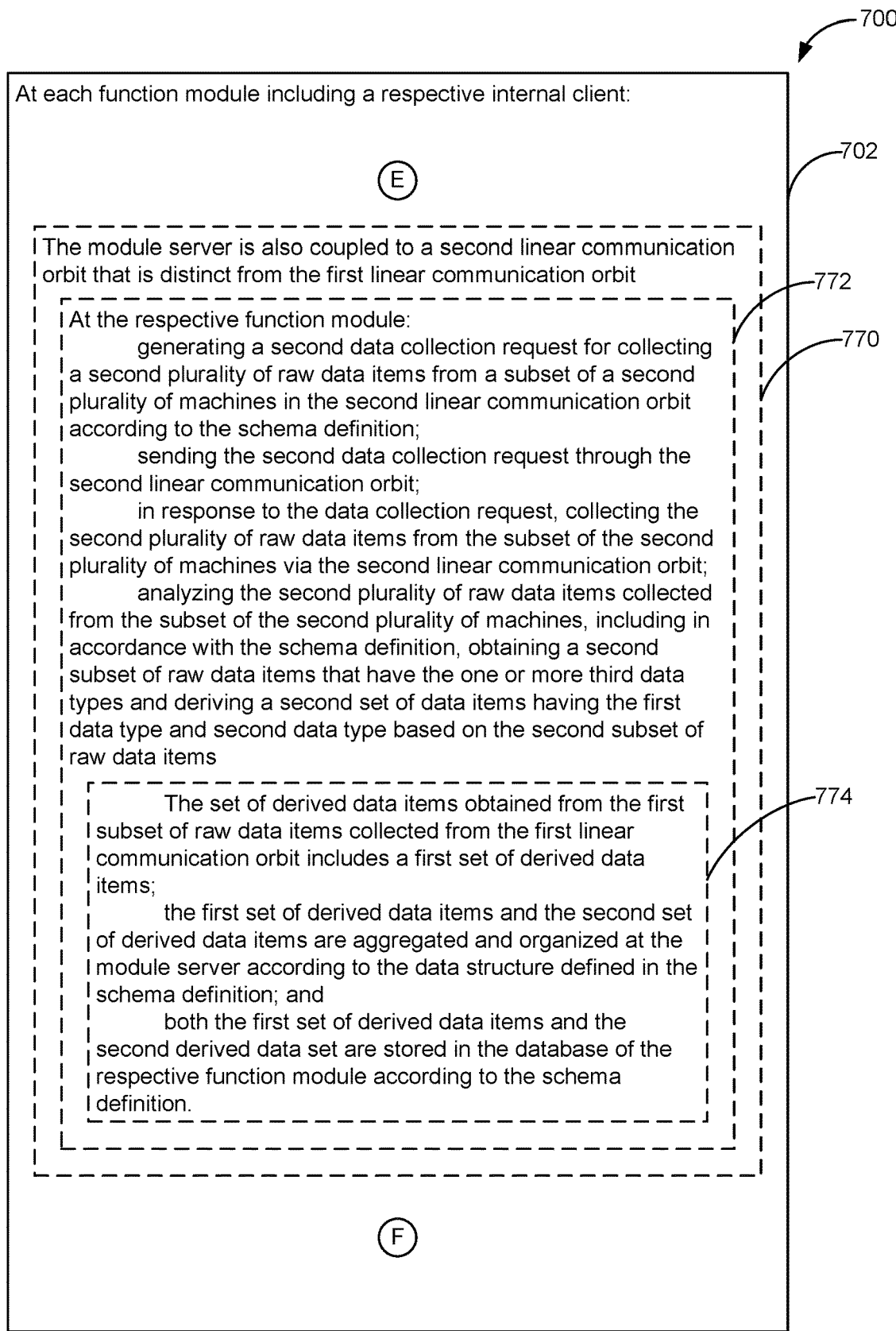
Figure 7G:
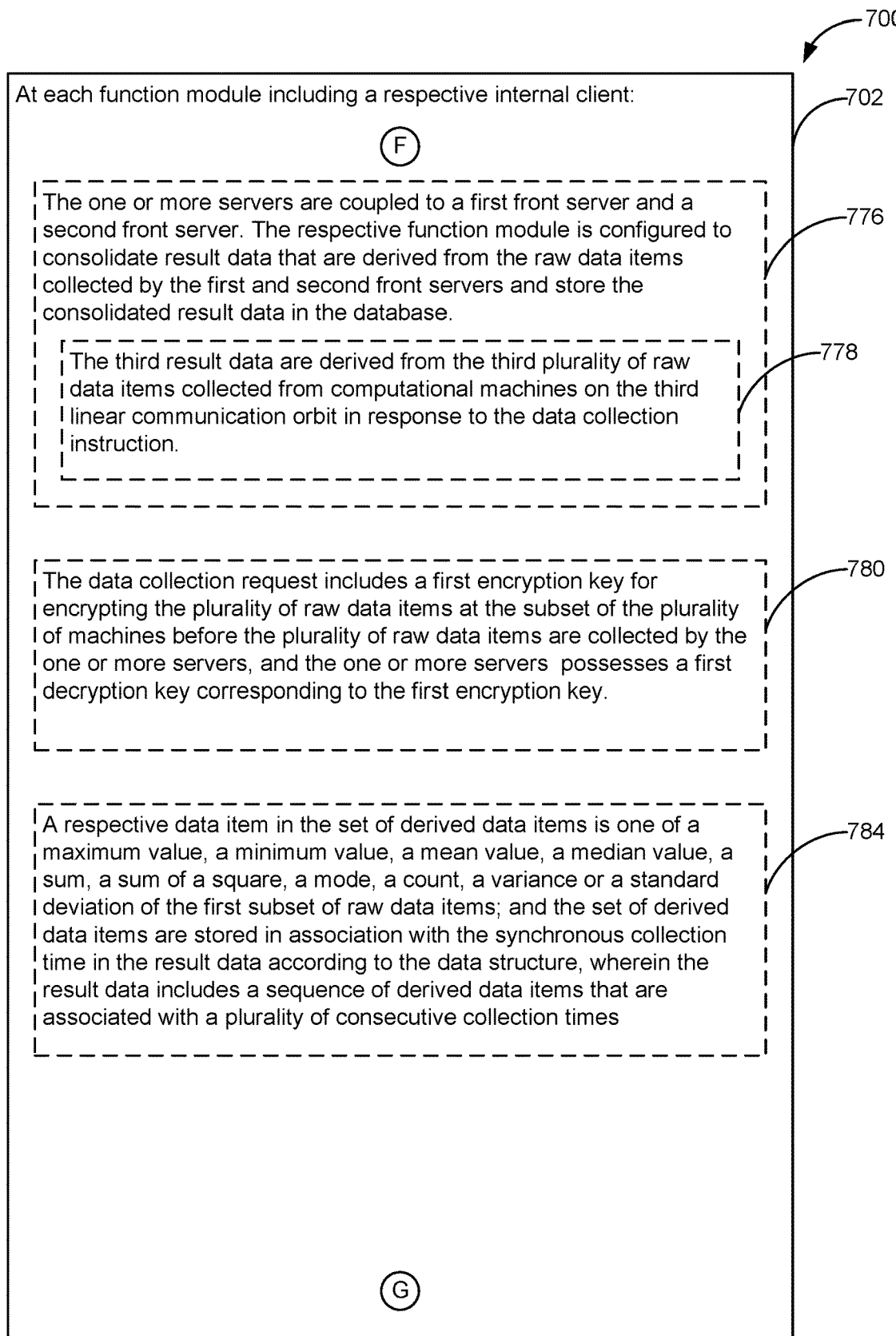
Figure 7H:
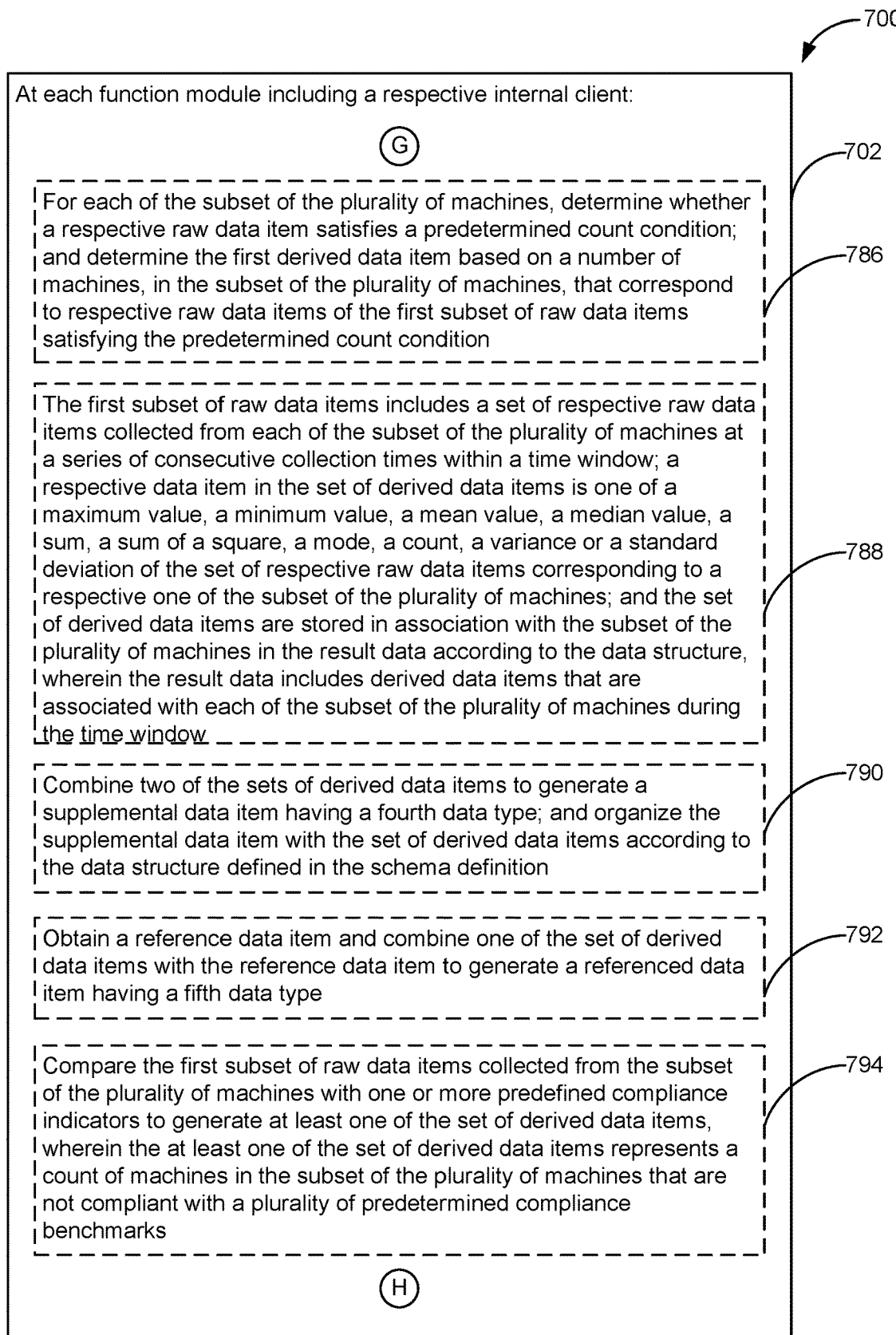
Figure 7I:
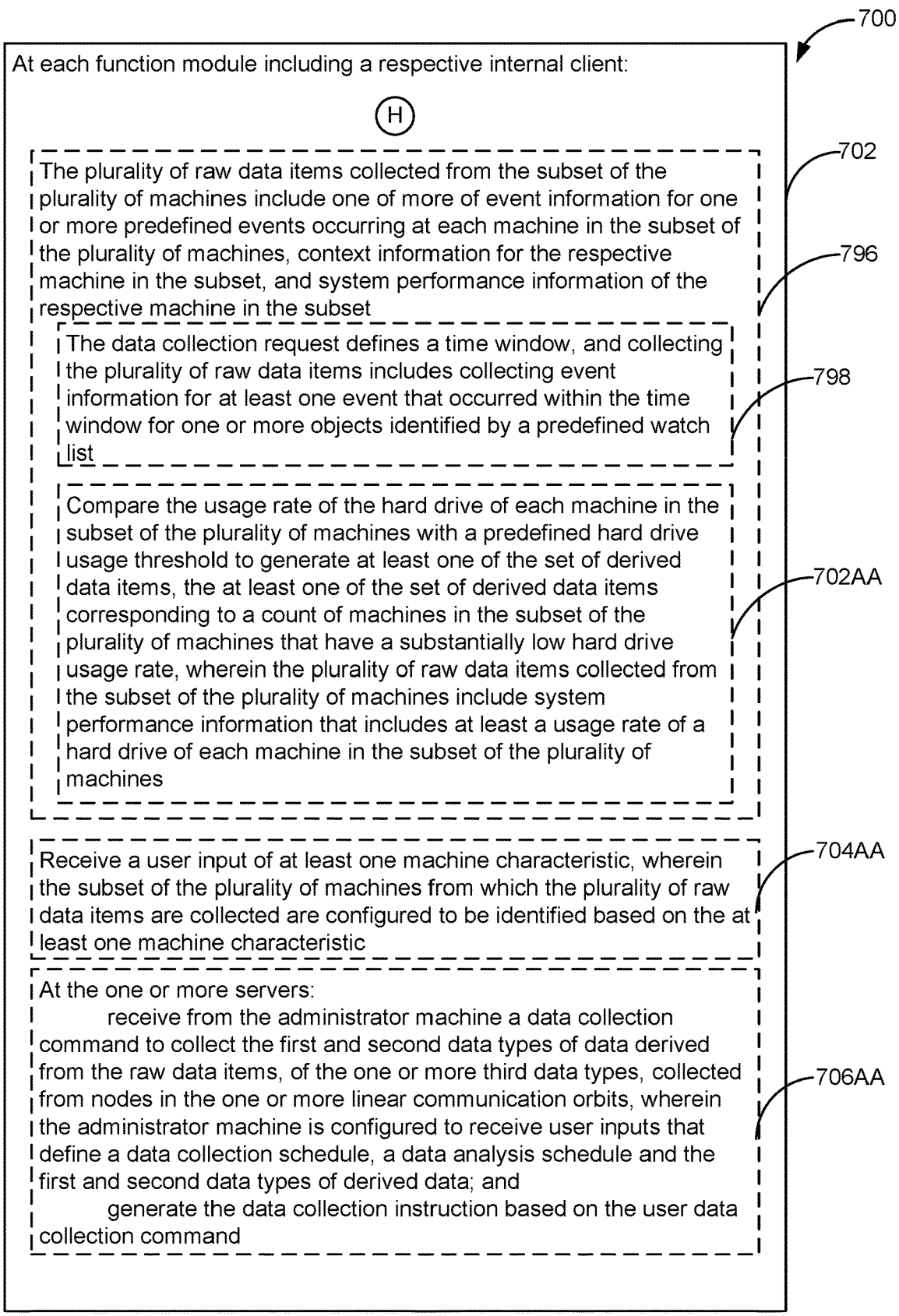

FIG. 6D is a block diagram of a machine 600*d* (e.g., serving as an administrator machine 116 coupled to a server of a network shown in FIGS. 1B, 3 and 4) in accordance with some embodiments. In some implementations, machine 600*d* includes one or more processors 602*d*, memory 604*d* for storing programs and instructions for execution by one or more processors 602*d*, one or more communications interfaces such as input/output interface 606*d* and network interface 608*d*, and one or more communications buses 610*d* for interconnecting these components.

In some embodiments, input/output interface 606*d* includes a display and input devices such as a keyboard, a mouse and/or a track-pad. In some embodiments, communication buses 610*d* include circuitry (sometimes called a chipset) that interconnects and controls communications between system components. In some embodiments, memory 604*d* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604*d* includes one or more storage devices remotely located from the one or more processors 602*d*. In some embodiments, memory 604*d*, or alternatively the non-volatile memory device(s) within memory 604*d*, comprises a non-transitory computer readable storage medium.

In some embodiments, memory 604*d* or alternatively the non-transitory computer readable storage medium of memory 604*d* stores the following programs, modules and data structures, instructions, or a subset thereof:

Operating System 612*d* that includes procedures for handling various basic system services and for performing hardware dependent tasks;

I/O module 614*d* that includes procedures for handling various basic input and output functions through one or more input and output devices;

Communication module 616*d* that is used for connecting machine 600*d* to other machines (e.g., machines 102 in network 100, server 108, and/or server 110) via one or more network communication interfaces 608*d* (wired or wireless) and one or more communication networks, such as the Internet, other wide area networks, local area networks, metropolitan area networks, and so on;

Data query and collection module 618*d* that includes instructions for executing an application through which user inputs are entered and result data reported by function modules 280 to data management module 240 are presented to an administrator user, where the user inputs defines one or more of: a data caching command, a data collection command, a data reporting command and one or more user queries inquiring into the result data stored in central database 532; and Messages, reports and/or other data 620*d* that is stored, temporarily or otherwise, by machine 600*d* upon receipt from other machines (e.g., computational machine 102, server system 108, or front server 410), and/or that is locally generated, revised or supplemented prior to transmission to front server 410 or server system 108, where in some embodiments, messages, reports and/or other data 620*d* further include one or more of: data collection settings 622*d* (e.g., a data collection schedule, a data analysis schedule and a data reporting schedule of a function module in server system 108), queried data items 624*d* provided by data management module 240 of sever system 108 in response to user queries, and data query history 626*d* including a history of user queries that inquire into the result data stored in central storage 510 of server system 108.

FIGS. 6A-6D are merely illustrative of the structures of machines/systems 600*a*-600*d*. A person skilled in the art would recognize that particular embodiments of machines 600*a*-600*d* may include more or fewer components than those shown. One or more modules may be divided into sub-modules, and/or one or more functions may be provided by different modules than those shown.

FIGS. 7A-7I include a flow diagram representing an example distributed data processing method 700 implemented by a server system 108 for processing data collected from a plurality of machines located at a non-static collection of nodes of a linear communication orbit in accordance with some embodiments. Method 700 is optionally governed by instructions that are stored in a non-transitory computer readable storage medium and that are executed by one or more processors of a server system (e.g., computer system 600*b* in FIG. 6B, and server system 108 in FIGS. 1-5). Each of the operations shown in FIGS. 7A-7I may correspond to instructions stored in a computer memory or non-transitory computer readable storage medium (e.g., memory 604*b* of computer system 600*b* in FIG. 6). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

Method 700 is performed (702) by one or more servers (e.g., server or server system 108 in FIGS. 1-5) coupled to a plurality of machines located at a non-static collection of nodes that form a first linear communication orbit (e.g., orbit 204 in FIGS. 2A and 204A in FIG. 3). Each node (e.g., nodes in FIG. 1A) in the first linear communication orbit includes a machine identifier for a respective machine, of the plurality of machines, located at the node, and the nodes in the non-static collection of nodes have self-organized into an ordered sequence in accordance with a predefined order of the respective machine identifiers of the non-static collection of nodes in the first linear communication orbit. The one or more servers have (702) a plurality of function modules (e.g., modules 240 in FIGS. 4 and 5A-5B). Each function module is configured to receive data related to a core function of the function module from the plurality of machines, distinct from the one or more servers. Each function module includes an internal client configured to perform a set of operations.

A function module of the one or more servers receives (704) a data collection instruction (e.g., from central data management module 240 that is distinct from function modules 240 of server system 108). The data collection instruction includes (706) a schema definition, which defines (1) distinct first and second data types (and optionally additional data types) for data derived from data (sometimes herein called raw data), of one or more third data types, to be collected from nodes in one or more linear communication orbits, including the first linear communication orbit, and (2) a data structure for organizing data items of the first and second data types (and any other data types for derived data). In an example, a schema defined according to the schema definition optionally includes an array of fields, and each field includes a name, a type (e.g., a text string or a number), and optionally a default value. The function module then generates (708) a data collection request for collecting a plurality of raw data items from a subset of the plurality of machines in the first linear communication orbit according to the schema definition. Specifically, the function module identifies (710) each of the plurality of raw data items based on the schema definition, and the plurality of raw data items includes (712) the one or more third data types.

The function module sends (714) the data collection request through the first linear communication orbit to the subset of the plurality of machines. The data collection request propagates (716) from node to node along the first linear communication orbit until reaching each machine in the subset of the plurality of machines. In response to the data collection request, the function module collects (718) the plurality of raw data items from the subset of the plurality of machines via the first linear communication orbit. Referring to FIG. 2A, in some embodiments, each of the plurality of raw data items is propagated (720) from node to node along linearly ordered communication orbit 204 when it is collected from a respective node of the subset of the plurality of machines 206-218.

In some embodiments, the data collection request is actually a pair of instructions sent to the subset of the plurality of machines. A first data collection request, sent to the subset of the plurality of machines via the linear communication orbit(s) that include those machines, instructs the subset of the plurality of machines what raw data items are to be retained, and locally cached, so that they are ready for collection. A second collection request, sent to the subset of the plurality of machines via the linear communication orbit(s) that include those machines, instructs those machines to send specified raw data, e.g., specified raw data collected for a particular time period, to the function module. In some embodiments, each machine in the subset of the plurality of machines that has raw data to return to the function module in response to the request adds that raw data to (e.g., to a payload portion of, or data area of) the second collection request. The second collection request, with the collected raw data from machines in the subset of the plurality of machines, is returned to the function module 108, e.g., via a tail node of the linear communication orbit, or by a last machine in the linear communication orbit that corresponds to the second collection request. In some embodiments, the first data collection request, specifying the raw data to be collected, is sent relatively infrequently, such as when any machine joins or rejoins the linear communication orbit, while the second data collection request is sent periodically, or more generally in accordance with detection of a respective triggering event.

In some embodiments, an intermediate node (e.g., a node corresponding to first machine (M1) 210) among the non-static collection of nodes forming the first linear communication orbit receives (720) a plurality of raw data items provided by one or more upstream machines on the first linear communication orbit. The intermediate node identifies one or more local raw data items, combines the one or more local raw data items with the respective subset of the plurality of raw data items, and passes the combined raw data items to an adjacent node that is located downstream of the intermediate node. When a last machine in the first linear communication orbit (e.g., a tail machine, or the last machine in the linear communication orbit from which raw data is to be collected, adds its raw data to the raw data items received from upstream machines, the resulting combined raw data items are sent to the one or more servers.

In some embodiments, the data collection instruction includes (724) one or more filters specifying the subset of the plurality of machines, from which the plurality of raw data items are collected, according to at least one machine characteristic (e.g., executing a specific type of operating system or software application). The respective node corresponding to each of the subset of the plurality of machines is configured to be self-identified as belonging to the subset based on the one at least one machine characteristic in response to the data collection instruction.

After collecting the plurality of raw data items, the respective function module analyzes (726) the plurality of raw data items collected from the subset of the plurality of machines. Specifically, the respective function module, in accordance with the schema definition, obtains (728) a first subset of raw data items that have the one or more third data types, derives (730) a set of data items having the first data type and second data type (and optionally additional data types) based on the first subset of raw data items, and organizes (732) the set of derived data items according to the data structure defined in the schema definition. Result data of the analysis include (734) the set of derived data items. In some embodiments, the schema definition includes a grouping criterion associated with a data group. Examples of the grouping criterion include: whether the respective raw or derived data item complies with a compliance requirement, whether a corresponding machine executes a specific operating system or application, whether a corresponding machine is a specific type of machine. In accordance with a determination that a subset of the set of derived data items satisfy the grouping criterion, the respective function module associates (736) each derived data item in the subset of the set of derived data items with a group identifier of the data group. In some embodiments, a table defined by the schema definition includes an additional field configured to store the group identifier for the subset of the set of derived data items satisfying the grouping criterion.

In accordance with the analysis of the raw data items, the respective function module stores (738) the result data in a database (e.g., database 526 in FIG. 5B or 6B) according to the schema definition. In some implementations, the result data is stored in a function module database 526 in the respective function module 240, and then reported (740) to central data management module 240 (e.g., periodically, at scheduled reporting times, and/or in response to a respective user query, and more generally in accordance with detection of a respective triggering event). The central data management module is configured to store the result data in a central storage 510. In some embodiments, the result data are organized in one or more tables according to the schema definition for storage in the central storage. In response to a database query based on a data group, the central data management module identifies a subset of the result data according to a group identifier associated with the data group. The subset of the result data includes a subset of tuples of the one or more tables or a subset of data fields of the tuples of the one or more tables.

In some embodiments, the function module stores the first subset of raw data items in a cache or memory. After deriving the derived data items or after reporting the result data in the database (e.g., to the central data management module), the function module deletes (742) at least the first subset of raw data items from the cache or memory of the one or more servers. Under some circumstances, the first subset of raw data items are deleted from each of the subset of the plurality of machines as well.

In some embodiments, the data collection instruction includes (744) a data collection schedule, and the plurality of raw data items are collected from the subset of the plurality of machines via the first linear communication orbit according to the data collection schedule. In some embodiments, the data collection instruction includes (746) a data analysis schedule, and the plurality of raw data items collected from the subset of the plurality of machines are analyzed by the function module according to the data analysis schedule. The result data of analysis are then reported (748) to the data management module according to a data reporting schedule. Additionally, in some embodiments, the plurality of raw data items collected from the subset of the plurality of machines includes a respective subset of raw data items provided by each machine in the subset of the plurality of machines. Each machine in the subset of the plurality of machines is configured to cache (750) the respective subset of raw data items according to a data caching schedule and report the respective subset of raw data items to the respective function module according to the data collection schedule.

Further, in some embodiments, each of the data collection schedule and the data analysis schedule and the (optional) data reporting schedule is defined (752): (1) to be periodic with a respective predefined frequency, (2) in accordance with detection of one or more respective predefined types of events, or (3) according to one or more respective specific data queries. Conversely, the data caching schedule is optionally defined separately by the data caching request, independently of the data collection instruction. In a specific example, each of the data caching schedule, the data collection schedule, the data analysis schedule and the data reporting schedule is defined (754) to be periodic and has a respective predefined frequency. A first frequency of the data caching schedule is equal to or greater than a second frequency of the data collection schedule. The second frequency of the data collection schedule is equal to or greater than a third frequency of the data analysis schedule. The third frequency of the data analysis schedule is equal to or greater than a fourth frequency of the data reporting schedule. Further, in another example, a subset of the data caching schedule, the data collection schedule, the data analysis schedule and the data reporting schedule is not periodic (756). Each machine in the subset of the plurality of machines is configured to cache (758) two or more consecutive raw data items in the respective subset of raw data items according to the data caching schedule, before the two or more consecutive raw data items are collected together by the respective function module according to the data collection schedule. The respective function module derives (760) two or more consecutive data items of the set of data items based on the at least the two or more consecutive raw data items according to the data analysis schedule, before the two or more consecutive derived data items are reported together to the central data management module of the one or more servers according to the data reporting schedule.

Alternatively, in another example, each of the data caching schedule and the data analysis schedule is defined (762) to be periodic and has a respective predefined frequency, and each of the data collection schedule and the data reporting schedule is not periodic.

In some embodiments, the one or more servers forward (764) a first plurality of user data queries (collectively, the data collection request) to the plurality of machines of the first linear communication orbit to collect the plurality of raw data items. Raw data items are cached periodically at respective nodes of the subset of the plurality of machines, collected from the respective nodes of the subset of the plurality of machines according to the data collection schedule, and analyzed periodically at the respective function module (e.g., at its internal client) after being collected thereby. The respective function module receives (766) a second plurality user data queries to report the result data to the central data management module.

In some embodiments, the one or more servers are further coupled to an administrator machine (e.g., machine 116 in FIGS. 1-5). The one or more servers receive (768) from the administrator machine user inputs defining one or more of: the first data type, the second data type, the one or more third data types, the data structure, the data caching schedule, the data collection schedule, the data analysis schedule and the data reporting schedule.

In some embodiments, the one or more servers are also coupled to a second linear communication orbit (e.g., orbit 204B in FIG. 3) that is distinct from the first linear communication orbit (e.g., orbit 204A in FIG. 3). The internal client of the respective function module generates (772) a second data collection request for collecting a second plurality of raw data items from a subset of a second plurality of machines in the second linear communication orbit according to the schema definition, sends (772) the second data collection request through the second linear communication orbit, collects (772) the second plurality of raw data items from the subset of the second plurality of machines via the second linear communication orbit, and analyzes (772) the second plurality of raw data items collected from the subset of the second plurality of machines. The respective function module obtains a second subset of raw data items that have the one or more third data types and derives a second set of data items having the first data type and second data type based on the second subset of raw data items. Further, in some situations, the set of derived data items obtained from the first subset of raw data items collected from the first linear communication orbit includes a first set of derived data items. The first set of derived data items and the second set of derived data items are aggregated and organized (774) at the respective function module according to the data structure defined in the schema definition. Both the first set of derived data items and the second derived data set are stored (774) in the database of the respective function module according to the schema definition, and in some embodiments, reported to the central data management module.

In some embodiments, the one or more servers are coupled to a first front server and a second front server. The first front server is coupled to the first linear communication orbit and configured to collect the plurality of raw data items from the first linear communication orbit. The second front server is coupled to a third linear communication orbit and configured to collect a third plurality of raw data items from the third linear communication orbit. The respective function module is configured to consolidate (776) result data that are derived from the raw data items collected by the first and second front servers and store the consolidated result data in the database. Further, in some embodiments, the third result data are derived (778) from the third plurality of raw data items collected from computational machines on the third linear communication orbit by the respective function module, in response to the data collection instruction.

In some embodiments, the data collection request includes (780) a first encryption key for encrypting the plurality of raw data items at the subset of the plurality of machines before the plurality of raw data items are collected by the one or more servers, and the one or more servers possess a first decryption key corresponding to the first encryption key.

In some embodiments, the first subset of raw data items includes one or more respective raw data items collected from each of the subset of the plurality of machines at a synchronous data collection time. In some embodiments, a respective data item of the set of derived data items is (784) one of a maximum value, a minimum value, a mean value, a median value, a sum, a sum of a square, a mode, a count, a variance or a standard deviation of the first subset of raw data items. For example, at a synchronous data collection time ti, a first raw data item, a second raw data item and a third raw data item are collected from a first machine, a second machine and a third machine on a linear communication orbit. A data item is derived based on a mean value of the first, second and third raw data items. Alternatively, in some embodiments, the set of derived data items are stored in association with the synchronous data collection time in the result data according to the data structure, and the result data includes a sequence of derived data items that are associated with a plurality of consecutive data collection times.

In some embodiments, the first subset of raw data items includes a respective raw data item collected from each of the subset of the plurality of machines at a synchronous data collection time. The set of data items includes a first derived data item. For each of the subset of the plurality of machines, the respective function module determines whether the respective raw data item satisfies a predetermined count condition. The first derived data item is determined (786) based on a number of machines, in the subset of the plurality of machines, that correspond to respective raw data items of the first subset of raw data items satisfying the predetermined count condition.

In some embodiments, the first subset of raw data items includes (788) a set of respective raw data items collected from each of the subset of the plurality of machines at a series of consecutive data collection times within a time window. A respective data item in the set of derived data items is one of a maximum value, a minimum value, a mean value, a median value, a sum, a sum of a square, a mode, a count, a variance or a standard deviation of the set of respective raw data items corresponding to a respective one of the subset of the plurality of machines. The set of derived data items are stored in association with the subset of the plurality of machines in the result data according to the data structure, and the result data includes derived data items that are associated with each of the subset of the plurality of machines during the time window.

In some embodiments, the respective function module combines (790) two of the sets of derived data items to generate a supplemental data item having a fourth data type and organizes the supplemental data item with the set of derived data items according to the data structure defined in the schema definition. The result data of the analysis further includes the supplemental data item. In some embodiments, the respective function module obtains (792) a reference data item, combines one of the set of derived data items with the reference data item to generate a referenced data item (sometimes called a derived and referenced data item) having a fifth data type, and organizes the referenced data item with the set of derived data items according to the data structure defined in the schema definition. The result data of the analysis further includes the referenced data item.

In an example, the respective function module compares (794) the first subset of raw data items collected from the subset of the plurality of machines with one or more predefined compliance indicators to generate at least one of the set of derived data items. The at least one of the set of derived data items represents a count of machines in the subset of the plurality of machines that are not compliant with a plurality of predetermined compliance benchmarks.

In some embodiments, the plurality of raw data items collected from the subset of the plurality of machines include (796) one or more of: event information for one or more predefined events occurring at each machine in the subset of the plurality of machines, context information for the respective machine in the subset, and system performance information of the respective machine in the subset. Examples of the event information include malware files and artifacts, a database snapshot, indicator/status values (e.g., "presence of a file named 'VIRUS.exe'=TRUE" AND "Port 88 is open=TRUE"), event histories, an application/event definition in the data collection request, metadata associated with operation performed by the respective node that meet the application definition. Examples of derived data items include a count applied for building a map or generating statistics by the one or more servers. The count may indicate how many machines have deployed a watch list including the one or more predefined events and one or more objects (file, directory), and a local environment verification package. For example, the data collection request defines a specific time window, and the respective function module collects (798) event information for at least one event that occurred within the time window for one or more objects identified by a predefined watch list.

Alternatively, in an example, the plurality of raw data items collected from the subset of the plurality of machines include system performance information that includes at least a usage rate of a resource of each of those machines, such as hard drive or other data storage device of each machine in the subset of the plurality of machines. The respective function module compares (702AA) the usage rate of the resource in the subset of the plurality of machines with a predefined hard drive usage threshold to generate at least one of the set of derived data items. In an example, the at least one of the set of derived data items corresponds to a count of machines in the subset of the plurality of machines that have a resource usage rate that is compliance, or not in compliance, with predefined criteria.

In some embodiments, the one or more servers (e.g., a data management module distinct from the function modules) receive (704AA) a user input (e.g., via the administrator machine) of at least one machine characteristic. The subset of the plurality of machines from which the plurality of raw data items are collected are configured to be identified based on the at least one machine characteristic. Further, in some embodiments, the one or more servers are further coupled to an administrator machine. The one or more servers receive from the administrator machine a data collection command to collect the first and second data types of data derived from the raw data items, of the one or more third data types, collected from nodes in the one or more linear communication orbits. The administrator machine is configured to receive user inputs that define a data collection schedule, a data analysis schedule and the first and second data types of derived data. The one or more servers (e.g., a data management module distinct from the function modules) then generates (706AA) the aforementioned data collection instruction based on the user data collection command. As discussed above, the respective function module receives the data collection instruction from the data management module, and in response, generates one or a series of data collection requests based on the data collection instruction.

In some embodiments, one or more servers have a plurality of function modules, each of which is configured to manage data related to a core function of the function module from a plurality of machines on one or more communication orbits. The data related to the core function of each function module can be pre-processed "locally" at the respective function module. Such preprocessing can be performed concurrently while the data is collected at the respective function module, or between data collections, thereby reducing the scale of the data that need to be stored and queried by a central data management module at the one or more servers. Such data pre-processing can be implemented by installing a central data management module on the one or more servers that communicates with an internal client of each of the function modules. Each function module maintains its own core function, but is modified to include an internal client. The internal client is controlled by the central data management module to perform a set of data processing operations on data related to its core function, collected from the plurality of machines. Such processing is optionally performed concurrently while the data related to its core function is collected from the plurality of machines. In an example, the data management module provides a schema definition to the internal clients of the plurality of function modules. The internal client of each function module performs the set of data processing operations on the data received from the plurality of machines according to the schema definition.

It should be understood that the particular order in which the operations in FIGS. 7A-7I have been described is merely an example and is not intended to indicate that the described order is the only order in which the operations could be performed. One of ordinary skill in the art would recognize various ways to collect, analyze, aggregate and report raw data generated by computational machines coupled at respective nodes of a linear communication orbit as described herein. It is also noted that some of the features or operations of method 700 described above have been described in more detail with reference to FIGS. 1-6, and those descriptions are to be considered to be part of the description of method 700, where applicable.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first machine could be termed a second machine, and, similarly, a second machine could be termed a first machine, without changing the meaning of the description, so long as all occurrences of the "first machine" are renamed consistently and all occurrences of the "second machine" are renamed consistently. The first machine and the second machine are both widgets, but they are not the same machine.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A server system, comprising:
one or more servers having a plurality of function modules, each function module configured to receive data related to a core function of the function module;
wherein the one or more servers include one or more processors and one or more memory units storing one or more programs, the one or more programs including instructions that, when executed by the one or more processors of the server system, cause the server system to perform a set of operations including:
at a first function module of the plurality of function modules, receiving a data collection instruction;
in response to the data collection instruction, generating and sending a data collection request to a plurality of machines located at nodes along one or more linear communication orbits, wherein:
a set of machines, including the plurality of machines, are located at a non-static collection of nodes that form the one or more linear communication orbits;
the data collection request includes a filter specifying a machine subset, comprising a subset of the plurality of machines located at nodes of the one or more linear communication orbits, from which data is to be collected in accordance with the data collection request;
the data collection request propagates from node to node along each linear communication orbit of the one or more linear communication orbits and is received by the plurality of machines located at nodes along the one or more linear communication orbits;
each machine that receives the data collection request determines, based on the filter in the data collection request, whether it belongs to the machine subset specified by the filter, and in accordance with a determination that it belongs to the machine subset specified by the filter, identifies data items, corresponding to the data collection request, to return to the function module; and
at the first function module, receiving and processing the data items returned by machines in the machine subset.

2. The server system of claim 1, wherein
a first machine that belongs to the machine subset specified by the filter aggregates data items identified by the first machine as corresponding to the data collection request with data items received from other machines located at nodes along a first linear communication orbit, of the one or more linear communication orbits, to produce an aggregated set of data items, and sends the aggregated set of data items along a return path for delivery to the server system; and
the one or more programs include instructions that, when executed by the one or more processors of the server system, cause the first function module to receive the aggregated set of data items.

3. The server system of claim 2, wherein the other machines located at nodes along the first linear communication orbit are machines located at nodes upstream of a node of the first linear communication orbit at which the first machine is located.

4. The server system of claim 1, wherein the one or more programs include instructions that, when executed by the one or more processors of the server system, cause the first function module to receive the data collection instruction from a central data management module of the server system.

5. A method of collecting and processing data from a distributed set of machines, comprising:
at a server system comprising one or more servers having a plurality of function modules, each function module configured to receive data related to a core function of the function module:
at a first function module of the plurality of function modules, receiving a data collection instruction;
in response to the data collection instruction, generating and sending a data collection request to a plurality of machines located at nodes along one or more linear communication orbits, wherein:
a set of machines, including the plurality of machines, are located at a non-static collection of nodes that form the one or more linear communication orbits;
the data collection request includes a filter specifying a machine subset, comprising a subset of the plurality of machines located at nodes of the one or more linear communication orbits, from which data is to be collected in accordance with the data collection request;
the data collection request propagates from node to node along each linear communication orbit of the one or more linear communication orbits and is received by the plurality of machines located at nodes along the one or more linear communication orbits;
each machine that receives the data collection request determines, based on the filter in the data collection request, whether it belongs to the machine subset specified by the filter, and in accordance with a determination that it belongs to the machine subset specified by the filter, identifies data items, corresponding to the data collection request, to return to the function module; and
at the first function module, receiving and processing the data items returned by machines in the machine subset.

6. The method of claim 5, wherein
a first machine that belongs to the machine subset specified by the filter aggregates data items identified by the first machine as corresponding to the data collection request with data items received from other machines located at nodes along a first linear communication orbit, of the one or more linear communication orbits, to produce an aggregated set of data items, and sends the aggregated set of data items along a return path for delivery to the server system; and
the method includes the first function module receiving the aggregated set of data items.

7. The method of claim 6, wherein the other machines located at nodes along the first linear communication orbit are machines located at nodes upstream of a node of the first linear communication orbit at which the first machine is located.

8. The method of claim 5, further including receiving the data collection instruction from a central data management module of the server system.

9. The method of claim 5, further comprising, for each function module of two or more function modules of the plurality of function modules,
generating and sending a respective data collection request to machines located at nodes along the one or more linear communication orbits, the respective data collection request including a filter specifying a respective machine subset, comprising a subset of the plurality of machines located at nodes along the one or more linear communication orbits, from which data is to be collected in accordance with the respective data collection request; and
receiving aggregated sets of data items from the respective machine subset specified by the filter in the respective data collection request.

10. The method of claim 5, wherein:
the data collection instruction includes a data collection schedule; and
the method further comprises:
collecting aggregated sets of data items corresponding to the data collection request from machines, of the plurality of machines, located at nodes along the one or more linear communication orbits according to the data collection schedule.

11. The method of claim 10, wherein the method further comprises analyzing, at times determined in accordance with a data analysis schedule associated with the data collection instruction, at least a subset of the aggregated sets of data items collected from the machines, of the plurality of machines, located at nodes along the linear communication orbit.

12. The method of claim 11, further including providing result data, produced by the analyzing, to a central data management module of the one or more servers according to a data reporting schedule.

13. The method of claim 12, wherein a respective machine in the machine subset specified by the filter in the data collection request is configured to cache data items, including data items corresponding to the data collection request, according to a data caching schedule, and provide the cached data items to the first function module according to the data collection schedule.

14. The method of claim 13, wherein the data caching schedule, the data collection schedule, and the data analysis schedule are each defined to be periodic and each has a respective predefined frequency, a first frequency of the data caching schedule being equal to or greater than a second frequency of the data collection schedule, and the second frequency of the data collection schedule being equal to or greater than a third frequency of the data analysis schedule.

15. The method of claim 5, further including converting one or more data collection instructions to one or more data collection requests for collecting data items, and a first data collection request of the one or more data collection requests comprises a request to collect event information for events that occur within a time window specified by the first data collection request.

16. The method of claim 5, wherein:
the one or more servers are coupled to a first front server and a second front server, the first front server is coupled to a first linear communication orbit of the one or more linear communication orbits and configured to collect the data items from machines coupled to nodes along the first linear communication orbit, and the second front server is coupled to a second linear communication orbit of the one or more linear communication orbits and configured to collect the data items from machines coupled to nodes along the second linear communication orbit.

17. A non-transitory computer-readable storage medium having one or more programs stored thereon that when executed by a server system that includes a plurality of function modules, each function module configured to receive data related to a core function of the function module, cause the server system to perform operations, including:
at a first function module of the plurality of function modules, receiving a data collection instruction;
in response to the data collection instruction, generating and sending a data collection request to a plurality of machines located at nodes along one or more linear communication orbits, wherein:
a set of machines, including the plurality of machines, are located at a non-static collection of nodes that form the one or more linear communication orbits;
the data collection request includes a filter specifying a machine subset, comprising a subset of the plurality of machines located at nodes of the one or more linear communication orbits, from which data is to be collected in accordance with the data collection request;
the data collection request propagates from node to node along each linear communication orbit of the one or more linear communication orbits and is received by the plurality of machines located at nodes along the one or more linear communication orbits;
each machine that receives the data collection request determines, based on the filter in the data collection request, whether it belongs to the machine subset specified by the filter, and in accordance with a determination that it belongs to the machine subset specified by the filter, identifies data items, corresponding to the data collection request, to return to the function module; and
at the first function module, receiving and processing the data items returned by machines in the machine subset.

18. The non-transitory computer-readable storage medium of claim 17, wherein
a first machine that belongs to the machine subset specified by the filter aggregates data items identified by the first machine as corresponding to the data collection request with data items received from other machines located at nodes along a first linear communication orbit, of the one or more linear communication orbits, to produce an aggregated set of data items, and sends the aggregated set of data items along a return path for delivery to the server system; and
the one or more programs include instructions that when executed by the server system cause the first function module to receive the aggregated set of data items.

19. The non-transitory computer-readable storage medium of claim 18, wherein the other machines located at nodes along the first linear communication orbit are machines located at nodes upstream of a node of the first linear communication orbit at which the first machine is located.

20. The non-transitory computer-readable storage medium of claim 17, wherein the one or more programs include instructions that when executed by the server system, cause the first function module to receive the data collection instruction from a central data management module of the server system.

* * * * *